(12) United States Patent
Lee et al.

(10) Patent No.: US 12,288,486 B2
(45) Date of Patent: Apr. 29, 2025

(54) ELECTRONIC DEVICE INCLUDING FLEXIBLE DISPLAY AND METHOD FOR OPERATING THE SAME

(71) Applicant: Samsung Electronics Co., Ltd., Suwon-si (KR)

(72) Inventors: Jookwan Lee, Suwon-si (KR); Yongjin Kwon, Suwon-si (KR); Gyeongtae Park, Suwon-si (KR); Yangwook Kim, Suwon-si (KR); Jihea Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 18/074,005

(22) Filed: Dec. 2, 2022

(65) Prior Publication Data

US 2023/0177982 A1  Jun. 8, 2023

Related U.S. Application Data

(63) Continuation of application No. PCT/KR2022/019259, filed on Nov. 30, 2022.

(30) Foreign Application Priority Data

Dec. 3, 2021 (KR) .................. 10-2021-0172438
Dec. 31, 2021 (KR) .................. 10-2021-0194328

(51) Int. Cl.
   *G09F 9/30* (2006.01)
   *G06F 1/16* (2006.01)
   (Continued)

(52) U.S. Cl.
   CPC ............ *G09F 9/301* (2013.01); *G06F 1/1624* (2013.01); *G06F 1/1652* (2013.01);
   (Continued)

(58) Field of Classification Search
   CPC .... G06F 1/1624; G06F 1/1653; G06F 1/1677; G06F 3/0346; H04M 1/0268
   See application file for complete search history.

(56) References Cited

U.S. PATENT DOCUMENTS 9,779,481 B2   10/2017  Yuasa
10,817,022 B2  10/2020  Cho et al.
(Continued)

FOREIGN PATENT DOCUMENTS

EP       4053672 A1     9/2022
KR  10-2016-0123201 A  10/2016
(Continued)

OTHER PUBLICATIONS

International Search Report dated Mar. 3, 2023, issued in an International Application No. PCT /KR2022/019259.
(Continued)

*Primary Examiner* — Lixi C Simpson
(74) *Attorney, Agent, or Firm* — Jefferson IP Law, LLP

(57) ABSTRACT

An electronic device is provided. The electronic device includes a housing, a flexible display, a memory storing executable instructions, and at least one processor, wherein the instructions are configured to, when executed, enable the at least one processor to identify a first event triggering a first display operation for displaying an image based on a rotation of the electronic device, identify a second event triggering a second display operation for displaying an image based on a change in an area of the flexible display, and sequentially change a display attribute of an image displayed on the flexible display.

20 Claims, 35 Drawing Sheets

(51) Int. Cl.
  *G06F 3/0346* (2013.01)
  *H04M 1/02* (2006.01)

(52) U.S. Cl.
  CPC .......... *G06F 1/1677* (2013.01); *G06F 3/0346* (2013.01); *H04M 1/0268* (2013.01)

(56) References Cited

U.S. PATENT DOCUMENTS

| | | |
|---|---|---|
| 11,057,514 B1 | 7/2021 | Noh et al. |
| 11,112,826 B2 | 9/2021 | Ko et al. |
| 11,743,374 B2 | 8/2023 | Yao |
| 2006/0139492 A1 | 6/2006 | Ahn et al. |
| 2015/0153777 A1 | 6/2015 | Liu et al. |
| 2016/0041680 A1 | 2/2016 | Chi et al. |
| 2016/0048305 A1 | 2/2016 | Singal et al. |
| 2016/0307545 A1 | 10/2016 | Lee et al. |
| 2017/0140504 A1* | 5/2017 | Jeong .................... G06F 1/1677 |
| 2018/0018946 A1* | 1/2018 | Park ...................... G06F 3/0346 |
| 2018/0198896 A1 | 7/2018 | Kang et al. |
| 2019/0050964 A1 | 2/2019 | Jang et al. |
| 2019/0261519 A1* | 8/2019 | Park ........................ H05K 1/118 |
| 2020/0241713 A1 | 7/2020 | Kang et al. |
| 2021/0201709 A1* | 7/2021 | Lee ........................ G06F 1/1624 |
| 2023/0040472 A1 | 2/2023 | Kim et al. |

FOREIGN PATENT DOCUMENTS

| | | | |
|---|---|---|---|
| KR | 10-2017-0006055 A | 1/2017 | |
| KR | 10-2017-0083404 A | 7/2017 | |
| KR | 10-2019-0017614 A | 2/2019 | |
| KR | 10-2019-0101184 A | 8/2019 | |
| WO | WO-2015056038 A1 * | 4/2015 | ........... G06F 1/1694 |
| WO | 2021/085658 A1 | 5/2021 | |
| WO | 2021-132757 A1 | 7/2021 | |

OTHER PUBLICATIONS

Extended European Search Report dated Dec. 13, 2024, issued in European Patent Application No. 22901794.2.

\* cited by examiner

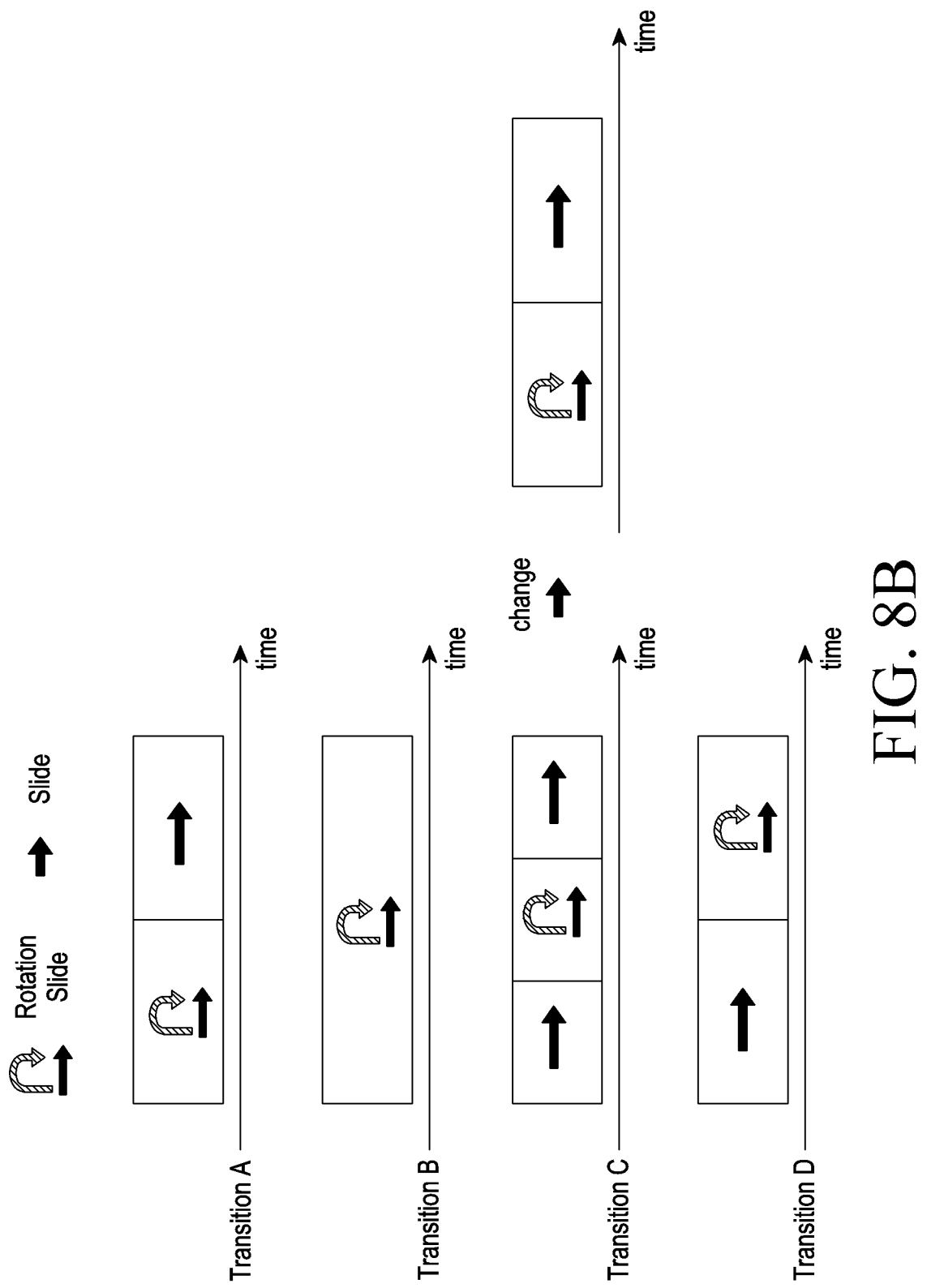

ELECTRONIC DEVICE INCLUDING FLEXIBLE DISPLAY AND METHOD FOR OPERATING THE SAME

CROSS-REFERENCE TO RELATED APPLICATION(S)

This application is a continuation application, claiming priority under § 365(c), of an International application No. PCT/KR2022/019259, filed on Nov. 30, 2022, which is based on and claims the benefit of a Korean patent application number 10-2021-0172438, filed on Dec. 3, 2021, in the Korean Intellectual Property Office, and of a Korean patent application number 10-2021-0194328, filed on Dec. 31, 2021, in the Korean Intellectual Property Office, the disclosure of each of which is incorporated by reference herein in its entirety.

TECHNICAL FIELD

The disclosure relates to an electronic device including a flexible display and a method for operating the same. More particularly, the disclosure relates to an electronic device and operation method thereof for resizing an image while applying an animation effect (or switching effect) to the image when the rotation angle of the electronic device is changed while changing the externally exposed area of the display, thereby reducing the size of the a black matrix (BM) area to enhance image quality.

BACKGROUND ART

As the demand for mobile communication increases, or as the degree of integration of electronic devices increases, the portability of electronic devices such as mobile communication terminals may be increased, and better convenience may be provided in use of multimedia functions. For example, as touchscreen-integrated displays replace traditional mechanical (button-type) keypads, electronic devices may come more compact while functioning as an input device. For example, as the mechanical keypad may be omitted from the electronic device, portability of the electronic device may be improved. As the display area may be expanded to the area which used to be occupied by the mechanical keypad, the electronic device may provide a larger screen while remaining in the same size and weight as when it has the mechanical keypad.

Use of an electronic device with a larger screen may give more convenience in, e.g., web browsing or multimedia playing. A larger display may be adopted to output a larger screen. However, this way may be limited by the portability of the electronic device. According to an embodiment, a display using organic light emitting diodes may secure the portability of the electronic device while providing a larger screen. For example, a display using, or equipped with, organic light emitting diodes may implement a stable operation even if it is made quite thin, so that the display may be applied to an electronic device in a foldable, bendable or rollable form.

The above information is presented as background information only to assist with an understanding of the disclosure. No determination has been made, and no assertion is made, as to whether any of the above might be applicable as prior art with regard to the disclosure.

When the electronic device is rotated so that its rotation angle is a specific angle or more, the electronic device may display a screen (or image or content) based on the screen direction (e.g., vertical direction (or portrait mode) or horizontal direction (or landscape mode)) corresponding to the changed rotation angle of the electronic device. In this case, the electronic device may perform the operation of applying an animation effect to the existing screen during a predetermined time to prepare for obtaining a screen in the screen direction corresponding to the changed rotation angle. For example, the electronic device may capture and obtain the existing screen, apply an animation effect to it, and sequentially change the degree of rotation of the captured screen during a predetermined time. When the electronic device is implemented as a rollable electronic device, the electronic device may perform the above-described display operation according to changes in the rotation angle of the electronic device while performing the operation of changing in the externally exposed area of the display. In such a case, however, the screen captured by the electronic device to apply the animation effect differs from the changing in the externally exposed area of the display, so that a black matrix (BM) area is generated, degrading the image quality. Further, after the electronic device terminates the animation effect-based display operation, an image corresponding to the screen direction corresponding to the changed rotation angle is displayed. Thus, the displayed image differs in area from the changing in the externally exposed area of the display, so that a BM area is generated, causing degradation of image quality.

Aspects of the disclosure are to address at least the above-mentioned problems and/or disadvantages and to provide at least the advantages described below. Accordingly, an aspect of the disclosure is to provide an electronic device and operation method thereof for resizing an image while applying an animation effect (or switching effect) to the image when the rotation angle of the electronic device is changed while changing the externally exposed area of the display, thereby reducing the size of the BM area to enhance image quality.

Another aspect of the disclosure is to provide an electronic device and operation method thereof for obtaining and displaying an image previously resized before termination of the operation of applying an animation effect (or switching effect) when the rotation angle of the electronic device is changed while changing the externally exposed area of the display, thereby reducing the size of the BM area to enhance image quality.

According to various embodiments, there may be provided an electronic device comprising a housing, a flexible display wherein an area of the flexible display exposed to an outside of the housing is changeable, a memory storing executable instructions and information about a plurality of transition methods, and at least one processor operatively connected to the memory, wherein the instructions are configured to, when executed, enable the at least one processor to identify a first event triggering a first display operation for displaying an image based on a rotation of the electronic device, identify a second event triggering a second display operation for displaying an image based on a change in the area of the flexible display, identify at least one of first information about a temporal relationship between a first start time of the first display operation and a second start time of the second display operation or second information about a temporal relationship between a first end time of the first display operation and a second end time of the second display operation, select a transition method from among the plurality of transition methods based on at least one of the first information or the second information, and sequentially change a display attribute of an image displayed on the flexible display while at least one of the first display operation or the second display operation is performed based on the selected transition method.

According to various embodiments, there may be provided a method for operating an electronic device, comprising identifying a first event triggering a first display operation for displaying an image based on a rotation of the electronic device, identifying a second event triggering a second display operation for displaying an image based on a size change in an area of a flexible display of the electronic device, identifying at least one of first information about a temporal relationship between a first start time of the first display operation and a second start time of the second display operation or second information about a temporal relationship between a first end time of the first display operation and a second end time of the second display operation, selecting a transition method from among a plurality of transition methods based on at least one of the first information or the second information, and sequentially changing a display attribute of an image displayed on the flexible display while at least one of the first display operation or the second display operation is performed based on the selected transition method.

According to various embodiments, there may be provided an electronic device comprising a housing, a flexible display wherein an area of the flexible display exposed to an outside of the housing is changeable, a sensor for identifying a rotation angle of the electronic device, and at least one processor, wherein the at least one processor is configured to display, on the flexible display, a first image having a first area based on a first screen direction during a first time when the rotation angle of the electronic device is identified to be less than a specific angle using the sensor, display, on the flexible display, a plurality of second images obtained based on the first image during a second time after an event for changing a size of the area exposed to the outside of the housing occurs, and the rotation angle of the electronic device is identified to be the specific angle or more, respective sizes of display of the plurality of second images differing from each other, and respective rotation angles of the plurality of second images differing from each other, and display, on the flexible display, a third image having a third area different from the first area based on a second screen direction, after the second time.

Embodiments of the disclosure are not limited to the foregoing objectives, and other objectives would readily be appreciated by a skilled artisan from the following detailed description taken in conjunction with the accompanying drawings.

According to various embodiments, there may be provided an electronic device and operation method thereof may resize an image while applying an animation effect (or switching effect) to the image when the rotation angle of the electronic device is changed while changing the externally exposed area of the display, thereby reducing the size of the BM area to enhance image quality.

According to various embodiments, there may be provided an electronic device and operation method thereof may obtain and display an image previously resized before termination of the operation of applying an animation effect (or switching effect) when the rotation angle of the electronic device is changed while changing the externally exposed area of the display, thereby reducing the size of the BM area to enhance image quality.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 8B is a view illustrating an example of an operation of displaying an image according to a determined transition method by an electronic device according to various embodiments;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
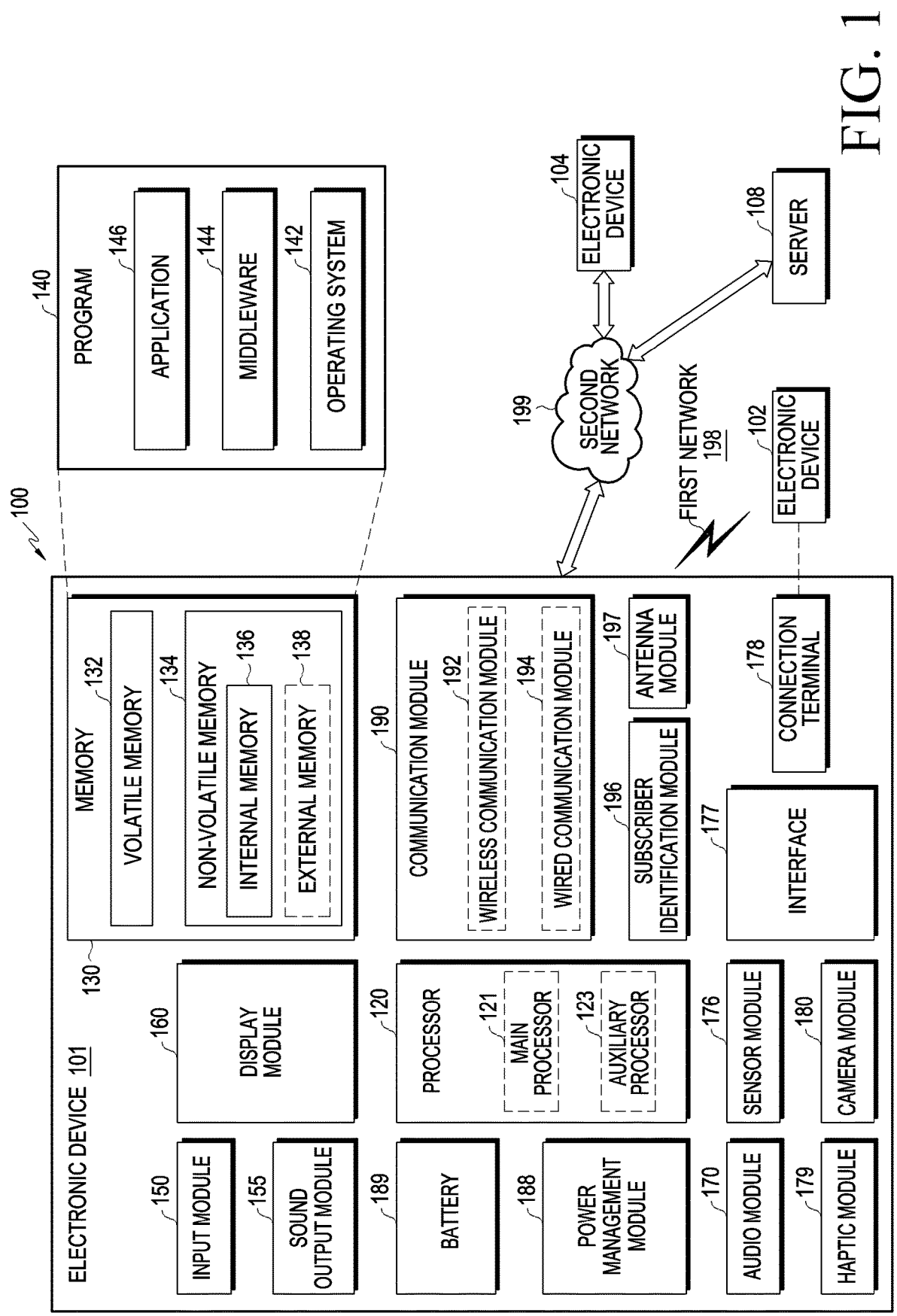
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmittedor received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form ammWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, an electronic device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, various embodiments of an electronic device 200 (e.g., the electronic device 101 of FIG. 1) of the disclosure are described.

Figure 2:
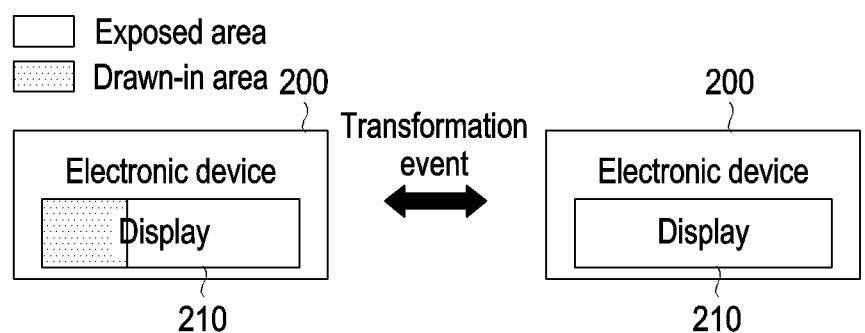
FIG. 2 is a view illustrating an example of an electronic device transformable in association with a display according to various embodiments.

FIG. 2 is a view illustrating an example of an electronic device 200 transformable in association with a display 210 according to various embodiments.

According to various embodiments, referring to FIG. 2, the electronic device 200 may be transformed in association with at least one display 210 provided in the electronic device 200. Transformation in association with the display 210 may mean a change in a size of the area of the display 210 exposed to the outside of the electronic device 200 and a change in a size of the area drawn (or disposed) in the electronic device 200. For example, the area of the display 210 exposed to the outside of the electronic device 101 may be extended (or increased), and/or the area of the display 210 exposed to the outside may be reduced (or decreased). Alternatively, the area of the display 210 drawn in the electronic device 200 may be increased and/or the area of the display 210 drawn in the electronic device 200 may be decreased. The area exposed to the outside may be defined as an area of the display 210 exposed to the outside of a housing (or cover) for forming the exterior of the electronic device 200 (or surrounding the inside of the electronic device 200), and the area drawn in (or received in) may be defined as an area disposed in the inner space of the electronic device 200, formed by the housing (or cover). The housing (or cover) forming the exterior of the electronic device 200 may be implemented in a form in which a single housing or a plurality of housings are combined.

According to various embodiments, the electronic device 200 may include a structure for transforming the electronic device 200 in association with at least one display 210. The structure may be understood as a concept including a structure having a specific shape, implemented (or provided) in the electronic device 200 (e.g., an inner structure including a shape (e.g., having curvature at a portion contacted by the display 210) for guiding (or supporting) the display 210, a housing having an inlet for drawing out the drawn-in area of the display 210 and/or drawing in the externally exposed area), members (e.g., rollers), and an electronic component (e.g., a motor). For example, the structure may be implemented to be able to reciprocate linearly in various directions (e.g., left/right directions, upper/lower directions, or diagonal direction) on a 2D plane and/or reciprocate in various rotational directions (e.g., clockwise/counterclockwise). As another example, the structure may be implemented to allow the area of the display 210, received in the electronic device 200, to be wound multiple times.

According to various embodiments, the type of the electronic device 200 may include a manual type or an auto type. For example, the manual-type electronic device 200 may be defined as an electronic device in which at least a portion of the transformation of the display 200 is performed by the user's external force. In this case, the electronic device 200 may further include a structure (e.g., a hinge member) for assisting in the transformation of the display 200. As another example, the auto-type electronic device 200 may be defined as an electronic device in which the transformation of the display 200 is performed by an electronic component and/or a device (e.g., a motor) provided in the electronic device 200.

According to various embodiments, when an event for transformation (e.g., a slide event) occurs, the electronic device 200 may be transformed in association with the display 210. The event for transformation may include applying a physical force to draw out the display 210 by the user (e.g., a portion of the display 210 is pulled in a specific direction) and/or identifying an input for driving electronic components (e.g., a motor) for drawing out the display 210.

Meanwhile, although it is illustrated that the electronic device 200 includes one display 210, the electronic device 200 may include a plurality of displays and be transformed in association with at least some of the plurality of displays.

Described below are examples of the electronic device including a structure capable of reciprocating the display described in connection with FIG. 2, with reference to FIGS. 3A to 3D. Meanwhile, without limited to the examples of the electronic device 200 described below, various embodiments may apply to electronic devices 200 including various structures capable of changing the externally exposed area and/or drawn-in area of the display 210.

Figure 3A:
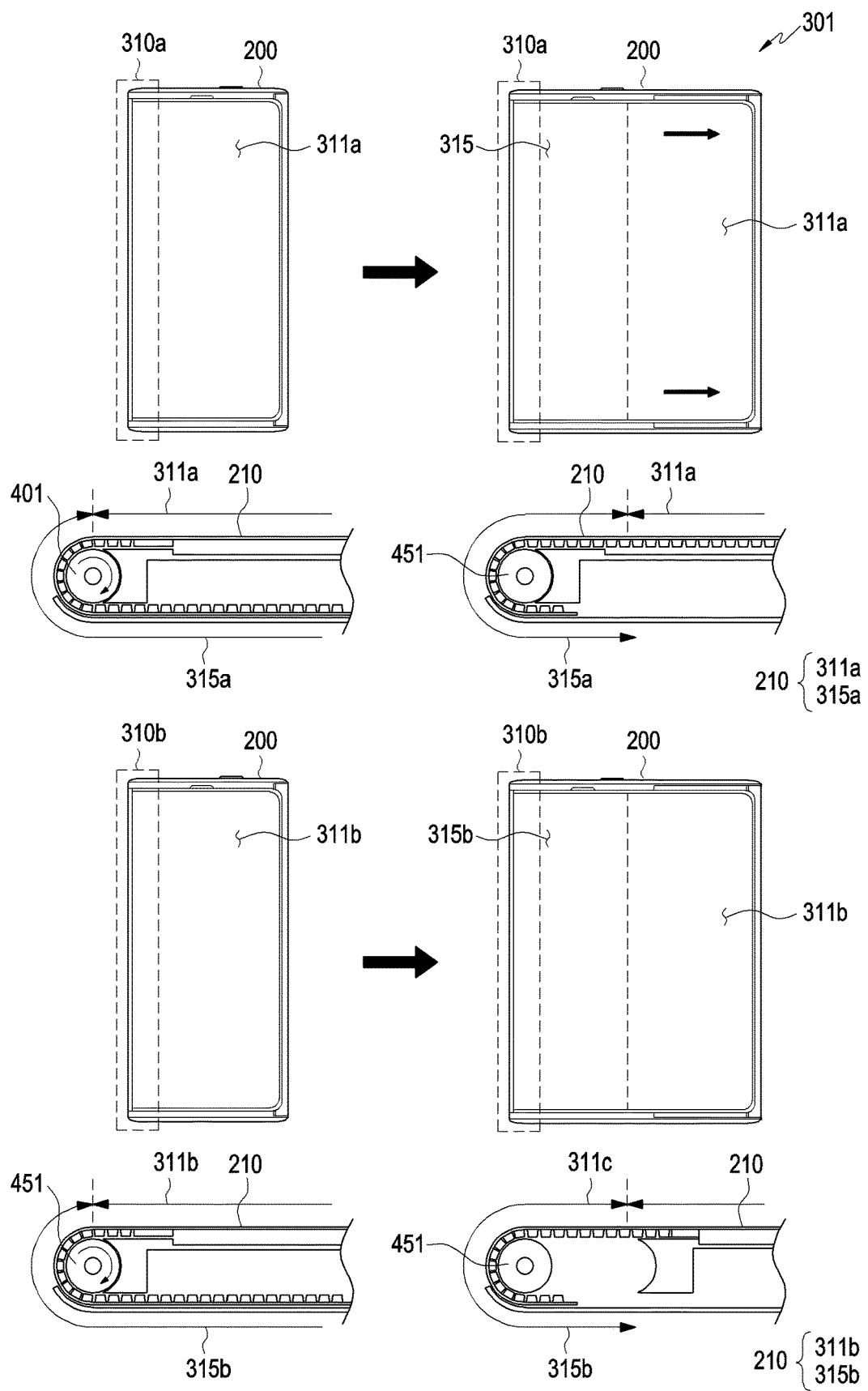
FIG. 3A is a view illustrating examples of an electronic device including a structure capable of extending and/or contracting a display (e.g., a flexible display) in left/right directions according to various embodiments.
Figure 3B:
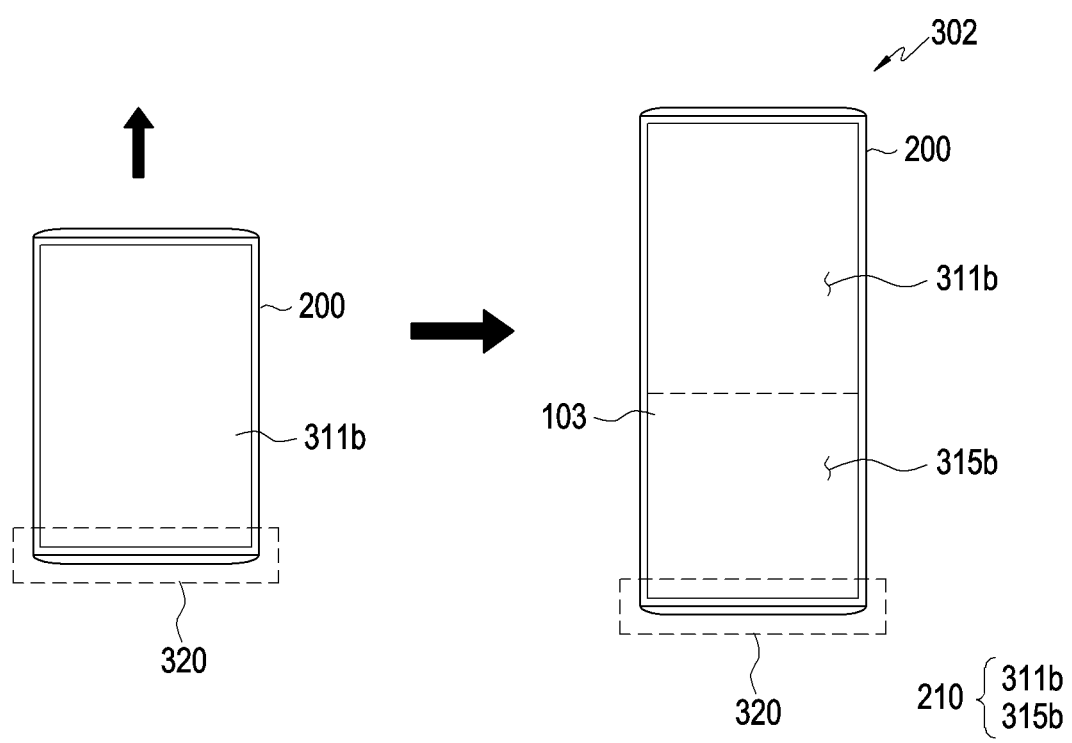
FIG. 3B is a view illustrating an example of an electronic device including a structure capable of extending and/or contracting a display (e.g., a flexible display) in upper/lower directions according to various embodiments.
Figure 3C:
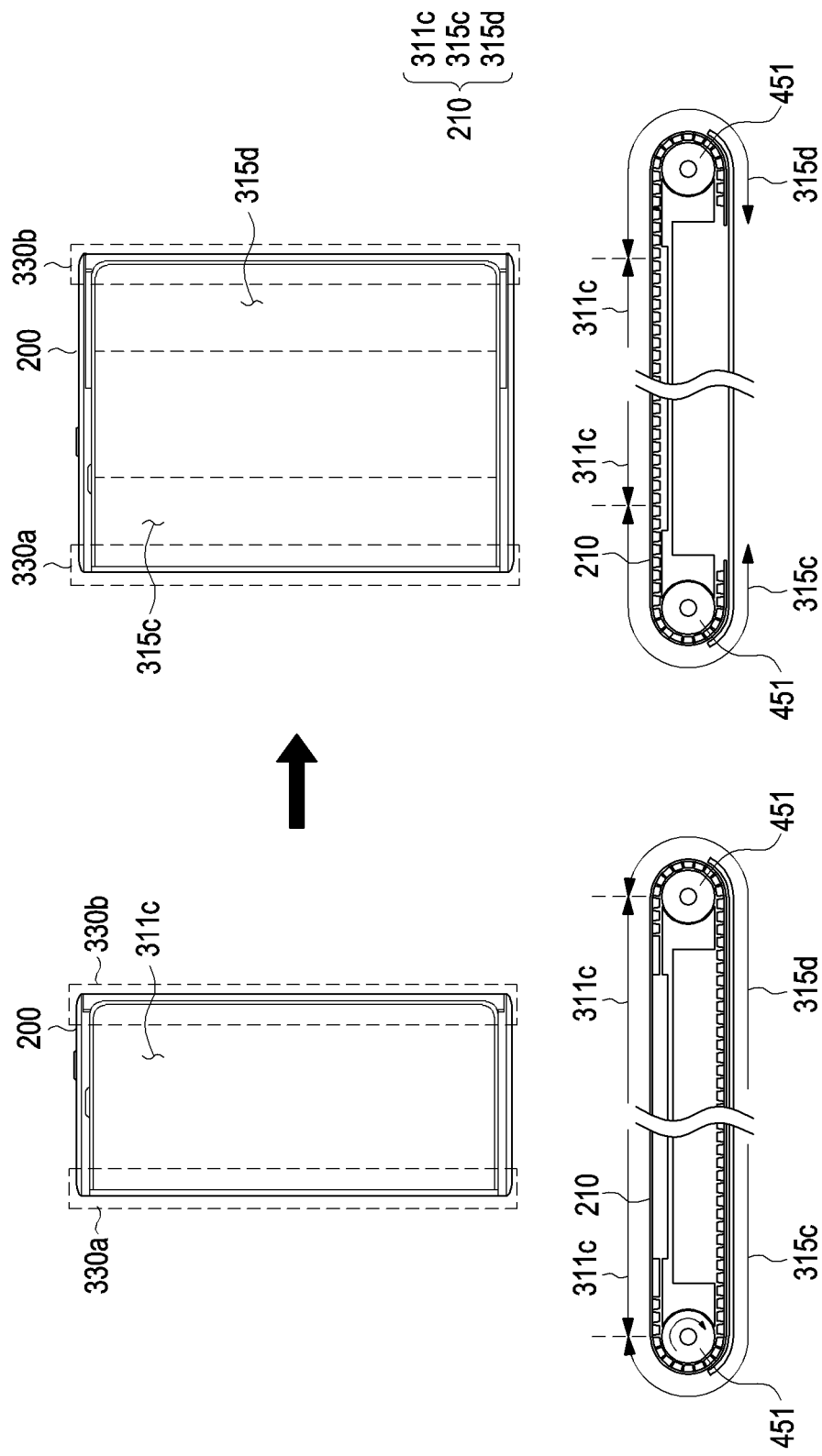
FIG. 3C is a view illustrating an example of an electronic device including a plurality of structures capable of extending and/or contracting a display (e.g., a flexible display) according to various embodiments.
Figure 3D:
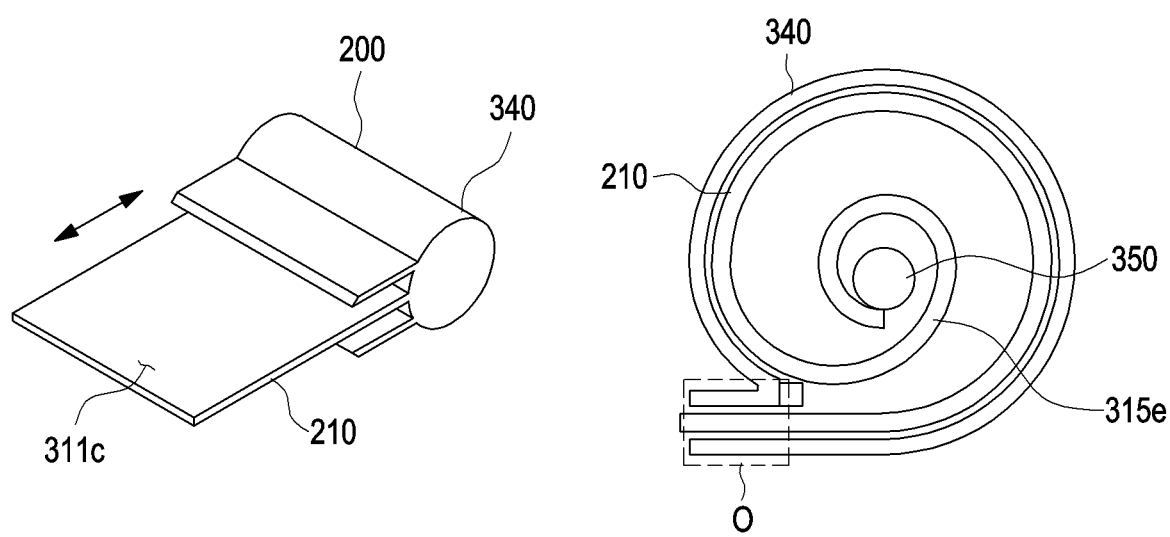
FIG. 3D is a view illustrating an example of an electronic device including a structure capable of reciprocating clockwise/counterclockwise at least a portion of a display (e.g., a flexible display) according to various embodiments.

FIG. 3A is a view illustrating examples of an electronic device 200 including a structure capable of extending and/or contracting a display 210 (e.g., a flexible display) in left/right directions according to various embodiments. FIG. 3B is a view illustrating an example of an electronic device 200 including a structure capable of extending and/or contracting a display 210 (e.g., a flexible display) in upper/lower directions according to various embodiments. FIG. 3C is a view illustrating an example of an electronic device 200 including a plurality of structures capable of extending and/or contracting a display 210 (e.g., a flexible display) according to various embodiments. FIG. 3D is a view illustrating an example of an electronic device 200 including a structure capable of reciprocating clockwise/counterclockwise at least a portion of a display 210 (e.g., a flexible display) according to various embodiments.

According to various embodiments, as shown in FIGS. 3A and 3B, the electronic device 200 may include a structure capable of extending and/or contracting the externally exposed area of the flexible display 210 in the left/right directions or upper/lower directions. For example, the electronic device 200 may include a display 210 (e.g., a flexible display), a structure (or housing) (e.g., a first housing 401 described below) disposed in a partial area 311a, 311b, and 311c of the display 210 and implemented in the electronic device 200 to be reciprocatable, and a moving member (e.g., a roller 451 described below). The electronic device 200 may include an inlet structure in a portion (e.g., left portions 310a and 310b or right portions (not shown), and upper portions (not shown) or lower portions 320) to allow the remaining portions 315a, 315b, and 315c of the flexible display 200, positioned in the electronic device 200, to be drawn out or after drawn out, drawn back in.

In an embodiment, referring to 301 of FIG. 3A, the electronic device 200 may be implemented to include a structure for extending and/or contracting the externally exposed area of the flexible display 210 in the left/right directions as the flexible display 210, along with the structure (e.g., the first housing 401 described below), is moved. For example, referring to 301 of FIG. 3A, as the structure (e.g., the first housing 401 described below) is reciprocated (e.g., reciprocation in the left and right directions) based on the rotation of the roller 451, a portion of the flexible display 210 disposed on the structure is also moved, so that the portion 315a of the flexible display 210 may be drawn out and/or in through the inlet formed in a portion (e.g., the left portion 310a or right portion (not shown) of the electronic device 200) of the electronic device 200. As is described below, the rotation of the roller 451 may be performed by a moving device (e.g., a motor or a shape memory alloy). The moving direction of the structure or the display 210 may be defined as an extending direction or a contracting direction. For example, when the structure (or flexible display 210) is drawn out in a first direction (e.g., the right direction), and the area of the flexible display 210, exposed to the outside of the electronic device 200, is extended (or increased), the first direction may be defined as the extending direction. As another example, as the flexible display 210 is drawn in, the area of the flexible display 210, received in the electronic device 200, may be decreased (or reduced). As an example, the extending direction shown in 301 of FIG. 3A may be the right direction. The extending direction of the right direction may be defined as left to right (LTR).

In an embodiment, referring to 302 of FIG. 3A, the electronic device 200 may be implemented to include a structure for extending and/or contracting the externally exposed area of the flexible display 210 in the left/right directions as the structure (e.g., the first housing 401 described below) is moved. For example, referring to 302 of FIG. 3A, as the structure (e.g., the first housing 401 described below) is reciprocated (e.g., reciprocation in the left and right directions) based on the rotation of the roller 451, the portion 315b of the flexible display 210 may be drawn out and/or in through the inlet formed in a portion (e.g., the left portion 310b or right portion (not shown) of the electronic device 200) of the electronic device 200. The direction from a fixed portion (e.g., a portion of the externally exposed area 311b) of the flexible display 210 to the portion (e.g., the left portion 310b) in which the area of the flexible display 210 is extended may be defined as an extending direction. Conversely, the direction from the portion (e.g., the left portion 310b) in which the area of the flexible display 210 is reduced to the fixed portion (e.g., a portion of the externally exposed area 311b) of the flexible display 210 may be defined as a contracting direction. As an example, the extending direction shown in 302 of FIG. 3A may be the left direction. The extending direction of the left direction may be defined as right to left (RTL).

In an embodiment, referring to 303 of FIG. 3B, the electronic device 200 may be implemented to include a structure for extending and/or contracting the externally exposed area of the flexible display 210 in the upper/lower directions as the flexible display 210, along with the structure (e.g., the first housing 401 described below), is moved. As the structure (e.g., the first housing 401 described below) is reciprocated (e.g., reciprocation in the upper and lower directions) based on the rotation of the roller 451, a portion of the flexible display 210 disposed on the structure is also moved, so that the portion 315c of the flexible display 210 connected to the externally exposed area 311c of the flexible display 210 may be drawn out and/or in through the inlet formed in a portion (e.g., the lower portion 320 of the electronic device 200) of the electronic device 200.

Meanwhile, without limited to those described and/or shown, instead of the roller 451, a structure having a shape (e.g., a shape having a predetermined curvature to support the rounded area of the flexible display 210) to support the draw-in and/or out of the flexible display 210 may be disposed. Further, without limited to those described and/or shown, the display 210 may be implemented as a rigid display 210, rather than the flexible display 210 receivable in the electronic device 200 with a portion thereof rounded, and the housing of the electronic device 200 may be implemented in such a manner that portions 315a, 315b, and 315c of the electronic device 200 are receivable in the electronic device without being rounded.

According to various embodiments, as shown in FIG. 3C, the electronic device 200 may have a structure that allows the flexible display 210 be drawn in or out at least two or more portions. For example, the electronic device 200 may include the flexible display 210, structures (or housing) where the flexible display 210 is disposed and each of which is reciprocatable in one direction, and moving members (e.g., rollers 451). At least a portion 311d of the flexible display 210 may be exposed to the outside of the electronic device 200, and the remaining portions 315d and 317d may be rounded and received in the electronic device 200. Referring to FIG. 3C, a portion (e.g., the left portion 330a of the electronic device 200) and another portion (e.g., the right portion 330b of the electronic device 200) of the electronic device 200 may have inlets through which the remaining portions 315d and 317d of the flexible display 210 may be drawn in and/or out. Based on the rotation of each of the rollers 451, the first structure and the second structure each may be reciprocated (e.g., reciprocation in the left and right directions) and, by the reciprocations, the remaining portions 315d of the flexible display 210 may be drawn in and/or out through each of the inlets formed in the portion (e.g., the left portion 330a of the electronic device 200) and the other portion (e.g., the right portion 330b of the electronic device 200) of the electronic device 200. As the portions 315d of the flexible display 210 is drawn out, the area of the flexible display 210, exposed to the outside of the electronic device 200, may increase and, as the portions 315d and 317d of the flexible display 210 is drawn in, the area of the flexible display 210, received in the electronic device 200, may decrease. Meanwhile, without limited to those described and/or shown, instead of the roller 451, a structure having a shape (e.g., a shape having a predetermined curvature to support the rounded area of the flexible display 210) to support the draw-in and/or out of the flexible display 210 may be disposed. Further, without limited to those described and/or shown, the display 210 may be implemented as a rigid display 210, rather than the flexible display 210 receivable in the electronic device 200 with a portion thereof rounded, and the housing of the electronic device 200 may be implemented in such a manner that portions 315d and 317d of the electronic device 200 are receivable in the electronic device without being rounded.

According to various embodiments, as shown in FIG. 3D, the electronic device 200 may include a structure that allows the portion of the flexible display 210, drawn in the electronic device 200, to be wound multiple times, and allows the portion, wound multiple times, to be drawn out. For example, referring to FIG. 3D, the electronic device 200 may include the flexible display 210 and a housing 340 where at least a portion 315e of the flexible display 210 may be wound multiple times and drawn in. A portion of the housing 340 may include an inlet O where at least the portion 315e of the flexible display 210, wound multiple times, may be drawn out. As the portions of the flexible display 210 are drawn out (e.g., operation of a moving device 350 (e.g., a motor)), the area of the area 311e of the flexible display 210, exposed to the outside of the electronic device 200, may increase and, as the portion 315e of the flexible display 210 is drawn in, the area of the flexible display 210, received in the electronic device 200, may increase.

An example of an electronic device 200 transformable in association with a display according to various embodiments is described below in detail. However, it is apparent to one of ordinary skill in the art that without limited to the auto-type electronic device 200 described below, a manual-type electronic device 200 may be implemented.

Figure 4A:
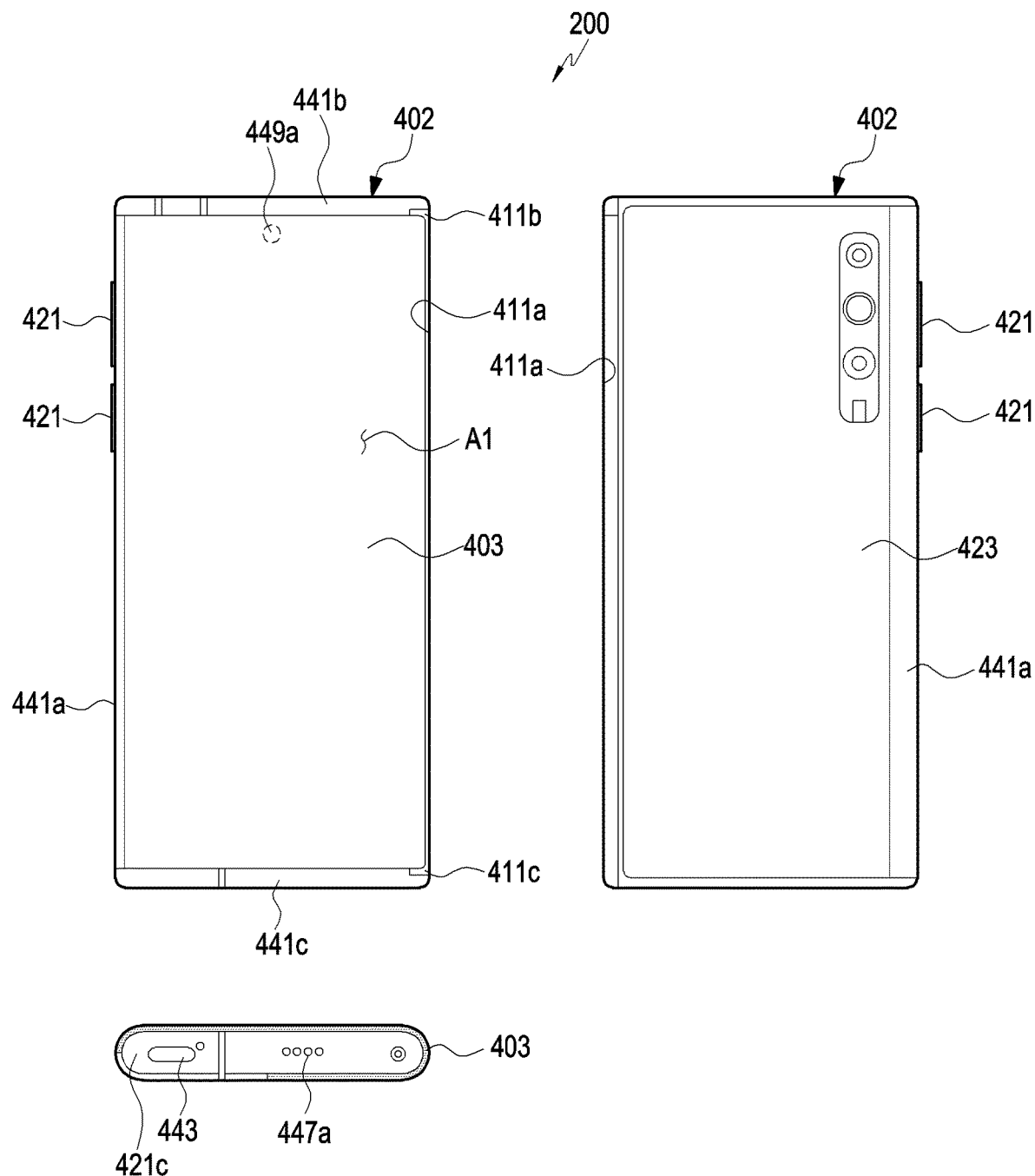
FIG. 4A is a view illustrating an electronic device in a closed state, according to various embodiments of the disclosure.
Figure 4B:
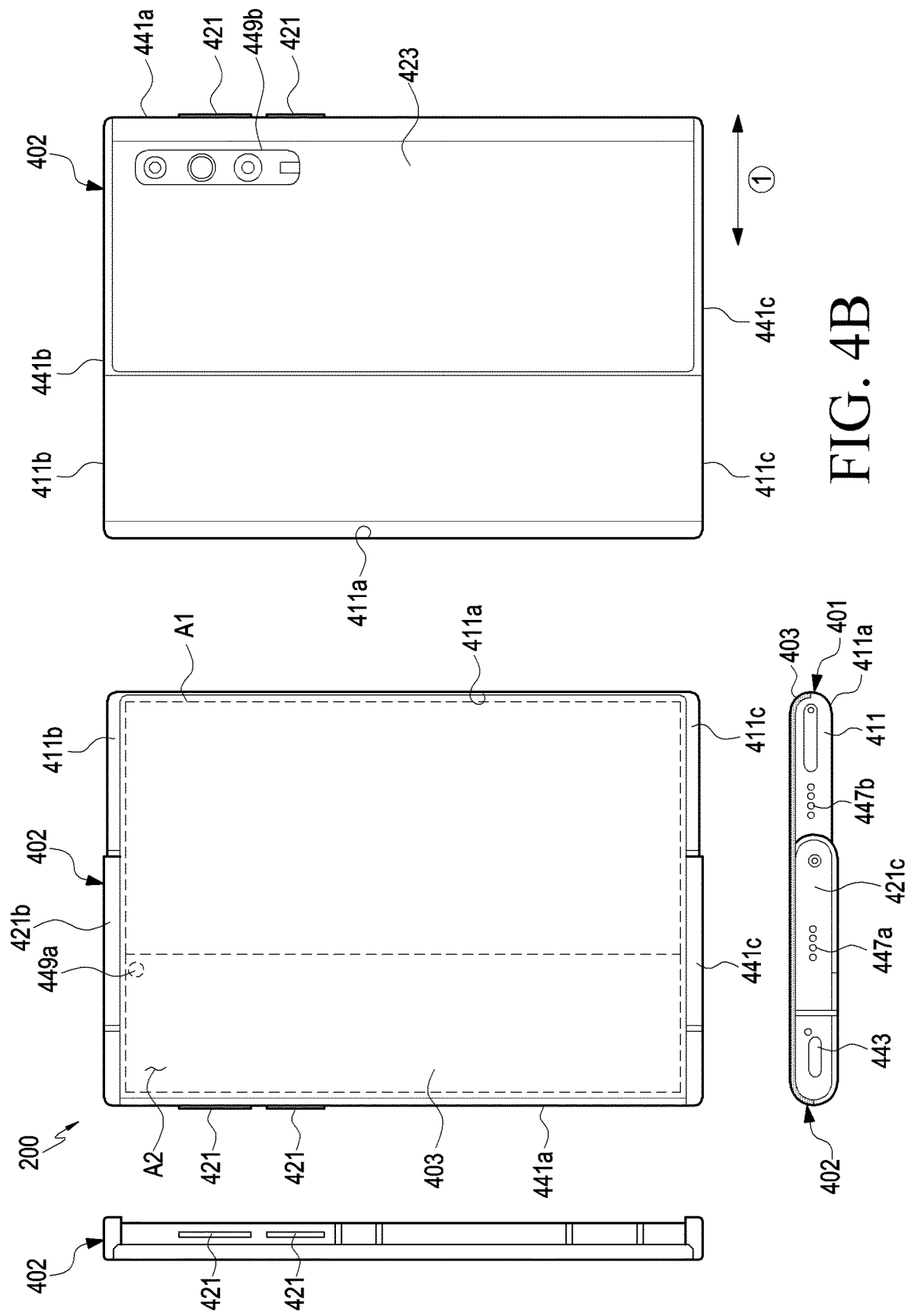
FIG. 4B is a view illustrating an electronic device in an open state, according to various embodiments of the disclosure.

FIG. 4A is a view illustrating an electronic device in a closed state according to various embodiments of the disclosure. FIG. 4B is a view illustrating an electronic device in an open state, according to various embodiments of the disclosure. For example, FIG. 4A is a view illustrating a state in which a second display area A2 is received in a second housing 402. FIG. 4B is a view illustrating a state in which at least a portion of the second display area A2 is visually exposed to the outside of the second housing 402.

The state shown in FIG. 4A may be denoted as a first housing 401 being closed with respect to a second housing 402, and the state shown in FIG. 4B may be denoted as the first housing 401 being open with respect to the second housing 402. According to an embodiment, the "closed state" or "opened state" may be defined as a closed or open state of the electronic device.

Referring to FIGS. 4A and 4B, the electronic device 200 may include a housing 400. The housing 400 may include a second housing 402 and a first housing 401 that is movable with respect to the second housing 402. According to an embodiment, the electronic device 200 may be interpreted as having a structure in which the second housing 402 is slidably disposed on the first housing 401. According to an embodiment, the first housing 401 may be disposed to perform reciprocating motion by a predetermined distance in a predetermined direction with respect to the second housing 402, for example, a direction indicated by an arrow ①. The configuration of the electronic device 200 of FIGS. 4A and 4B may be identical in whole or part to the configuration of the electronic device 101 of FIG. 1.

According to an embodiment, the first housing 401 may be referred to as, e.g., a first structure, a slide part, or a slide housing, and may be disposed to reciprocate on the second housing 402. According to an embodiment, the second housing 402 may be referred to as, e.g., a second structure, a main part, or a main housing. The second housing 402 may receive at least a portion of the first housing 401 and may guide the slide of the first housing 401. According to an embodiment, the second housing 402 may receive various electrical and electronic components, such as a main circuit board or a battery. According to an embodiment, at least a portion (e.g., the first display area A1) of a display 403 may be visually exposed to the outside of the housing 400. According to an embodiment, another portion (e.g., the second display area A2) of the display 403 may be received into the inside of the second housing 402 (e.g., a slide-in motion) or be visually exposed to the outside of the second housing 402 (e.g., a slide-out motion) as the first housing 401 moves (e.g., slides) with respect to the second housing 402. According to an embodiment, a motor, a speaker, a sim socket, and/or a sub circuit board electrically connected with a main circuit board may be disposed in the first housing 401. A main circuit board on which electrical components, such as an application processor (AP) and a communication processor (CP) are mounted may be disposed in the second housing 402.

According to various embodiments, the first housing 401 may include a first plate 411 (e.g., a slide plate). According to an embodiment, the first plate 411 may support at least a portion of the display 403 (e.g., the first display area A1). According to an embodiment, the first plate 411 may include first sidewalls 411*a*, 411*b*, and 411*c* for surrounding at least a portion of the display 403 and/or the multi-bar structure (e.g., the multi-bar structure 413 of FIG. 4C). According to an embodiment, the first sidewalls 411*a*, 411*b*, and 411*c* may extend from the first plate 411. The first sidewalls 411*a*, 411*b*, and 411*c* may include a 1-2th sidewall 411*b*, a 1-3th sidewall 411*c* opposite to the 1-2th sidewall 411*b*, and a 1-1th sidewall 411*a* extending from the 1-2th sidewall 411*b* to the 1-3th sidewall 411*c*. According to an embodiment, the 1-1th sidewall 411*a* may be substantially perpendicular to the 1-2th sidewall 411*b* and/or the 1-3th sidewall 411*c*. According to an embodiment, in the closed state (e.g., FIG. 4A) of the electronic device 200, the 1-2th sidewall 411*b* may face the 2-2th sidewall 441*b* of the second housing 402, and the 1-3th sidewall 441*c* may face the 2-3th sidewall 441*c* of the second housing 402. According to an embodiment, the first plate 411, the 1-1th sidewall 411*a*, the 1-2th sidewall 411*b*, and/or the 1-3th sidewall 411*c* may be integrally formed. According to another embodiment, the first plate 411, the 1-1th sidewall 411*a*, the 1-2th sidewall 411*b*, and/or the 1-3th sidewall 411*c* may be formed as separate housings and be combined or assembled.

According to various embodiments, the second housing 402 may include second sidewalls 441*a*, 441*b*, and 441*c* to surround at least a portion of the first housing 401. According to an embodiment, the second sidewalls 441*a*, 441*b*, and 441*c* may extend from the second plate 441 and/or a cover member 422. According to an embodiment, the second sidewalls 441*a*, 441*b*, and 441*c* may include a 2-2th sidewall 441*b*, a 2-3th sidewall 441*c* opposite to the 2-2th sidewall 441*b*, and a 2-1th sidewall 441*a* extending from the 2-2th sidewall 441*b* to the 2-3th sidewall 441*c*. According to an embodiment, the 2-1th sidewall 441*a* may be substantially perpendicular to the 2-2th sidewall 441*b* and/or the 2-3th sidewall 441*c*. According to an embodiment, the 2-2th sidewall 441*b* may face the 1-2th sidewall 411*b*, and the 2-3th sidewall 441*c* may face the 1-3th sidewall 411*c*. For example, in the closed state (e.g., FIG. 2) of the electronic device 200, the 2-2th sidewall 441*b* may cover at least a portion of the 1-2th sidewall 411*b*, and the 2-3th sidewall 441*c* may cover at least a portion of the 1-3th sidewall 411*c*.

According to various embodiments, the second housing 402 may be formed to be open at one side (e.g., a front face) to receive (or surround) at least a portion of the second housing 401. For example, the first housing 401 may be connected to the second housing 402 while being at least partially surrounded by the 2-1th sidewall 441*a*, the 2-2th sidewall 441*b*, and the 2-3th sidewall 441*c* and may be slid in the direction of arrow while being guided by the second housing 402. According to an embodiment, the cover member (e.g., the cover member 422 of FIGS. 4A to 4C), the 2-1th sidewall 441*a*, the 2-2th sidewall 441*b*, and/or the 2-3th sidewall 441*c* may be formed integrally. According to another embodiment, the cover member 422, the 2-1th sidewall 441*a*, the 2-2th sidewall 441*b*, and/or the 2-3th sidewall 441*c* may be formed as separate housings and be combined or assembled.

According to various embodiments, the second housing 402 may include a rear plate 423. According to an embodiment, the rear plate 423 may form at least a portion of the exterior of the electronic device 200. For example, the rear plate 423 may provide a decorative effect on the exterior of the electronic device 200.

According to various embodiments, the cover member 422 and/or the 2-1th sidewall 441*a* may cover at least a portion of the display 403. For example, at least a portion of the display 403 (e.g., the second display area A2) may be received in the second housing 402, and the cover member 422 and/or the 2-1th side wall 441*a* may cover a portion of the display 403 received in the second housing 402.

According to various embodiments, the electronic device 200 may include a display 403. For example, the display 403 may be interpreted as a flexible display or a rollable display. According to an embodiment, at least a portion of the display 403 (e.g., the second display area A2) may slide based on the sliding movement of the first housing 401. According to an embodiment, the display 403 may include, or be disposed adjacent to, a touch detection circuit, a pressure sensor capable of measuring the intensity (pressure) of a touch, and/or a digitizer that detects a magnetic field-type stylus pen. The configuration of the display 403 of FIGS. 4A and 4B may be identical in whole or part to the configuration of the display module 160 of FIG. 1.

According to various embodiments, the display 403 may include a first display area A1 and a second display area A2. According to an embodiment, the first display area A1 may be an area that is always visible from the outside. According to an embodiment, the first display area A1 may be interpreted as an area that cannot be positioned inside the housing 402. According to an embodiment, the second display area A2 may extend from the first display area A1, and the second display area A2 may be inserted or received in, or visually exposed to the outside of, the second housing 402 as the first housing 401 slides. According to an embodiment, the first display area A1 may be seated on a portion (e.g., the first plate 411) of the first housing 401.

According to various embodiments, the second display area A2 may be substantially moved while being guided by the multi-bar structure (e.g., the multi-bar structure 413 of FIG. 4C) mounted in the first housing 401 and may be thus received in, or visually exposed to the outside of, the second housing 402 or a space formed between the first housing 401 and the second housing 402. According to an embodiment, the second display area A2 may be moved based on the sliding movement of the first housing 401 in the width direction (e.g., the direction indicated by the arrow ①). For example, at least a portion of the second display area A2 may be unfolded or rolled together with the multi-bar structure 413 based on a slide of the first housing 401.

According to various embodiments, when viewed from above the first housing 401, if the first housing 401 moves from the closed state to the open state, the second display area A2 may be gradually exposed to the outside of the second housing 402 to be substantially coplanar with the first display area A1. In an embodiment, the second display area A2 may be at least partially received in the first housing 401 and/or the second housing 402.

According to various embodiments, the electronic device 200 may include at least one key input device 421, a connector hole 443, audio modules 447a and 447b, or camera modules 449a and 449b. Although not shown, the electronic device 200 may further include an indicator (e.g., a light emitting diode (LED) device) or various sensor modules. The configuration of the audio module 447a and 447b and camera modules 449a and 449b of FIGS. 4A and 4B may be identical in whole or part to the configuration of the audio module 170 and the camera module 180 of FIG. 1.

According to various embodiments, the at least one key input device 421 may be positioned in one area of the second housing 402. Depending on the appearance and the state of use, the electronic device 200 may be designed to omit the at least one key input device 421 or to include additional key input device(s). According to an embodiment, the electronic device 200 may include a key input device (not shown), e.g., a home key button or a touchpad disposed around the home key button. According to another embodiment (not shown), at least a portion of the at least one key input device 421 may be disposed on the first housing 401.

According to various embodiments, the connector hole 443 may be omitted or may receive a connector (e.g., a universal serial bus (USB) connector) for transmitting and receiving power and/or data with an external electronic device. Although not shown, the electronic device 200 may include a plurality of connector holes 443, and some of the plurality of connector holes 443 may function as connector holes for transmitting/receiving audio signals with an external electronic device. In the illustrated embodiment, the connector hole 443 is disposed in the 2-3th sidewall 441c, but the present invention is not limited thereto. The connector hole 443 or a connector hole not shown may be disposed in the 2-1th sidewall 441a or the 2-2th sidewall 441b.

According to various embodiments, the audio modules 447a and 447b may include at least one speaker hole 447a and 447b or at least one microphone hole. At least one of the speaker holes 447a and 447b may be provided as an external speaker hole. At least one of the speaker holes 447a and 447b may be provided as a receiver hole for voice call. The electronic device 200 may include a microphone for obtaining sound. The microphone may obtain external sound via the electronic device 200 through the microphone hole. According to an embodiment, the electronic device 200 may include a plurality of microphones to detect the direction of sound. According to an embodiment, the electronic device 200 may include an audio module in which the speaker holes 447a and 447b and the microphone hole are implemented as one hole or may include a speaker without the speaker hole 447a (e.g., a piezo speaker).

According to various embodiments, the camera modules 449a and 449b may include a first camera module 449a and/or a second camera module 449b. The second camera module 449b may be positioned in the second housing 402 and may capture a subject in a direction opposite to the first display area A1 of the display 403. The electronic device 200 may include a plurality of camera modules 449a and 449b. For example, the electronic device 200 may include at least one of a wide-angle camera, a telephoto camera, or a close-up camera. According to an embodiment, the electronic device 200 may measure the distance to the subject by including an infrared projector and/or an infrared receiver. The camera modules 449a and 449b may include one or more lenses, an image sensor, and/or an image signal processor. The electronic device 200 may further include another camera module (first camera module 449a, e.g., a front camera) that captures a subject in a direction opposite to the second camera module 449b. For example, the first camera module 449a may be disposed around the first display area A1 or in an area overlapping the first display area A1. If disposed in an area overlapping the display 403, the first camera module 249a may capture the subject through the display 403.

According to various embodiments, an indicator (e.g., an LED device) of the electronic device 200 may be disposed on the first housing 401 and/or the second housing 402, and the indicator may include a light emitting diode to provide state information about the electronic device 200 as a visual signal. The sensor module (e.g., the sensor module 176 of FIG. 1) of the electronic device 200 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). In another embodiment, the electronic device 200 may include at least one of a gesture sensor, a gyro sensor, an atmospheric pressure sensor, a magnetic sensor, an accelerometer, a grip sensor, a color sensor, an infrared (IR) sensor, a temperature sensor, a humidity sensor, or an illuminance sensor. The configuration of the display 403, audio module 447a and 447b, and camera module 449a and 449b of FIGS. 4A and 4B may be identical in whole or part to the configuration of the display module 160, the audio module 170, and the camera module 180 of FIG. 1.

Figure 4C:
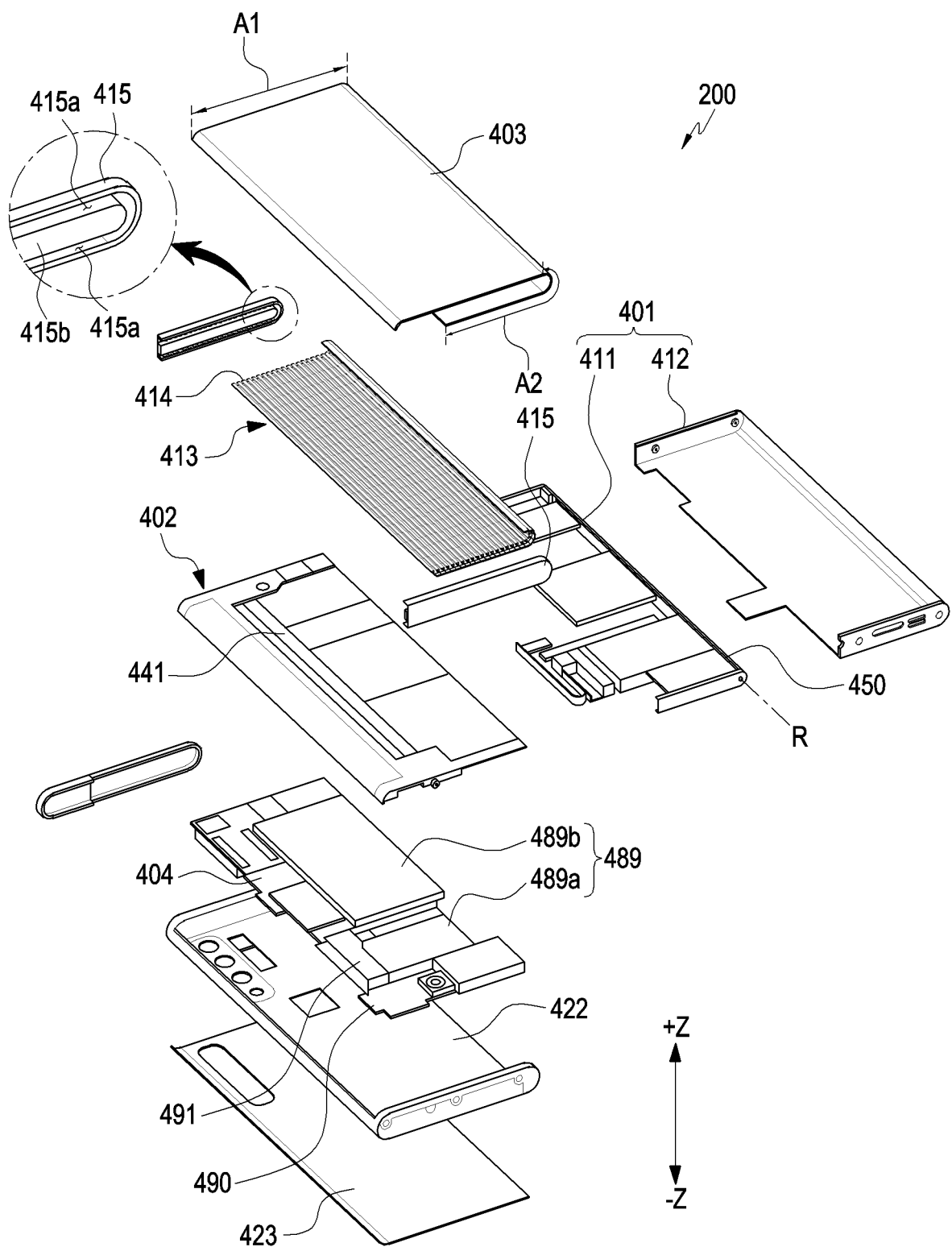
FIG. 4C is an exploded perspective view illustrating an electronic device according to one of various embodiments of the disclosure.

FIG. 4C is an exploded perspective view illustrating an electronic device according to one of various embodiments of the disclosure.

Referring to FIG. 4C, an electronic device 200 may include a first housing 401, a second housing 402, a display 403, and a multi-bar structure 413. A portion (e.g., the second display area A2) of the display 403 may be received in the electronic device 200 while being guided by the multi-bar structure 413. The configuration of the first housing 401, the second housing 402, and the display 403 of FIG. 4C may be identical in whole or part to the configuration of the first housing 401, the second housing 402, and the display 403 of FIGS. 4A and/or 4B.

According to various embodiments, the first housing 401 may include a first plate 411 and a slide cover 412. The first plate 411 and the slide cover 412 may linearly reciprocate in one direction (e.g., the direction of arrow ① in FIG. 4B) while being guided by the second housing 402. According to an embodiment, the first plate 411, along with the slide cover 412, may slide with respect to the second housing 402. For example, at least a portion of the display 403 and/or at least a portion of the multi-bar structure 413 may be disposed between the first plate 411 and the slide cover 412.

According to an embodiment, the first plate 411 may support at least a portion of the display 403 (e.g., the second display area A2). For example, the first plate 411 may include a curved surface 450. The second display area A2 of the display 403 may be positioned on the curved surface 450. According to an embodiment, the first plate 411 may be interpreted as a display support bar (DSB).

According to an embodiment, the slide cover 412 may protect the display 403 positioned on the first plate 411. For example, at least a portion of the display 403 may be positioned between the first plate 411 and the slide cover 412. According to an embodiment, the first plate 411 and the slide cover 412 may be formed of a metal material and/or a non-metal (e.g., polymer) material.

According to various embodiments, the first housing 401 may include a guide rail 415. According to an embodiment, the guide rail 415 may be connected to the first plate 411 and/or the slide cover 412. For example, the guide rail 415, along with the first plate 411 and the second slide cover 412, may slide with respect to the second housing 402.

According to various embodiments, the electronic device 200 may include a multi-bar structure 413. According to an embodiment, the multi-bar structure 413 may support the display 403. For example, the multi-bar structure 413 may be connected with the display 403. According to an embodiment, at least a portion of the display 403 and the multi-bar structure 413 may be positioned between the first plate 411 and the slide cover 412. According to an embodiment, as the first housing 401 slides, the multi-bar structure 413 may move with respect to the second housing 402. In the closed state (e.g., FIG. 4A) of the multi-bar structure 413, most of the structure may be received in the second housing 402. According to an embodiment, at least a portion of the multi-bar structure 413 may move corresponding to the curved surface 450 positioned at the edge of the first plate 411.

According to various embodiments, the multi-bar structure 413 may include a plurality of bars 414 (or rods). The plurality of rods 414 may extend in a straight line and be disposed parallel to the rotational axis R formed by the curved surface 450, and the plurality of rods 214 may be arranged along a direction perpendicular to the rotational axis R (e.g., the direction along which the first housing 401 slides).

According to various embodiments, each rod 414 may pivot around another adjacent rod 414 while remaining parallel with the other adjacent rod 414. According to an embodiment, as the first housing 401 slides, the plurality of rods 414 may be arranged to form a curved shape or may be arranged to form a planar shape. For example, as the first housing 401 slides, a portion of the multi-bar structure 413 facing the curved surface 450 may form a curved surface, and another portion of the multi-bar structure 413 that does not face the curved surface 450 may form a flat surface. According to an embodiment, the second display area A2 of the display 403 may be mounted or supported on the multi-bar structure 413, and in the open state (e.g., FIG. 4B), at least a portion of the second display area A2, along with the first display area A1, may be exposed to the outside of the second housing 402. In the state in which the second display area A2 is exposed to the outside of the second housing 402, the multi-bar structure 413 may substantially form a flat surface, thereby supporting or maintaining the second display area A2 in the flat state. According to an embodiment, the multi-bar structure 413 may be replaced with a bendable integral supporting member (not shown). According to an embodiment, the multi-bar structure 413 may be interpreted as a display supporting multi-bar or articulated hinge structure.

According to various embodiments, the guide rail 415 may guide the movement of the plurality of rods 414. According to an embodiment, the guide rail 415 may include an upper guide rail adjacent to the 1-2th sidewall (e.g., the 1-2th sidewall 411b of FIG. 4A) and a lower guide rail adjacent to the 1-3th sidewall (e.g., the 1-3th sidewall 411c of FIG. 4A). According to an embodiment, the guide rail 415 may include a groove-shaped rail 415a formed inside the guide rail 415 and a protrusion 414b positioned inside the guide rail. At least a portion of the protrusion 415a may be surrounded by the rail 415a. According to an embodiment, the multi-bar structure 413 may be positioned between the upper guide rail and the lower guide rail and may move while remaining engaged with the upper and lower guide rails. For example, upper and/or lower portions of the plurality of rods 414 may slide along the rail 415a while fitted into the rail 415a.

According to an embodiment, when the electronic device 200 is opened (e.g., a slide-out operation), the size of the area where the display 403 is exposed to the outside may be increased. For example, by driving the motor module (e.g., driving for sliding out the display) and/or by an external force provided by the user, the first plate 411 connected with the motor structure 410 may be slid out, and the protrusion 414b inside the guide rail 414 may push out the upper and/or lower ends of the plurality of rods 414. Accordingly, the display 403 received between the first plate 411 and the slide cover 412 may be expanded to the front.

According to an embodiment, when the electronic device 200 is closed (e.g., a slide-in operation), the size of the area where the display 403 is exposed to the outside may be reduced. For example, by driving the motor (e.g., the motor module) (e.g., driving for sliding in the display) and/or by an external force provided by the user, the first plate 411 where the motor is disposed may be slid in, and the outer portion (e.g., a portion other than the protrusion 414b) of the guide rail 414 may push out the upper and/or lower ends of the plurality of rods 414. Accordingly, the expanded display 403 may be received between the first plate 411 and the slide cover 412.

According to various embodiments, the second housing 402 may include a second plate 441, a cover member 422, and a rear plate 423. According to an embodiment, the second plate 441 may support at least a portion (e.g., the first display area A1) of the display 403. The second plate 441 may be disposed between the display 403 and the circuit board 404. According to an embodiment, the cover member 422 may receive components (e.g., the battery 489 (e.g., the battery 189 of FIG. 1) and the circuit board 404) of the electronic device 200 and may protect the components of the electronic device 200. According to an embodiment, the cover member 422 may be referred to as a book cover.

According to various embodiments, a plurality of circuit boards may be received in the second housing 402. A processor, memory, and/or interface may be mounted on the circuit board 404 which is the main board. The processor may include one or more of, e.g., a central processing unit, an application processor, a graphic processing device, an image signal processing, a sensor hub processor, or a communication processor. According to various embodiments, the circuit board 404 may include a flexible printed circuit board type radio frequency cable (FRC). For example, the circuit board 404 may be disposed in the cover member 422 and may be electrically connected with an antenna module (e.g., the antenna module 197 of FIG. 1) and a communication module (e.g., the communication module 190 of FIG. 1).

According to an embodiment, the memory may include, e.g., a volatile or non-volatile memory.

According to an embodiment, the interface may include, e.g., a high definition multimedia interface (HDMI), a universal serial bus (USB) interface, a secure digital (SD) card interface, and/or an audio interface. The interface may electrically or physically connect, e.g., the electronic device 200 with an external electronic device and may include a USB connector, an SD card/multimedia card (MMC) connector, or an audio connector.

According to various embodiments, the electronic device 200 may further include a separate sub circuit board 490 spaced apart from the circuit board 404 in the second housing 402. The sub circuit board 490 may be electrically connected with the circuit board 440 through a flexible circuit board 491. The sub circuit board 490 may be electrically connected with electrical components disposed in an end of the electronic device 200, such as the battery 489 or a speaker and/or a sim socket, and may transfer signals and power.

According to an embodiment, the battery 489 may be a device for supplying power to at least one component of the electronic device 200. The battery 189 may include, e.g., a primary cell which is not rechargeable, a secondary cell which is rechargeable, or a fuel cell. At least a portion of the battery 489 may be disposed on substantially the same plane as the circuit board 404. The battery 489 may be integrally or detachably disposed inside the electronic device 200.

According to various embodiments, the battery 489 may be formed as a single embedded battery or may include a plurality of removable batteries (e.g., the first battery 489a and the second battery 489b). According to an embodiment, when the embedded battery is positioned on the first plate 411, the embedded battery may move as the first plate 411 slides. According to an embodiment, when the embedded battery is positioned on the second plate 441, the embedded battery may be fixedly disposed on the second plate 441, regardless of the sliding movement of the first plate 411. As another example, when the first battery 489a of the removable batteries is positioned on the first plate 411, and the second battery 489b of the removable batteries is fixedly positioned on the second plate 441, only the first battery 489a may move as the first plate 411 slides.

According to various embodiments, the rear plate 423 may substantially form at least a portion of the exterior of the second housing 402 or the electronic device 200. For example, the rear plate 423 may be coupled to the outer surface of the cover member 422. According to an embodiment, the rear plate 423 may be integrally formed with the cover member 422. According to an embodiment, the rear plate 423 may provide a decorative effect on the exterior of the electronic device 200. The second plate 441 and the cover member 422 may be formed of at least one of a metal or a polymer, and the rear plate 423 may be formed of at least one of metal, glass, synthetic resin or ceramic. According to an embodiment, the second plate 441, the cover member 422 and/or the rear plate 423 may be formed of a material that transmits light at least partially (e.g., the auxiliary display area). For example, in a state in which a portion of the display 403 (e.g., the second display area A2) is received in the electronic device 200, the electronic device 200 may output visual information using the second display area A2. The auxiliary display area may be a portion of the second plate 441, the cover member 422, and/or the rear plate 423 in which the display 403 received in the second housing 402 is positioned.

Hereinafter, an example of an operation based on a slide event and/or a rotation event of the electronic device 200 described above in connection with FIGS. 2, 3A to 3D, and 4A to 4C according to various embodiments is described.

Figure 5:
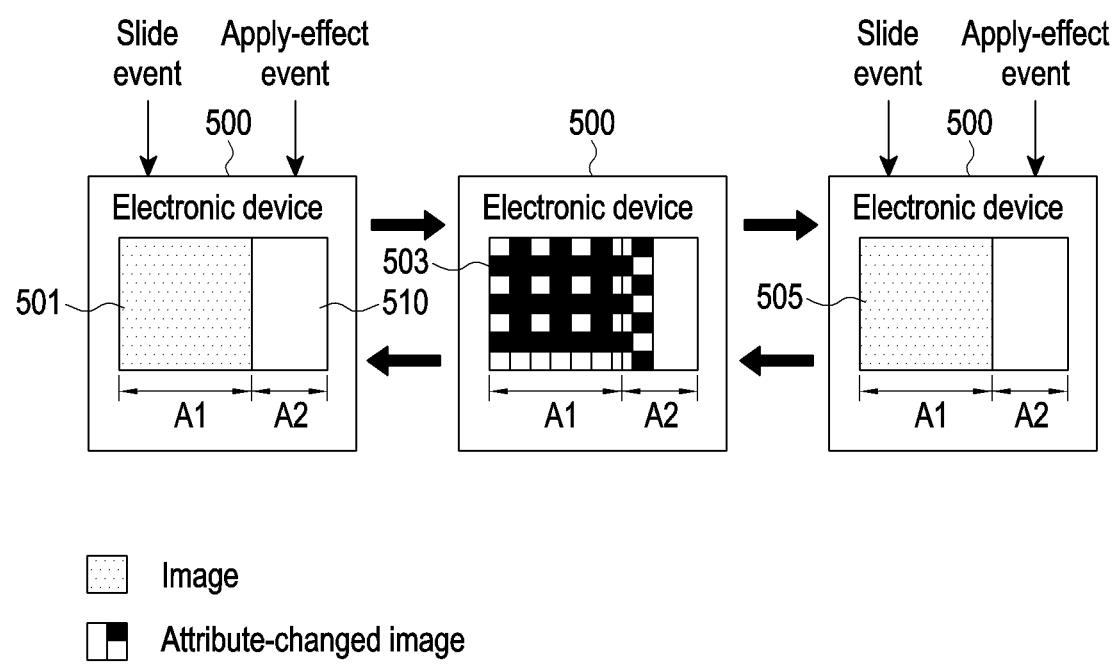
FIG. 5 is a view illustrating an example of an operation based on a slide event and/or a rotation event of an electronic device according to various embodiments.

FIG. 5 is a view illustrating an example of an operation based on a slide event and/or a rotation event of an electronic device 500 according to various embodiments.

According to various embodiments, referring to FIG. 5, an electronic device 500 may perform the operation of displaying an image 501 or 505 on the display 510 in a specific graphic processing scheme (or specific display scheme), based on an occurrence of a slide event (or a resizing event) and/or an occurrence of an apply-effect event. The image 501 or 505 is displayed on the display 510 and may be understood by such a term as a screen, content, and/or view, instead of image.

For example, the slide event may means an event that triggers a resizing of the externally exposed area (e.g., the first display area A1) of the housing (e.g., the first housing 401 and/or the second housing 402) of the display 510 of the electronic device 500. As another example, the slide event may mean an event that triggers an image display operation (hereinafter, 'slide display operation') of the electronic device 500 based on a display operation (e.g., slide display operation) to resize the image 501 being displayed on the display 510 to correspond to the changed size of the externally exposed area (e.g., the first display area A1) while the externally exposed area (e.g., the first display area A1) of the housing (e.g., the first housing 401 and/or second housing 402) of the display 510 of the electronic device 500 is resized (e.g., enlarged and/or reduced). For example, when the type of the electronic device 500 is a manual type, the electronic device 500 may identify an occurrence of the event based on identifying an electrical value generated by the force of pulling the display 510. As another example, when the type of the electronic device 500 is an auto type, the electronic device 500 may identify an occurrence of a slide event based on at least one of detecting an input to a hardware key and/or software key (e.g., an icon and/or object displayed on the display 510) that triggers a slide, receiving a voice input to instruct a slide, or recognizing a preset motion of the electronic device 500 (e.g., holding and shaking the electronic device 500).

For example, the apply-effect event may mean an event that triggers to switch the image 501 being displayed on the display 510 to a different image. As another example, the apply-effect event may mean an event that triggers an image display operation (hereinafter, an apply-and-display-effect operation) to apply a specific animation effect (or specific switching effect) to the image 501 being displayed on the display 510 to change the display attribute (e.g., degree of rotation, size, color, blur, or sharpness, resolution, or saturation) of the image 501. For example, when the state of the electronic device 500 (e.g., the rotation angle of the electronic device 500) is changed and/or meets a preset state, when a motion (or gesture) (e.g., motion in the upper/lower/left/right direction) of the electronic device 500 occurs and/or a preset motion occurs, when a specific application is executed, and/or when a message is received, the electronic device 500 may identify an occurrence of the apply-effect event but, without limited to those described, the apply-effect event may occur in various cases where a screen switch is required. The animation effect (or switching effect) is an effect that is applied to the image 501 displayed during a specific period and may include, e.g., the effect of moving the image 501 (e.g., rotating or moving the image 501), gradually changing the color and/or brightness of the image 501, wiping the image 501, and/or flickering the image 501 but, without limited to those described, may further include other known animation effects (or switching effects) and thus a detailed description thereof is omitted.

According to various embodiments, when the slide event and the apply-effect event simultaneously occur, the electronic device 500 may perform the operation of displaying an attribute-changed image 503 by applying the animation effect to the image 501 while resizing the displayed image 501 based on the occurrence of the slide event. The size may denote the size in which the image 501 is displayed. For example, the size may denote the number of pixels included in the image 501 displayed on the display. For example, when the slide event and the apply-effect event simultaneously occur, the electronic device 500 may perform the operation of sequentially changing the image display attribute in a specific transition method determined based on information about the start times or end times of the display operations (e.g., slide display operation and apply-and-display-effect operation) performed based on the occurrence of each event. For example, the image display attribute means the visual attribute of the image displayed on the display 510 and may include, e.g., at least one of the size in which the image is displayed (or size), the degree of rotation of the image, color and/or brightness of the image, color, blur, and/or sharpness, resolution, or saturation but, without limited to those described, may further include the image display attributes that are changed by at least one of the slide display operation or resize-and-display operation performed based on the transition method.

Hereinafter, for convenience of description, a rotation event that occurs when the angle of rotation of the electronic device 500 is changed (or a preset angle is met), as an example of the above-described apply-effect event, is described. However, without limited to those described, the occasion where the rotation event occurs in the following description may be understood as various examples in which the above-described apply-effect event occurs.

Hereinafter, an example (hereinafter, electronic device 600) of configurations of the electronic device 200 described above in connection with FIGS. 2, 3A to 3D, and 4A to 4C is described according to various embodiments. Since the description of the electronic device 100 described above in connection with FIG. 1 and the electronic device 200 described in connection with FIGS. 2, 3A to 3D, 4A to 4C, and 5 may be applied to the description of the electronic device 600, no duplicate description is given below.

Figure 6:
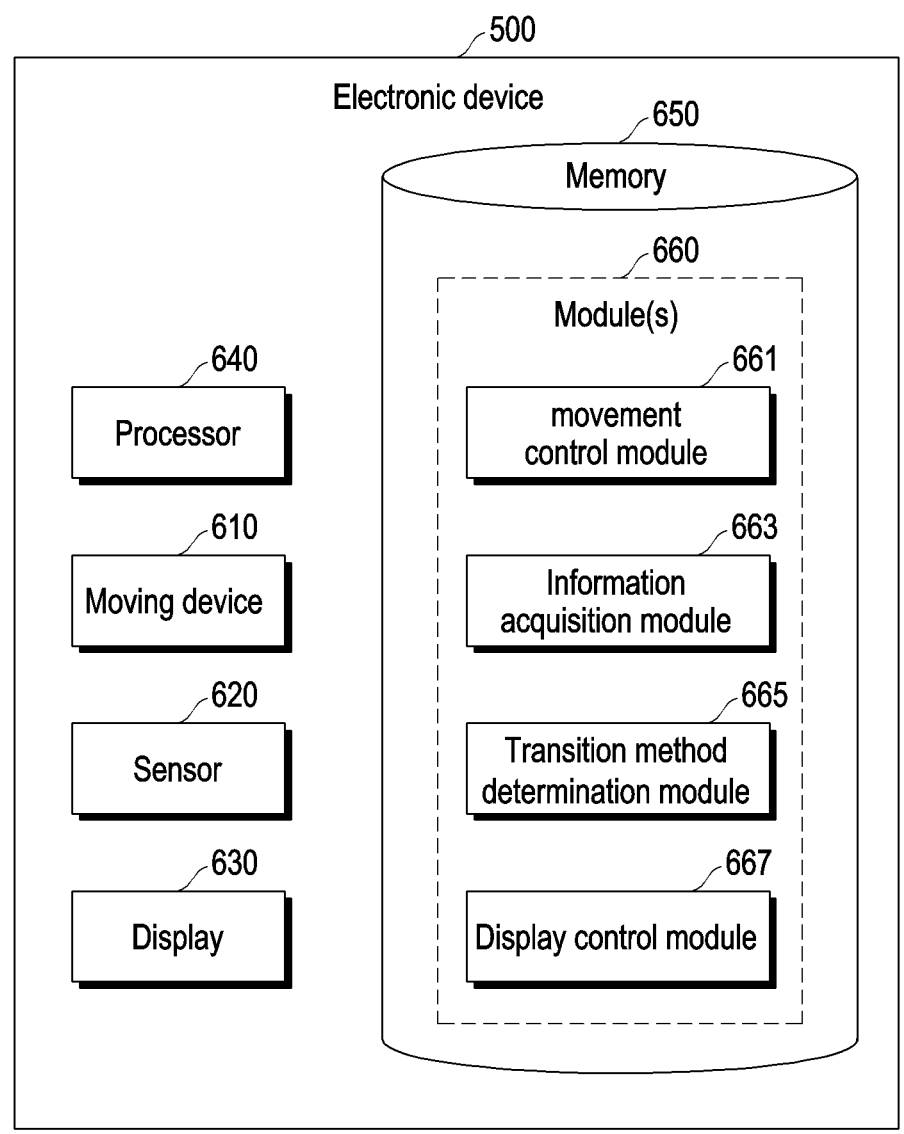
FIG. 6 is a view illustrating an example of a configuration of an electronic device according to various embodiments.

FIG. 6 is a view illustrating an example of a configuration of an electronic device 600 according to various embodiments. FIG. 6 is described below with reference to FIGS. 7A, 7B, and 9.

Figure 7A:
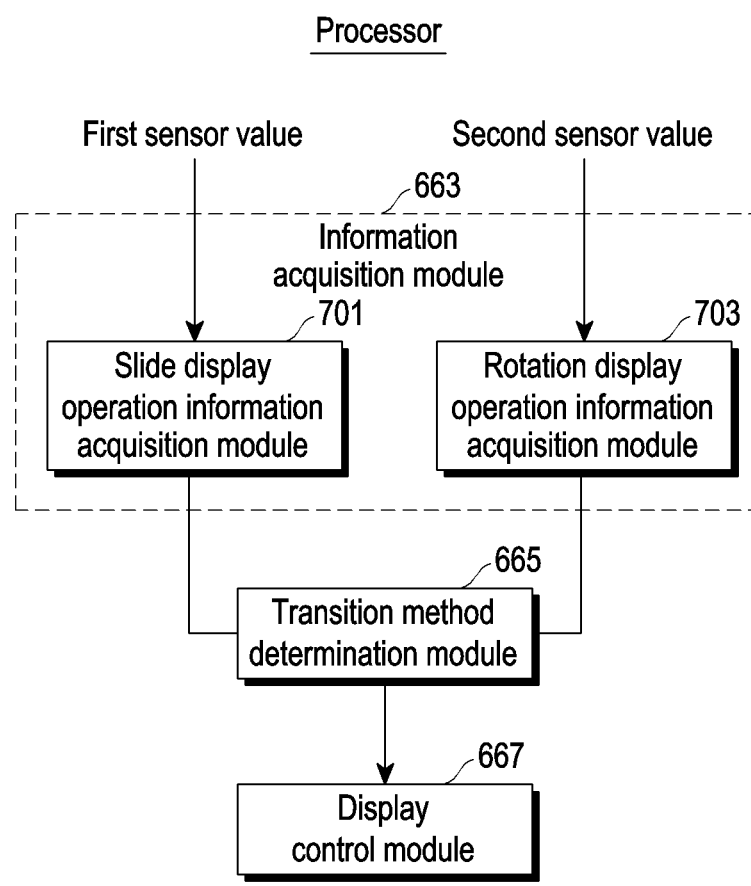
FIG. 7A is a view illustrating an example of a graphic processing operation of an electronic device according to various embodiments.
Figure 7B:
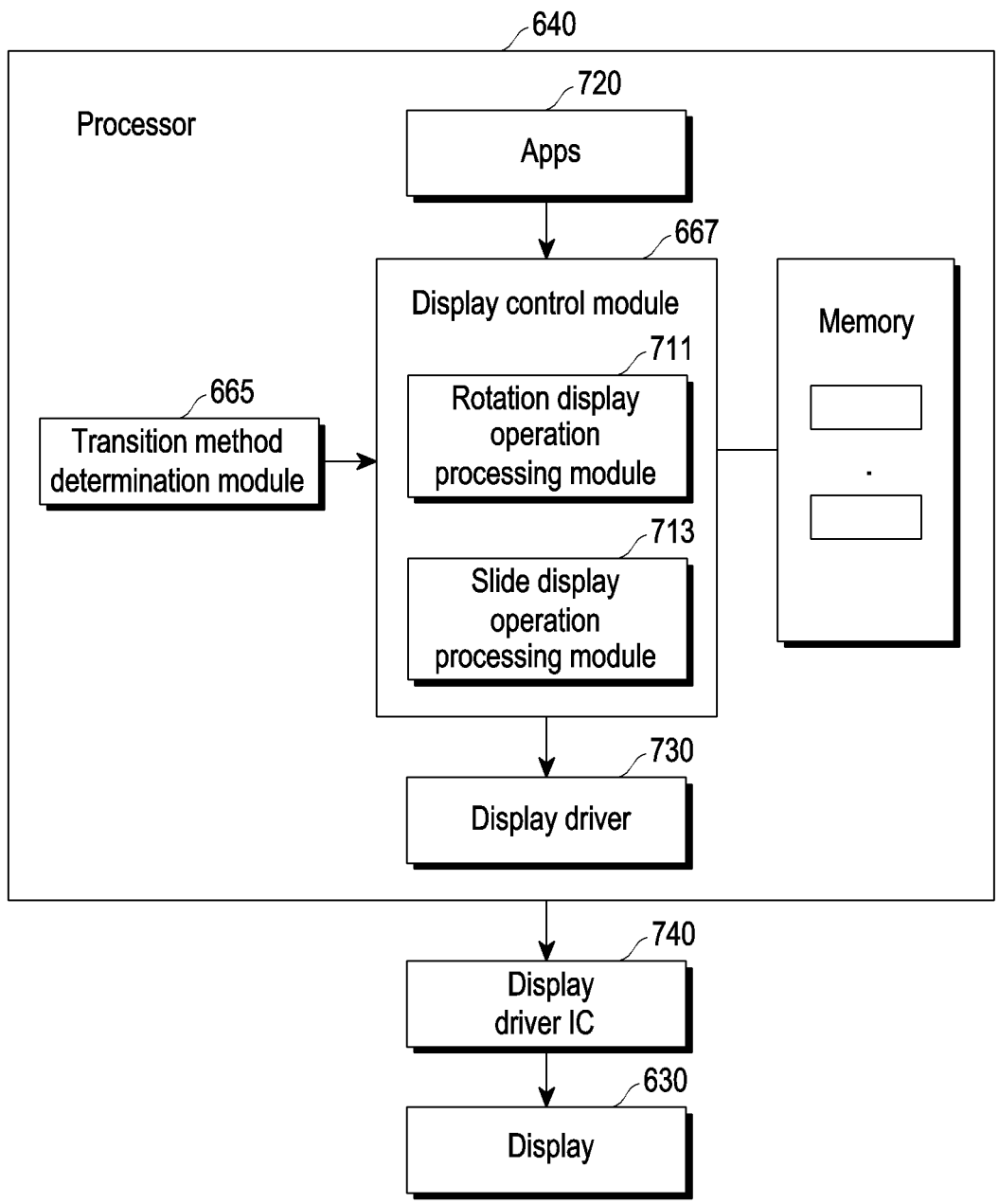
FIG. 7B is a view illustrating an example of a transition operation of an electronic device according to various embodiments.
Figure 7B:
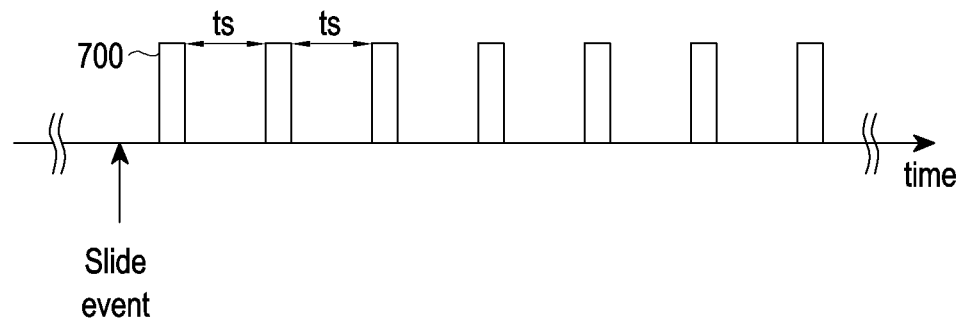
Figure 8A:
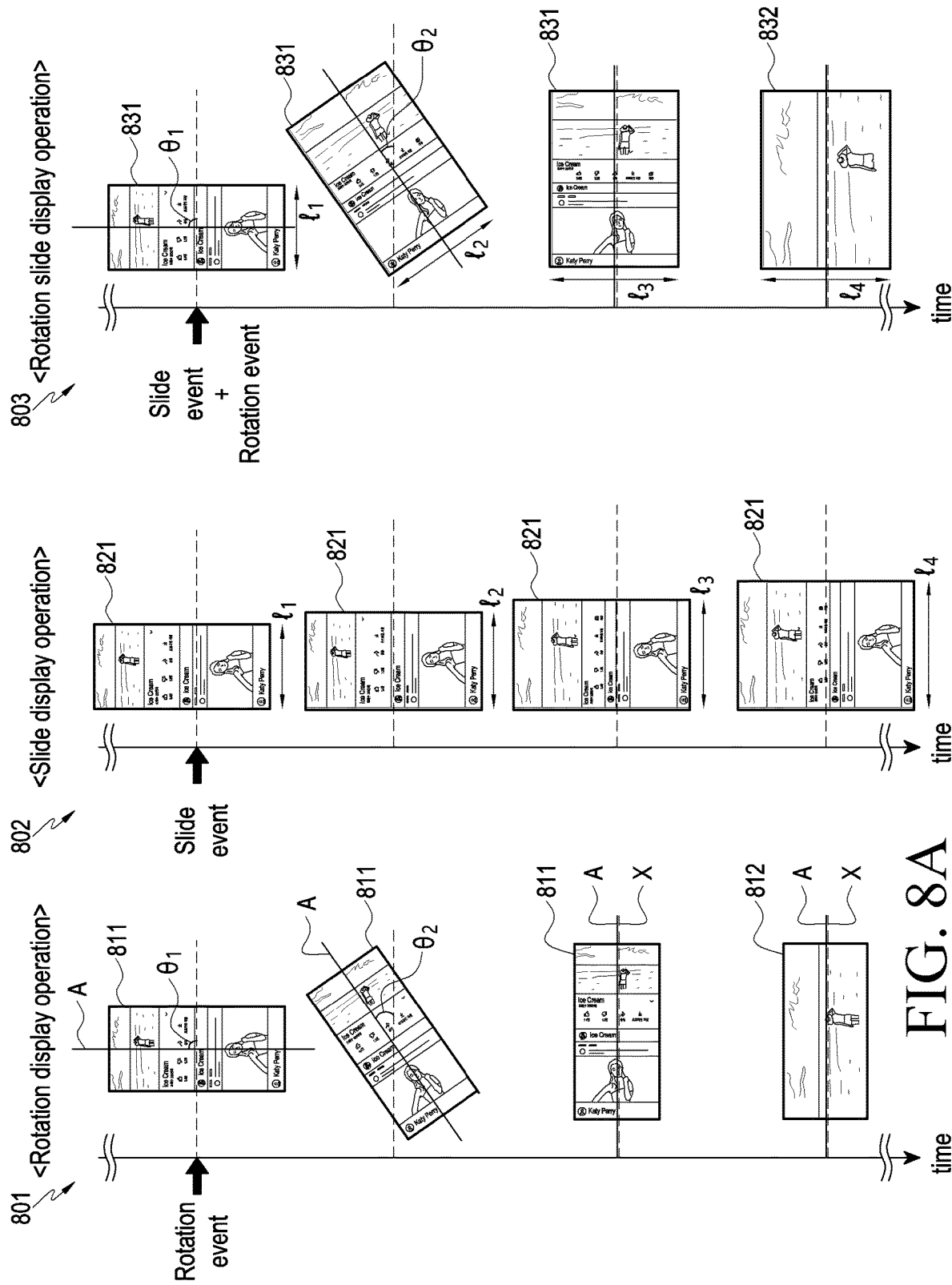
FIG. 8A is a view illustrating an example of an operation of determining a transition method based on information associated with graphic processing by an electronic device according to various embodiments.

FIG. 7A is a view illustrating an example of a graphic processing operation of an electronic device 600 according to various embodiments. FIG. 7B is a view illustrating an example of a transition operation of an electronic device 600 according to various embodiments. FIG. 8A is a view illustrating an example of an operation of determining a transition method based on information associated with graphic processing by an electronic device 600 according to various embodiments. FIG. 8B is a view illustrating an example of an operation of displaying an image according to a determined transition method by an electronic device 600 according to various embodiments.

According to various embodiments, the electronic device 600 may include a moving device 610, a sensor 620, a display 630, a processor 640, and a memory 650 including a plurality of modules 660 (e.g., a movement control module 661, an information acquisition module 663, a transition method determination module 665, and a display control module 667) as shown in FIG. 6. Without being limited to the components illustrated in FIG. 6, the electronic device 600 may be implemented to include more or fewer components. For example, the electronic device 600 may be implemented to further include components of the electronic device 101 described with reference to FIG. 1.

According to various embodiments, the moving device 610 may include devices for sliding (e.g., slide in or slide out) the display 630 (or the first housing 401 and/or second housing 402 of FIGS. 4A to 4C). For example, the moving device 610 may include a motor rotated in one direction (e.g., clockwise or counterclockwise) so that the first plate 411 and/or the slide cover 412 are moved in one direction. In addition to the motor, the moving device 610 may include various types of electronic devices 200 for moving the display 630 (or the first housing 401 and/or the second housing 402 of FIGS. 4A to 4C). For example, the electronic device 200 may include a hinge device implemented with a shape memory alloy, which changes its shape as heat and/or power is applied to move the structure.

According to various embodiments, the sensor 620 may include a first sensor that returns an electrical value (e.g., current value and/or voltage value) generated according to a slide of the display 630 when the display 630 (or the first housing 401 and/or second housing 402 of FIGS. 4A to 4C) slides (e.g., slide in or slide out). The electronic device 600 (e.g., processor 640) may identify information associated with the slide (or the area of the display 630 exposed to the outside of the housing) based on the electrical value obtained using the first sensor. For example, the slide-associated information may include at least one of information about whether the slide of the display 630 starts or ends, information about the state (e.g., open state, closed state, or intermediate state) of the electronic device 200 associated with the slide, information about the sliding distance, information about the externally exposed area of the electronic device 600 by the slide, or information about the screen extension ratio. For example, the first sensor may be implemented as a sensor 620 (e.g., the image sensor or an optical sensor) for detecting specific content (e.g., an RGB color) displayed in a partial area of the received portion (e.g., the second area A2) of the display 630, identify a change in the detection state of the specific content (e.g., a movement of the content or non-display of the content) when the display 630 is moved, and return an electrical value indicating the start of the sliding movement. In this case, if the sliding movement is finished, the electronic device 200 may redisplay specific content in the partial area of the received portion (e.g., the second area A2) of the display 630, and the first sensor may detect the redisplayed content and return an electrical value indicating the end of the sliding movement. As another example, the first sensor may include a sensor that detects an electromagnet which is attached when the sliding movement of the display 630 is started or ended and, when the sliding movement starts or ends, return an electrical value indicating the start or end. As another example, the first sensor may be implemented as a sensor (e.g., a pressure sensor, a resistance sensor, or the like) for detecting a dielectric that is moved when the display 630 slides and may return an electrical value indicating the sliding distance based on the moving distance of the dielectric. As another example, the first sensor may return an electrical value according to the driving (e.g., rotation) of the moving device 610 (e.g., a motor). Meanwhile, without limited to those described, rather than using the first sensor, the electronic device 200 may identify information associated with the sliding of the display 630 based on a signal for controlling a motor to be described below.

According to various embodiments, the sensor 620 may include a second sensor for obtaining information than the state (e.g., the rotation angle, grip state, or mounted state) of the electronic device 200. For example, the second sensor may include a grip sensor. The electronic device 200 may identify whether the electronic device 200 is gripped based on the value identified by the grip sensor. For example, the second sensor may include an accelerometer (e.g., a 6-axis sensor) (or a tilt sensor). The electronic device 200 may identify the rotation angle of the electronic device 200 based on the value identified by the accelerometer.

According to various embodiments, the display 630 may be disposed so that the area exposed to the outside of the electronic device 200 and the area drawn in the electronic device 200 are changeable as described in connection with FIGS. 2, 3A to 3D, and 4A to 4C. The display 630 may be implemented as a flexible display but may also be implemented as a rigid display as described above.

According to various embodiments, the processor 640 may include at least one of an application processor (AP), a central processing unit (CPU), a graphic processing unit (GPU), a display processing unit (DPU), or a neural processing unit (NPU). The operations of the modules 660 described below may be understood as the operations of the processor 640, performed by the execution of the modules (e.g., the movement control module 661, the information acquisition module 663, the transition method determination module 665, and the display control module 667) stored in the memory 650. At least some of the modules 660 (e.g., the movement control module 661, the information acquisition module 663, the transition method determination module 665, and the display control module 667) stored in the memory 650 may be implemented (e.g., executed) in software, firmware, or in a combination of at least two thereof. For example, the modules 660 may be implemented in the form of an application, program, computer code, instructions, routines, or processes, which are executable by the processor 640. Accordingly, if the modules 660 (e.g., the movement control module 661, the information acquisition module 663, the transition method determination module 665, and the display control module 667) are executed by the processor 640, the modules 660 (e.g., the movement control module 661, the information acquisition module 663, the transition method determination module 665, and the display control module 667) may enable the processor 640 to perform operations (or function that the modules may provide) associated with the modules 660. Therefore, when it is described below that a specific module performs an operation, it may be interpreted as the processor 640 performing the operation as the specific module is executed. Alternatively, the modules 660 (e.g., the processor 640) may be implemented as part of a specific application. Or, without being limited to what is described and/or shown, each of the modules 660 may be implemented as a separate hardware device (e.g., a processor or control circuit) from the processor 640. Meanwhile, at least some of the operations of the modules 660 described below may be implemented as a separate module instead of the corresponding module.

According to various embodiments, the movement control module 661 may drive the moving device 610 based on an occurrence of an event (e.g., slide event) to change the area of the externally exposed area (e.g., the first display area A1) of the housing (e.g., the first housing 401 and/or second housing 402) of the display 630 of the electronic device 600.

According to various embodiments, the information acquisition module 663 may be implemented to obtain information associated with a slide display operation performed by an occurrence of a slide event and/or information associated with a rotation display operation performed by an occurrence of a rotation event, based on the value received from the sensor 620 (e.g., the first sensor and/or the second sensor). For example, the information associated with the rotation display operation may include information about at least one of the start time or end time of the rotation display operation. As another example, the information associated with the slide display operation may include information about at least one of the start time or end time of the slide display operation. The information acquisition module 663 may be implemented to transfer at least one of the obtained information associated with the slide display operation or the obtained information associated with the rotation display operation to the transition method determination module 665.

According to various embodiments, referring to FIG. 7A, the information acquisition module 663 (e.g., the slide display operation information acquisition module 701) may obtain slide state information (or information associated with a change in the externally exposed area (e.g., the first display area A1) of the flexible display 630) based on the value received from the first sensor and identify at least one of the start time or end time of the slide display operation based on the obtained slide state information. For example, the slide state information may include at least one of the time when the slide (e.g., slide-in or slide-out) starts, the slide speed, the time when the slide ends, or the time during which the slide is performed. The information acquisition module 663 (e.g., the slide display operation information acquisition module 701) may obtain the slide state information based on obtaining an interrupt 700 based on the value received from the first sensor per length sensing period ts.

As an example, the information acquisition module 663 (e.g., the slide display operation information acquisition module 701) may identify at least one of the time when motor driving is performed or the time when the slide (e.g., slide-in or slide-out) of the flexible display 630 starts based on the value identified from the sensor 620 and determine that the identified time is the start time of the slide display operation.

As another example, the information acquisition module 663 (e.g., the slide display operation information acquisition module 701) may identify a time after the time required for the slide, identified based on the rotation speed of the motor from the start time of the slide display operation and determine that the identified time is the end time of the slide display operation. For example, the information acquisition module 663 (e.g., the slide display operation information acquisition module 701) may identify the time required for the slide, based on dividing the slide distance of the display 630 by the moving speed corresponding to the rotation speed of the motor. When the motor speed is preset, the information acquisition module 663 (e.g., the slide display operation information acquisition module 701) may include a predetermined time after the start time of the slide display operation and determine that the identified time is the end time of the slide display operation. For example, the preset time may be obtained based on the computation of dividing the distance to which the display 630 is to slide by the slide speed corresponding to the preset motor speed and/or from information pre-stored in the electronic device 600.

Referring to FIG. 7B, according to various embodiments information acquisition module 663 (e.g., the rotation information acquisition module 663) may obtain rotation state information based on the value received from the sensor 620 (e.g., second sensor) and identify at least one of the start time or end time of the rotation display operation based on the obtained rotation state information. For example, the rotation state information may include at least one of the current rotation angle of the electronic device 600 or the rotation angle speed of the electronic device 600.

As an example, the information acquisition module 663 (e.g., the rotation information acquisition module 663) may identify the time when the obtained current rotation angle reaches a start angle (or specific angle) at which a rotation event is triggered and determine that the identified time is the start time of the rotation display operation.

As another example, the information acquisition module 663 (e.g., the rotation display operation information acquisition module 703) may identify a time after the time of performing the rotation display operation from the identified start time of the rotation display operation and determine that the identified time is the end time of the rotation. In an embodiment, the information acquisition module 663 (e.g., the rotation display operation information acquisition module 703) may identify a predetermined execution time (e.g., 300 ms) of the rotation display operation after the identified start time of the rotation display operation and determine that the identified time is the end time of the rotation display operation. In another embodiment, the information acquisition module 663 (e.g., the rotation display operation information acquisition module 703) may perform the operation of determining the end time of the rotation display operation based on the execution time of the rotation display operation determined based on the time required to perform the rotation display operation, determined based on the time required for the electronic device 600 to rotate up to a target angle from the start angle. For example, the electronic device 600 (e.g., processor 640) may determine the execution time of the rotation display operation based on the rotation angle speed at the time when the rotation event occurs. Accordingly, the information acquisition module 663 (e.g., the rotation display operation information acquisition module 703) may determine the execution time of the rotation display operation to be inversely proportional to the rotation angle speed. In other words, as the required time increases, the execution time of the rotation display operation may be set to increase. As another example, the electronic device 600 (e.g., processor 640) may identify the time required for the electronic device 600 to rotate from the start angle to the target angle based on at least one of the current rotation angle or the target angle and determine the execution time of the rotation display operation based on the identified required time. Accordingly, the information acquisition module 663 (e.g., the rotation display operation information acquisition module 703) may determine the execution time of the rotation display operation to be proportional to the required time. In other words, as the required time increases, the execution time of the rotation display operation may be set to increase. Resultantly, the information acquisition module 663 (e.g., the rotation display operation information acquisition module 703) may identify the determined execution time after the start time of the rotation display operation and determine that the identified time is the end time of the rotation display operation.

According to various embodiments, the transition method determination module 665 may be implemented to select (or determine or identify) a specific transition method among a plurality of transition methods based on at least one of the obtained slide display operation-associated information or the obtained rotation display operation-associated information. Referring to FIGS. 8A and 8B, at least one of the rotation display operation or the slide display operation may be performed based on the transition method. The display operation in which the rotation display operation and the slide display operation are simultaneously performed may be defined as a rotation slide display operation. The display attribute (e.g., size of display or degree of rotation) of the image displayed on the display 630 may be sequentially (or gradually) changed based on performing at least one of the rotation display operation or the slide display operation. For example, the transition method determination module 665 may identify at least one of first information about a temporal relationship between the start time of the rotation display operation and the start time of the slide display operation or second information about a temporal relationship between the end time of the rotation display operation and the end time of the slide display operation, based on at least one the obtained slide display operation-associated information or the obtained rotation display operation-associated information. The transition method determination module 665 may determine (or identify or select) a specific transition method among a plurality of transition methods (e.g., the plurality of transition methods (transition A, transition B, transition C, and transition D) of FIG. 8B) described below, based on at least one of the first information or the second information. Information about (e.g., information about operations performed by the electronic device 600 when a corresponding transition method is selected) about the plurality of transition methods (e.g., the plurality of transition methods (transition A, transition B, transition C, and transition D) of FIG. 8B) may be previously stored in the electronic device 600. Accordingly, if the transition method is selected, the electronic device 600 may perform a preset operation (e.g., at least one of the rotation display operation or the slide display operation) based on information corresponding to the selected transition method. An example of an operation of selecting a transition method by the electronic device 600 is described below in connection with FIGS. 15, 16, and 17A to 17D.

For example, referring to 801 of FIG. 8A, the rotation display operation may include the operation of sequentially changing the degree of rotation of the image 811 displayed on the display 630 to a preset degree of rotation during a rotation specific time (e.g., the execution time of the rotation display operation). The degree of rotation may mean the angle (θ1, θ2) between the axis (A axis) in the longer direction of the displayed image 811 and a fixed virtual axis (e.g., X axis). In this case, after the rotation display operation is terminated, the electronic device 600 may display an image 812 corresponding to a screen direction (e.g., horizontal direction) different from the screen direction (e.g., vertical direction) before the rotation display operation.

As another example, referring to 802 of FIG. 8A, the slide display operation may include the operation of sequentially changing the size (I1, I2, I3, and I4) of an image 821 displayed on the display 630 to a specific size during a specific time (e.g., the execution time of the slide display operation).

As another example, referring to 803 of FIG. 8A, the rotation slide display operation may include the operation of changing the size (I1, I2, I3, and I4) of the image 821 while changing the degree of rotation (θ1, θ2) of an image 831 displayed on the display 630. The execution time of the rotation slide display operation may be a time duration where the time (i.e., the execution time of the rotation display operation) between the start time and end time of the rotation display operation overlaps the time (i.e., the execution time of the slide display operation) between the start time and end time of the slide display operation. When the rotation slide display operation is completed, the electronic device 600 may display an image 832 corresponding to a screen direction (e.g., horizontal direction) different from the screen direction (e.g., vertical direction) before the rotation slide display operation.

As another example, referring to FIG. 8B, the transition method may include a first transition method (transition A)

to trigger to perform the slide display operation after performing the above-described rotation slide display operation, a second transition method (transition B) to trigger to perform the rotation slide display operation, a third transition method (transition C) to trigger to perform the slide display operation after performing the slide display operation followed by the rotation slide display operation, and a fourth transition method (transition D) to trigger to perform the slide display operation after performing the slide display operation. In this case, in a case where the third transition method (transition C) is selected, as the end time of the rotation display operation is changed to be equal to the end time of the slide display operation, the rotation slide display operation may be performed after the slide display operation. Meanwhile, without limited to those described and/or shown, before and after the display operation triggered by each transition method, at least part of the rotation display operation or slide display operation may further be performed. An example of a specific operation of the electronic device 600 based on a specific transition method is described below in connection with FIGS. 18 to 25.

According to various embodiments, the display control module 667 may be implemented to perform the operation of sequentially (or gradually) changing the display attribute of the image (or screen or content) being displayed, by performing at least one of the slide display operation or rotation display operation based on the selected specific transition method. For example, upon performing a specific display operation based on the selected transition method, the display control module 667 may sequentially change the display attribute of the image (or screen or content). The display control module 667 may transfer the image (or screen or content) having the sequentially changed display attribute to a display driver IC 740 through a display driver 730 and display it on the display 630. The operation in which the electronic device 600 displays the image (or screen or content) using the display driver IC 740 and the display driver 730 is known art and its detailed description is thus omitted.

For example, upon performing the rotation display operation based on the selected transition method, the display control module 667 (e.g., a rotation display operation module 713) may obtain the image (or screen or content) being displayed on the display 630 by screen capture as described in connection with 801 of FIG. 8A, sequentially change the degree of rotation of the obtained image, and display the image (or screen or content) whose degree of rotation has been sequentially changed on the display 630. The image may be an image corresponding to a specific screen direction (or rotation direction) (e.g., horizontal direction or vertical direction). Meanwhile, without limited to those described and/or shown, a display operation for applying a different type of animation effect (or switching effect) may also be performed instead of the rotation display operation of changing the degree of rotation of the image based on an occurrence of a rotation event. In other words, an example in which the rotation display operation is performed is described below but, without limited to the described example, it may also be understood as performing a display operation for applying a different type of animation effect (or switching effect) to change different types of visual attributes instead of the rotation display operation.

As another example, when the slide display operation is performed based on the selected transition method, the display control module 667 (e.g., a slide display operation module 711) may obtain the image (or screen or content) being displayed on the display 630 by screen capture as described in connection with 802 of FIG. 8A, sequentially change (e.g., rescale and/or resize) the size of the obtained image, and/or display the image whose size is sequentially changed on the display 630. For example, the resizing may include the operation of increasing the size of the image during slide-out and the operation of decreasing the size of the image during slide-in. The display control module 667 (e.g., the rotation display operation module 713) may change the size of display of the image per length sensing period ts, based on information about the size corresponding to the size of the externally exposed area obtained per length sensing period ts. Accordingly, the size of display of the image may correspond to the size of the externally exposed area (e.g., the first display area A1) of the display 630 per length sensing period ts. As another example, when the slide display operation is performed based on the selected transition method, the display control module 667 (e.g., the slide display operation module 711) may obtain an image having a size corresponding to the size of the externally exposed area of the display 630 identified per length sensing period ts from the application 720 and display the obtained image on the display 630.

As another example, when the rotation slide display operation is performed based on the selected transition method, the display control module 667 (e.g., the rotation display operation module 713 and the slide display operation module 711) may sequentially change the size of the image while sequentially changing the degree of rotation of the image being displayed as described in connection with 803 of FIG. 8A and display the image in which the degree of rotation and size have been sequentially changed, on the display 630.

According to various embodiments, the display control module 667 may perform the operation of redrawing (obtaining) a new image while performing the rotation display operation based on the transition method. For example, the display control module 667 may perform the operation of obtaining an image 760 having the size corresponding to the size of the externally exposed area A1 of the display 630 at the time when the rotation display operation is expected to end and store the image in the memory 750.

An example of an operation of an electronic device 600 is described below according to various embodiments.

According to various embodiments, the electronic device 600 may perform various types of display operations based on an occurrence of an event (e.g., occurrence of slide event and/or occurrence of rotation event). The display operations may include a first display operation (e.g., the above-described rotation display operation) associated with rotation of the electronic device 600, a second display operation (e.g., the above-described slide display operation) associated with the slide of the electronic device 600, a display operation based on the transition method, and an operation for displaying an image (image display operation).

Figure 9:
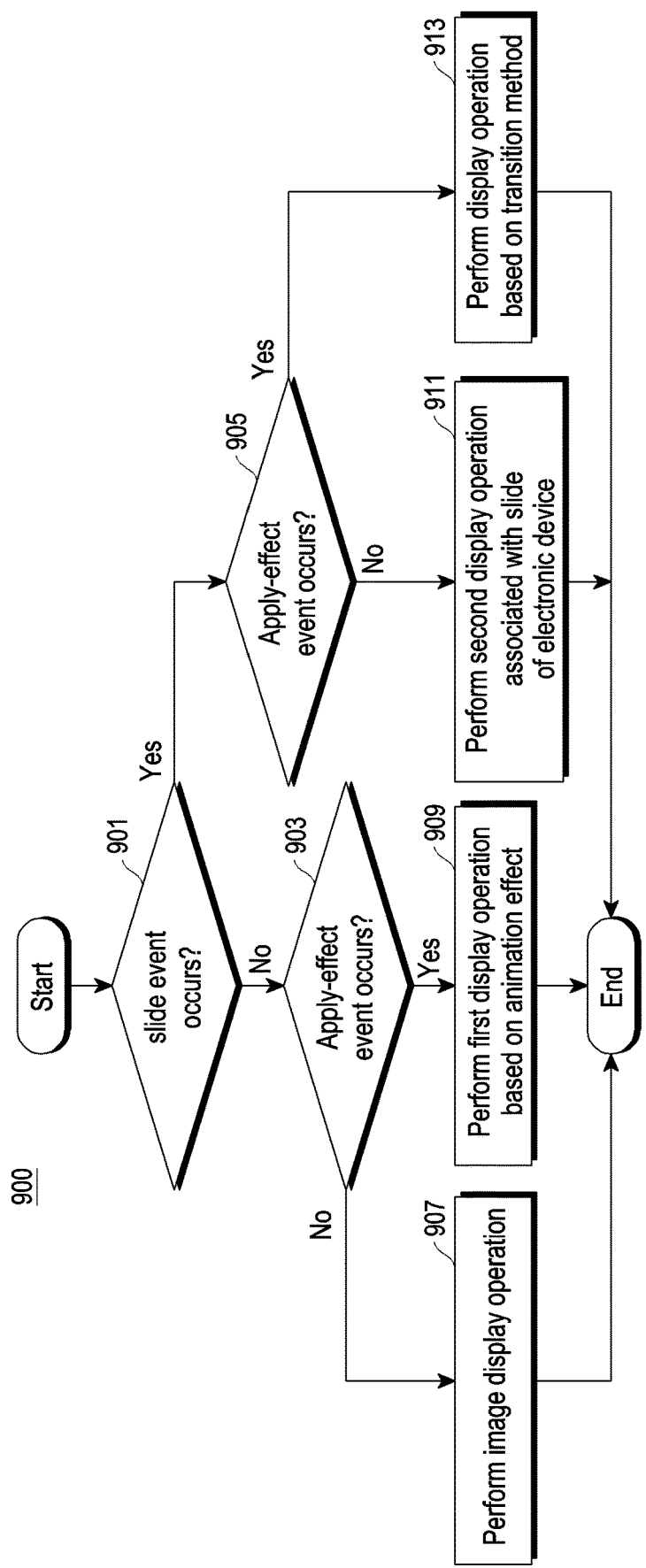
FIG. 9 is a flowchart illustrating an example of an operation of an electronic device according to various embodiments.

FIG. 9 is a flowchart 900 illustrating an example of an operation of an electronic device 600 according to various embodiments. According to various embodiments, the operations shown in FIG. 9 are not limited to the shown order but may rather be performed in other various orders. According to various embodiments, more or less operations than those of FIG. 9 may be performed.

According to various embodiments, in operation 901, the electronic device 600 may identify whether a slide event occurs. In an embodiment, when the type of the electronic device 600 is an auto type, the electronic device 600 may identify an occurrence of a slide event based on at least one of detecting an input to a hardware key and/or software key (e.g., an icon and/or object displayed on the display 630) that triggers a slide of the display 630, receiving a voice input to instruct a slide, or recognizing a preset motion of the electronic device 600 (e.g., holding and shaking the electronic device 600). In an embodiment, when the type of the electronic device 600 is a manual type, the electronic device 600 may identify an occurrence of a slide event based on identifying an electrical value generated as the display 630 is drawn out in the extending direction and/or drawn in in the reducing direction, using the sensor 620 (e.g., hall sensor 620).

According to various embodiments, upon identifying that no slide event occurs (No in 901), the electronic device 600 may identify whether an apply-effect event occurs in operation 903. For example, as at least part of the operation of identifying whether an apply-effect event occurs, the electronic device 600 may identify whether the above-described rotation event occurs. The rotation event may be an event that triggers to display the image in a screen direction different from the screen direction before the start of the rotation display operation and after the end of the rotation display operation. In an embodiment, the electronic device 600 may identify the rotation angle of the electronic device 600 using the sensor 620 (e.g., accelerometer or tilt sensor) and, when the identified rotation angle reaches a specific angle at which a rotation event is triggered to occur, identify that the rotation event occurs. In another embodiment, the electronic device 600 may identify the occurrence of the rotation event based on at least one of detecting an input to a hardware key and/or software key (e.g., an icon and/or object displayed on the display 630) set to trigger the occurrence of the rotation event, receiving a voice input to instruct a rotation event, or recognizing a preset motion of the electronic device 600 (e.g., holding and shaking the electronic device 600).

According to various embodiments, upon identifying that a slide event occurs (Yes in 901), the electronic device 600 may identify whether an apply-effect event occurs in operation 905.

According to various embodiments, upon identifying that neither a slide event nor an apply-effect event occurs (No in 903), the electronic device 600 may perform an image display operation in operation 907. For example, the image display operation of the electronic device 600 may include the operation of displaying an image having a size corresponding to the size of the externally exposed area (e.g., the first display area A1) on the display 630, based on the screen direction (e.g., horizontal direction or vertical direction) corresponding to the current rotation angle of the electronic device 600.

According to various embodiments, upon identifying that no slide event occurs and an apply-effect event occurs (Yes in 903), the electronic device 600 may perform a first display operation based on the animation effect in operation 909. For example, the first display operation of the electronic device 600 based on the animation effect (or switching effect) may include the above-described rotation display operation. For example, the electronic device 600 (e.g., the display control module 667) may obtain the image being displayed on the display 630 based on screen capture, based on identifying the occurrence of the rotation event, sequentially change the degree of rotation of the obtained image, and display the image whose degree of rotation is sequentially changed on the display 630. In this case, the obtained image may be an image corresponding to the specific screen direction (e.g., vertical direction). The electronic device 600 may display the image corresponding to another screen direction (e.g., horizontal direction) after the first display operation (e.g., rotation display operation) is terminated.

According to various embodiments, upon identifying that a slide event occurs and no rotation event occurs (No in 905), the electronic device 600 may perform a second display operation associated with the slide of the electronic device 600 in operation 911. For example, the second display operation associated with the slide (e.g., slide-in or slide-out) of the electronic device 600 may include the above-described slide display operation. The electronic device 600 (e.g., the display control module 667) may obtain the image being displayed on the display 630 based on screen capture, sequentially change the size of the obtained image, and display the image whose size is sequentially changed on the display 630. In this case, the obtained image may be an image corresponding to the specific screen direction (e.g., vertical direction).

According to various embodiments, upon identifying that a slide event occurs and an apply-effect event occurs (Yes in 905), the electronic device 600 may perform a display operation based on the transition method in operation 913. For example, the electronic device 600 (e.g., processor) may sequentially change the display attribute (e.g., size or degree of rotation) of the image, based on a specific transition method determined based on at least one of first information about the temporal relationship between the start time of the first display operation and the start time of the second display operation or second information about the temporal relationship between the end time of the first display operation and the end time of the second display operation and display the image whose display attribute is changed on the display 630. An example of an operation of displaying an image based on a specific transition method of the electronic device 600 is described below in connection with FIGS. 18 to 25.

An example of an operation of an electronic device 600 is described below according to various embodiments.

According to various embodiments, the electronic device 600 may perform a different display operation per time, based on an occurrence of an apply-effect event (e.g., rotation event) and a slide event. For example, the electronic device 600 may perform different display operations for the time before both the apply-effect event (e.g., rotation event) and slide event occur, the time after both the apply-effect event (e.g., rotation event) and the slide event occur, and the time after the apply-effect event (e.g., rotation event) and the slide event are terminated. In this case, the electronic device 600 may sequentially change the display attribute (e.g., size or degree of rotation) of the image by performing the slide display operation while performing the operation of applying an animation effect to the image, during a designated time after both the apply-effect event (e.g., rotation event) and the slide event occur.

Figure 10:
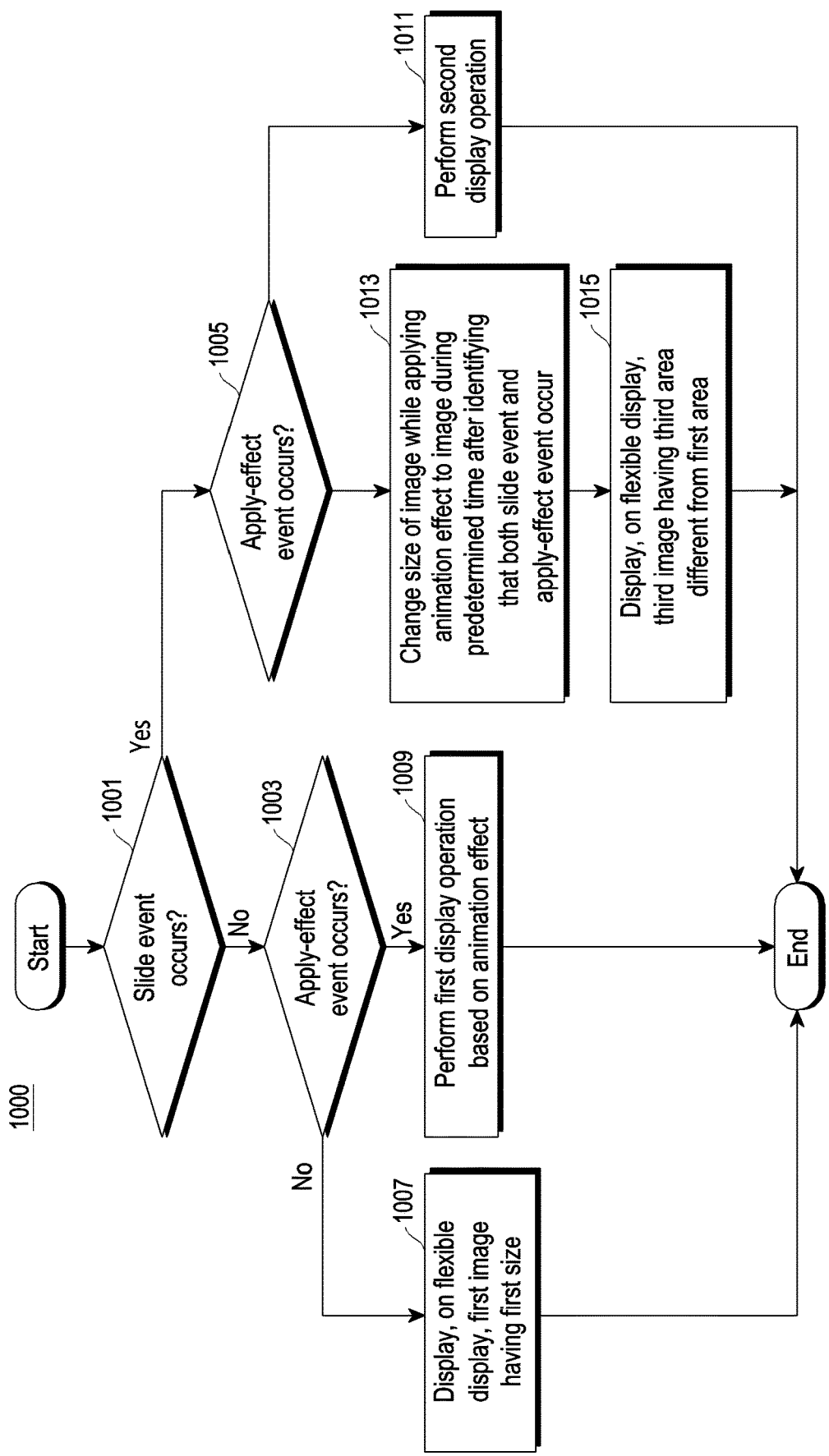
FIG. 10 is a flowchart illustrating an example of an operation of an electronic device according to various embodiments.

FIG. 10 is a flowchart 1000 illustrating an example of an operation of an electronic device 600 according to various embodiments. According to various embodiments, the operations shown in FIG. 10 are not limited to the shown order but may rather be performed in other various orders. According to various embodiments, more or less operations than those of FIG. 10 may be performed. FIG. 10 is described below with reference to FIG. 11.

Figure 11:
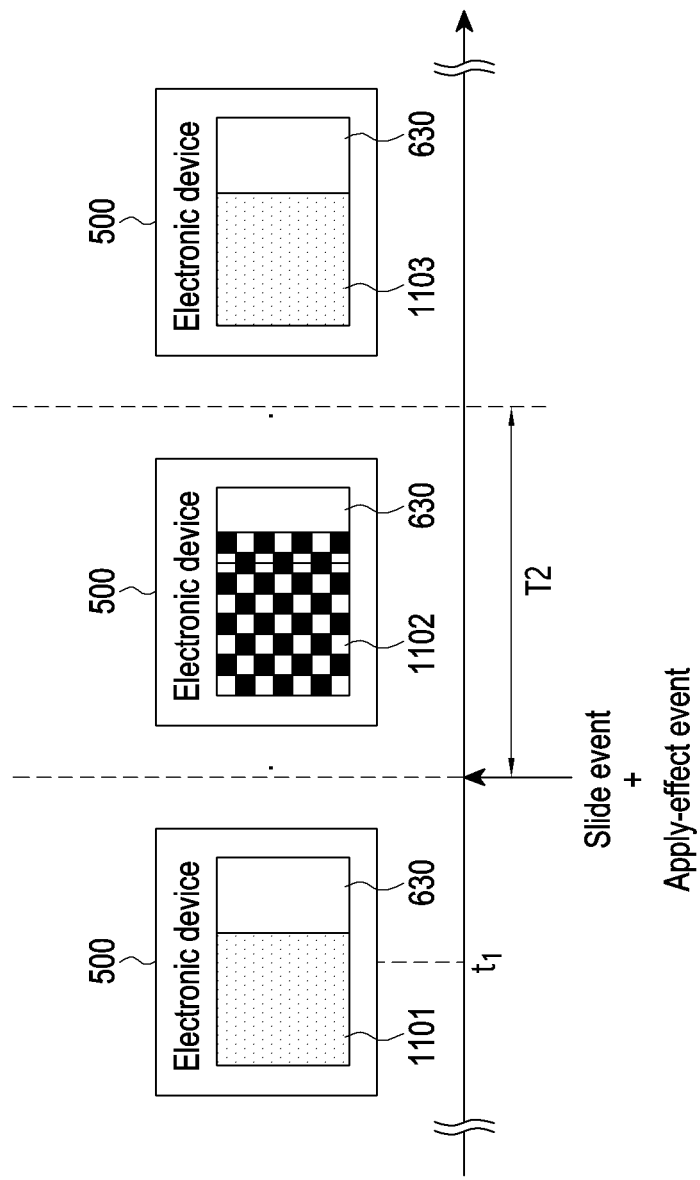
FIG. 11 is a view illustrating an example of performing a different display operation per time by an electronic device according to various embodiments.

FIG. 11 is a view illustrating an example of performing a different display operation per time by an electronic device 600 according to various embodiments.

According to various embodiments, in operation 1001, the electronic device 600 may identify whether a slide event occurs and, upon identifying that no slide event occurs (No in 1001), identify whether an apply-effect event occurs in operation 1003 and, upon identifying that a slide event occurs (Yes in 1001), identify whether an apply-effect event occurs in operation 1005. Operations 1001 to 1005 of the electronic device 600 may be performed like operations 901 to 905 of the electronic device 600 as described above, and no duplicate description thereof is given below.

According to various embodiments, upon identifying that neither a slide event nor an apply-effect event occurs (No in 1003), the electronic device 600 may display a first image having a first area on the flexible display 630 in operation 1007. For example, referring to FIG. 11, the electronic device 600 may display a first image 1101 on the display 630 in a specific screen direction (e.g., vertical direction) at a time (e.g., first time t1) before a slide event and an apply-effect event (e.g., rotation event) occur. For example, the specific screen direction may be set according to the rotation angle of the electronic device 600 at the first time t1. As an example, as shown in FIG. 11, when the rotation angle of the electronic device 600 is smaller than a specific angle (e.g., 30 degrees) at which a rotation event is triggered, the vertical direction (or portrait mode) for image display of the electronic device 600 may be set. Further, without limited to those shown, as an example, when the rotation angle of the electronic device 600 is the specific angle (e.g., 30 degrees) or more, the horizontal direction (or landscape mode) for image display of the electronic device 600 may be set. The size of the first image displayed on the display 630 may correspond to the size of the area (e.g., the first display area A1), exposed to the outside of the housing, of the display 630 at the first time t1.

According to various embodiments, upon identifying that no slide event occurs and an apply-effect event occurs (Yes in 1003), the electronic device 600 may perform a first display operation (e.g., rotation display operation) based on the animation effect in operation 1009.

According to various embodiments, upon identifying that a slide event occurs and no rotation event occurs (No in 1005), the electronic device 600 may perform a second display operation (e.g., slide display operation) associated with the slide of the electronic device 600 in operation 1011.

According to various embodiments, upon identifying that a slide event occurs and an apply-effect event occurs (Yes in 1005), the electronic device 600 may perform the operation of changing the area of the image while applying an animation effect to the image during a predetermined time after both the slide event and the apply-effect event occur in operation 1013. For example, the time when the display operation by the apply-effect event is performed and the time when the display operation (e.g., slide display operation) by the slide event may overlap each other during a second time T2. Accordingly, referring to FIG. 11, during the second time T2 from the time when the slide event and the apply-effect event occur, the electronic device 600 may apply an animation effect corresponding to the apply-effect event to the image to thereby change the display attribute while changing the size of the image and may display a second image 1102 in which the display attributes (e.g., degree of rotation and color) than size are sequentially changed.

According to various embodiments, in operation 1015, the electronic device 600 may display a third image having a third area different from the first area, on the flexible display 630 after the second time. For example, referring to FIG. 11, after the second time T2 when the slide display operation by the slide event and the display operation by the apply-effect event are performed, the electronic device 600 may display a third image 1103 having the third size corresponding to the area (e.g., the first display area A1), exposed to the outside of the housing, of the display 630. The screen direction (e.g., horizontal direction) of the image 1103 having the third size may differ from the screen direction (e.g., vertical direction) of the first image 1101.

An example of an operation of an electronic device 600 is described below according to various embodiments.

According to various embodiments, the electronic device 600 may perform a different display operation per time, based on an occurrence of a rotation event and a slide event. For example, the electronic device 600 may perform different display operations for the time before both the rotation event and slide event occur, the time after both the rotation event and the slide event occur, and the time after the rotation event and the slide event are terminated.

Figure 12:
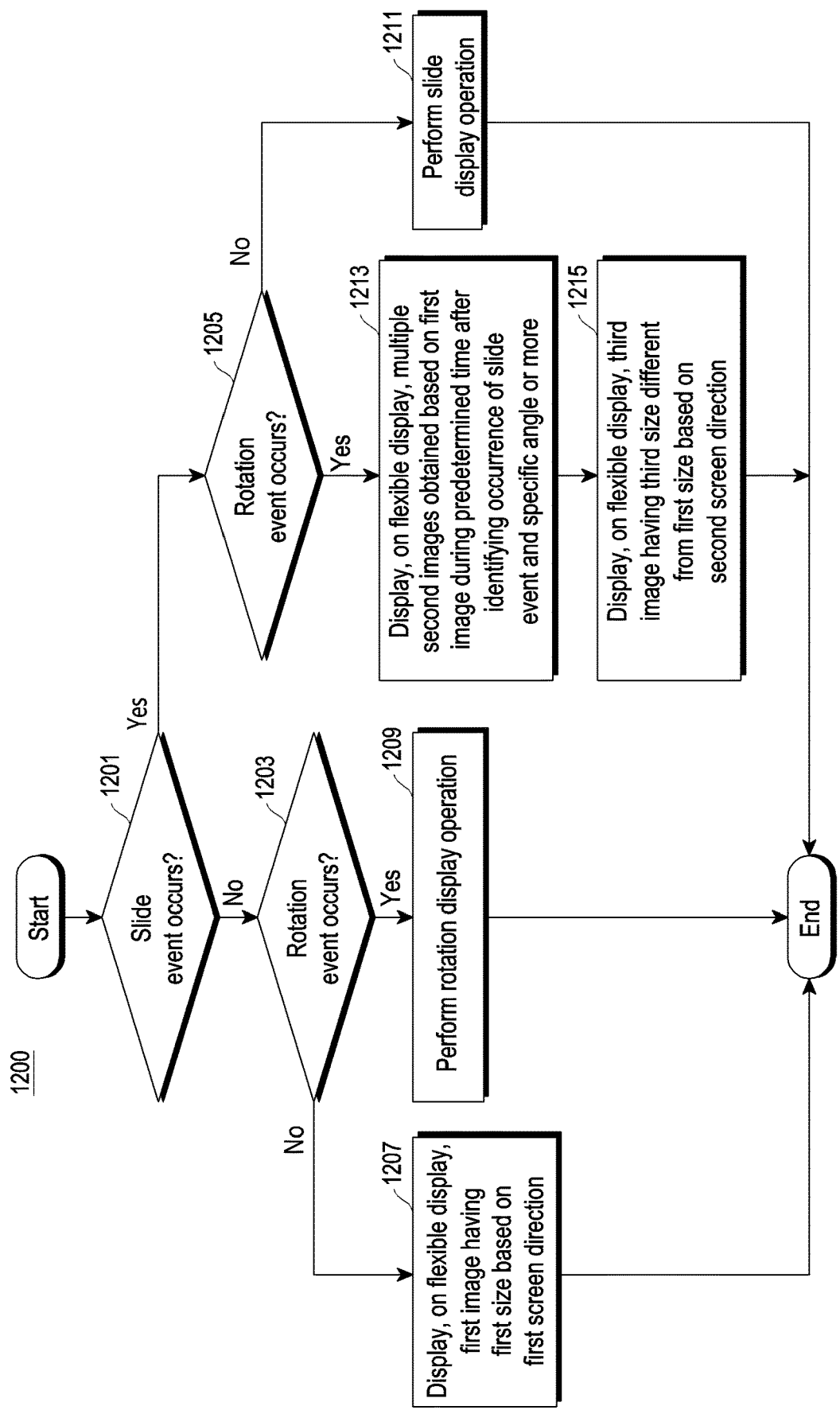
FIG. 12 is a flowchart illustrating an example of an operation of an electronic device according to various embodiments.

FIG. 12 is a flowchart 1200 illustrating an example of an operation of an electronic device 600 according to various embodiments. According to various embodiments, the operations shown in FIG. 12 are not limited to the shown order but may rather be performed in other various orders. According to various embodiments, more or less operations than those of FIG. 12 may be performed. FIG. 12 is described below with reference to FIG. 13.

Figure 13:
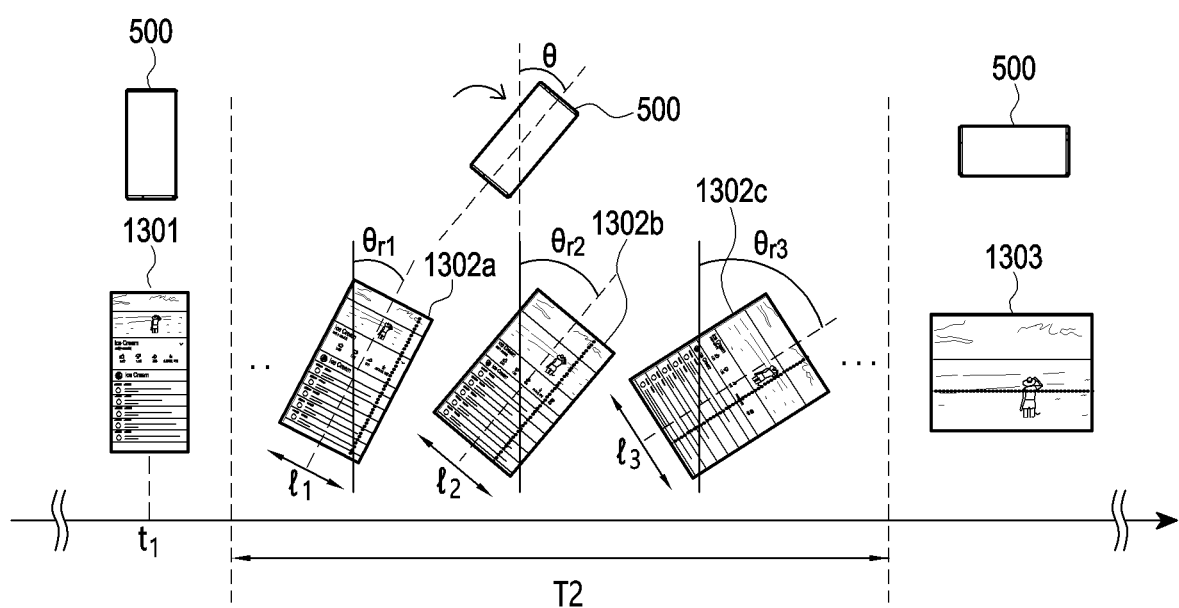
FIG. 13 is a view illustrating an example of performing a different display operation per time by an electronic device according to various embodiments.

FIG. 13 is a view illustrating an example of performing a different display operation per time by an electronic device 600 according to various embodiments.

According to various embodiments, in operation 1201, the electronic device 600 may identify whether a slide event occurs and, upon identifying that no slide event occurs (No in 1201), identify whether an apply-effect event occurs in operation 1203 and, upon identifying that a slide event occurs (Yes in 1201), identify whether an apply-effect event occurs in operation 1205. Operations 1201 to 1205 of the electronic device 600 may be performed like operations 901 to 905 of the electronic device 600 as described above, and no duplicate description thereof is given below.

According to various embodiments, upon identifying that neither a slide event nor a rotation event occurs (No in 1203), the electronic device 600 may display the first image having the first size based on the first screen direction, on the flexible display 630 at the first time in operation 1207. For example, referring to FIG. 13, the electronic device 600 may display a first image 1301 having the first size corresponding to the size of the area (e.g., the first display area A1) exposed to the outside of the flexible display 630, based on the screen direction (e.g., vertical direction) corresponding to the current rotation angle of the electronic device 600 at the time (e.g., the first time t1) before both the slide event and the rotation event occur.

According to various embodiments, upon identifying that no slide event occurs and a rotation event occurs (Yes in 1203), the electronic device 600 may perform the rotation display operation in operation 1209. For example, the electronic device 600 (e.g., the display control module 667) may obtain the image being displayed on the display 630 based on screen capture, based on identifying the occurrence of the rotation event, sequentially change the degree of rotation of the obtained image, and display the image whose degree of rotation is sequentially changed on the display 630.

According to various embodiments, the electronic device 600 may determine the execution time of the rotation display operation based on the rotation angle speed and/or rotation required time identified using the sensor 620 (e.g., the second sensor). For example, the electronic device 600 may perform the operation of determining the end time of the rotation display operation based on the execution time of the rotation display operation determined based on the time required to perform the rotation display operation, determined based on the time required for the electronic device 600 to rotate up to a target angle from the start angle. For example, the electronic device 600 (e.g., processor 640) may determine the execution time of the rotation display operation to be inversely proportional to the rotation angle speed at the time when the rotation event occurs. In other words, as the required time increases, the execution time of the rotation display operation may be set to increase. As another example, the electronic device 600 (e.g., processor 640) may determine the execution time of the rotation display operation to be proportional to the time required for the electronic device 600 to rotate from the start angle to the target angle based on at least one of the current rotation angle or the target angle. In other words, as the required time increases, the execution time of the rotation display operation may be set to increase. As a result, the electronic device 600 may perform a first display operation (e.g., rotation display operation) according to the determined execution time.

According to various embodiments, upon identifying that a slide event occurs and no rotation event occurs (No in 1205), the electronic device 600 may perform a slide display operation of the electronic device 600 in operation 1211. For example, the electronic device 600 (e.g., the display control module 667) may obtain the image being displayed on the display 630 based on screen capture, sequentially change the size of the obtained image, and display the image whose size is sequentially changed on the display 630. In this case, the obtained image may be an image corresponding to the specific screen direction (e.g., vertical direction).

According to various embodiments, upon identifying that a slide event occurs and a rotation event occurs (Yes in 1205), the electronic device 600 may display a plurality of second images obtained based on the first image on the flexible display 630 during the second time after the slide event occurs, and the rotation angle of the electronic device 600 is identified to be a specific angle or more in operation 1213 and, in operation 1215, display a third image having a third size different from the first size, based on the second screen direction, on the flexible display 630 after the second time. For example, when the rotation angle θ of the electronic device 600 is changed by a specific angle (e.g., 30 degrees), at which a rotation event is triggered, or more after the slide event occurs, or after the rotation angle of the electronic device 600 is changed by the specific angle (e.g., 30 degrees), at which a rotation event is triggered, or more, a slide event may occur. Referring to FIG. 13, during a specific period (e.g., the second time T2) from the time when both the slide event and the rotation event occur, the electronic device 600 may perform screen capture at the time when the rotation event occurs, thereby sequentially changing the degree of rotation (θr1, θr2, θr3) of the obtained image while sequentially changing the size (I1, I2, I3) of the image, and display the second images 1302a, 1302b, and 1302c in which the degree of rotation (θr1, θr2, θr3) and the size (I1, I2, I3) have been sequentially changed. For example, the specific period (e.g., the second time T2) may be a time when the execution time of the slide display operation and the execution time of the rotation display operation overlap. After the specific period (e.g., the second time t2) and/or as the remaining display operation (e.g., slide display operation and/or rotation display operation) ends after the specific period (e.g., the second time t2), the slide display operation and the rotation display operation both may be terminated. After both the slide display operation and the rotation display operation are terminated, the electronic device 600 may display a third image 1303 having the third size corresponding to the size of the externally exposed area (e.g., the first display area A1) of the display 630 based on a screen direction (e.g., horizontal direction) different from the screen direction (e.g., vertical direction) at the first time t1.

According to various embodiments of the disclosure, the degree of rotation θrn and the size In may be determined based on Equation 1 and Equation 2 below.

$$\theta_{rn} = Firstdegreeofrotation + \\ (Targetdegreeofrotation - Firstdegreeofrotation) \times \\ \frac{Currenttime(n)}{Totalexecutiontimeofrotationdisplayoperation} n = 0, 1, 2, 3, ...$$

Equation 1

In Equation 1, first degree of rotation may denote the degree of rotation of the image obtained by capture, and current time n may denote the time required from the occurrence of the rotation event to the nth turn.

$$I_n = Firstsize + (Targetsize - Firstsize) \times \\ \frac{Currenttime(n)}{Totalexecutiontimeofseconddisplayoperation} \\ n = 0, 1, 2, 3, ...$$

Equation 2

In Equation 2, first size may denote the size of the image obtained at the time when the slide event occurs, and current time n may denote the time required from the occurrence of the slide event to the nth turn.

As an example, when the first degree of rotation is 0°, the target degree of rotation is 90°, the total execution time of rotation display operation is 300 ms, and the current times (n=1, 2, and 3) are 30 ms, 60 ms, and 100 ms, respectively, the electronic device 600 may change the degree of rotation of the obtained image 1301 from 0° to a first degree of rotation θr1 (e.g., 9°) and obtain an image 1302a having the first degree of rotation θr1 (e.g., 9°), change the degree of rotation of the obtained image 1301 from 0° to a second degree of rotation θr2 (e.g., 16°) and obtain an image 1302b having the second degree of rotation θr2 (e.g., 16°), and change the degree of rotation of the obtained image 1301 from 0° to a third degree of rotation θr3 (e.g., 30°) and obtain an image 1302c having the third degree of rotation θr3 (e.g., 30°). Meanwhile, the described numerical values are merely an example, and embodiments may not be limited thereto. Meanwhile, without limited to those described, the electronic device 600 may be implemented to perform the operation of changing the degree of rotation of the image obtained in the previous turn, instead of the operation of changing the degree of rotation of the obtained image 1301. For example, the electronic device 600 may change the degree of rotation of the image 1302a obtained by capture from 9° to the second degree of rotation θr2 (e.g., 16°) and obtain an image 1302b.

In this case, the electronic device 600 may control the size In of display of the image during the second time T2 when the execution time of the rotation display operation overlaps the execution time of the slide display operation while simultaneously controlling the degree of rotation θrn as described above. For example, the initial size may be 50 AU, the target size may be 100 AU, the total execution time of the slide display operation may be 300 ms, and the current times (n=1, 2, and 3) may be 30 ms, 60 ms, and 100 ms, respectively. AU may be replaced with various units for indicating the display size of the image. The above-described numerical values are merely examples, and embodiment may not be limited thereto. In this case, the electronic device 600 may change the size of the obtained image 1301 from 50 AU to a first size I1 (e.g., 55 AU) to obtain an image 1302*a* having the first size I1 (e.g., 55 AU), change the size of the obtained image 1301 from 50 AU to a second size I2 (e.g., 60 AU) to obtain an image 1302*b* having the second size I2 (e.g., 60 AU), and change the size of the obtained image 1301 from 50 AU to a third size I3 (e.g., 63 AU) to obtain an image 1302*c* having the third size I3 (e.g., 63 AU). Meanwhile, without limited to those described, the electronic device 600 may be implemented to perform the operation of changing the size of display of the image obtained in the previous turn, instead of the operation of changing the size of display of the image 1301 obtained by capture. For example, the electronic device 600 may change the size of display of the obtained image 1302*a* from 55 AU to the second size I2 (e.g., 60 AU) to obtain the image 1302*b*.

An example of an operation of an electronic device 600 is described below according to various embodiments.

According to various embodiments, the electronic device 600 may perform the operation of displaying an image based on a transition method selected based on at least one of information about the temporal relationship between the start time of the slide display operation and the start time of the rotation display operation or information about the temporal relationship between the end time of the slide display operation and the end time of the rotation display operation.

Figure 14:
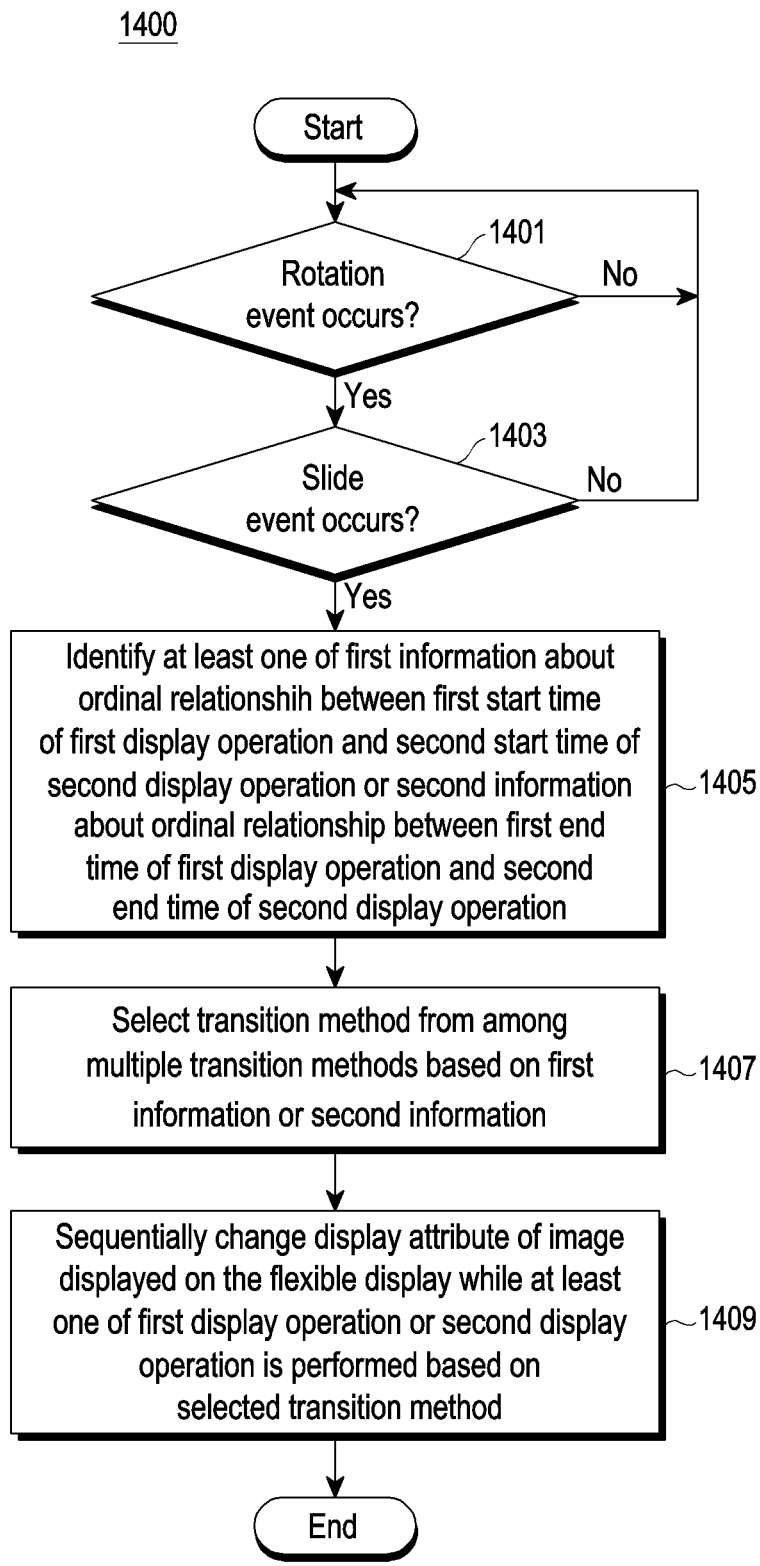
FIG. 14 is a flowchart illustrating an example of an operation of an electronic device according to various embodiments.

FIG. 14 is a flowchart 1400 illustrating an example of an operation of an electronic device 600 according to various embodiments. According to various embodiments, the operations shown in FIG. 14 are not limited to the shown order but may rather be performed in other various orders. According to various embodiments, more or less operations than those of FIG. 14 may be performed.

According to various embodiments, in operation 1401, the electronic device 600 may identify whether a rotation event occurs. For example, the electronic device 600 may identify whether a rotation event, which triggers to perform the above-described rotation display operation (e.g., the first display operation), occurs. Operation 1401 of the electronic device 600 may be performed like operation 901 of the electronic device 600 as described above, and no duplicate description thereof is given below.

According to various embodiments, upon identifying that a rotation event occurs (Yes in 1401), the electronic device 600 may identify whether a slide event occurs in operation 1403. For example, the electronic device 600 may identify whether a slide event, which triggers to perform the above-described slide display operation (e.g., the second display operation), occurs. Operation 1403 of the electronic device 600 may be performed like operation 903 of the electronic device 600 as described above, and no duplicate description thereof is given below.

According to various embodiments, upon identifying that a rotation event occurs and a slide event occurs (Yes in 1403), the electronic device 600 may identify at least one of the first information about the temporal relationship between the first start time of the first display operation and the second start time of the second display operation or the second information about the temporal relationship between the first end time of the first display operation and the second end time of the second display operation in operation 1405.

For example, as described above in connection with FIGS. 6, 7A, 7B,8A, and 8B, the electronic device 600 (e.g., the information acquisition module 663 and transition method determination module 665 of the processor) may obtain information about the start time and/or end time of the rotation display operation (e.g., the first display operation) and information about the start time and/or end time of the slide display operation (e.g., the second display operation), based on the rotation display operation-associated information and/or the slide display operation-associated information. For example, the information associated with the rotation display operation may include information about at least one of the start time or end time of the rotation display operation. As another example, the information associated with the rotation display operation may include information about at least one of the start time or end time of the rotation display operation. The electronic device 600 may identify at least one of the first information about the temporal relationship between the first start time of the rotation display operation (e.g., the first display operation) and the second start time of the slide display operation (e.g., the second display operation) or the second information about the temporal relationship between the first end time of the rotation display operation (e.g., the first display operation) and the second end time of the slide display operation (e.g., the second display operation), based on comparing the respective start times of the display operations (e.g., the rotation display operation and the slide display operation) and comparing the respective end times of the display operations (e.g., the rotation display operation and the slide display operation).

According to various embodiments, the electronic device 600 may select a transition method based on at least one of the first information or second information among a plurality of transition methods in operation 1407 and, in operation 1409, sequentially change the display attribute of the image displayed on the flexible display 630 while at least one of the first display operation or the second display operation is performed based on the selected transition method. The electronic device 600 may select the transition method corresponding to the first information and second information among the plurality of transition methods (e.g., the transition methods of FIG. 8B). The transition method may represent a series of display operations to be performed by the electronic device 600. The electronic device 600 may perform the slide display operation (e.g., the first display operation) and/or the rotation display operation (e.g., the second display operation) based on the selected transition method, thereby sequentially changing the display attribute (e.g., size or degree of rotation) of the image and displaying the image whose display attribute is sequentially changed on the display 630. A specific example of the operation in which the electronic device 600 selects a specific transition method among the plurality of transition methods and changes the display attribute of the image based on the selected specific transition method is described below in detail in connection with FIGS. 15, 16, 17A to 17D, and 18 to 25.

An example of an operation of an electronic device 600 is described below according to various embodiments.

According to various embodiments, the electronic device 600 may determine the transition method based on at least one of information about the temporal relationship between the start time of the slide display operation and the start time of the rotation display operation or information about the temporal relationship between the end time of the slide display operation and the end time of the rotation display operation.

Figure 15:
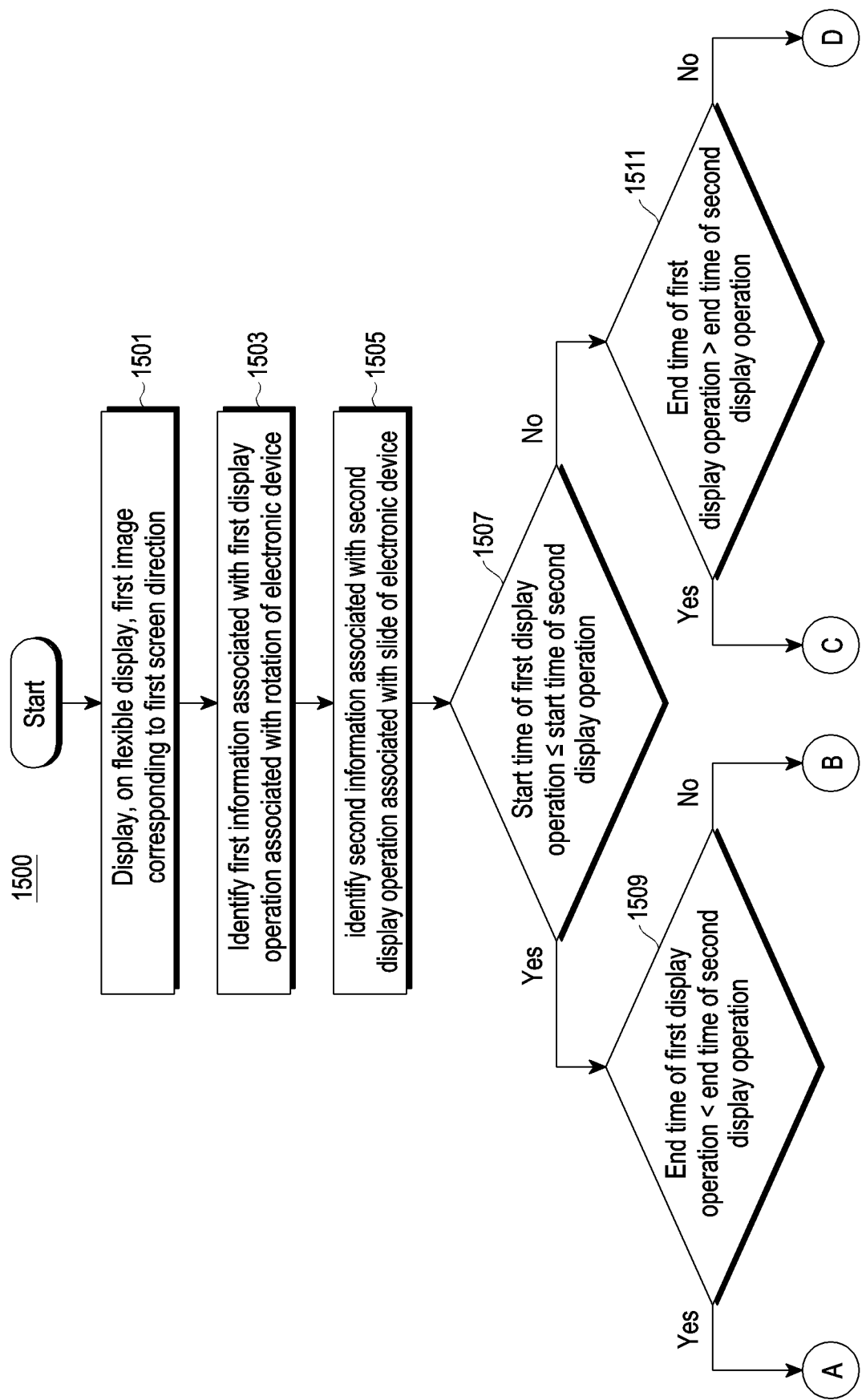
FIG. 15 is a flowchart illustrating an example of an operation of an electronic device according to various embodiments.

FIG. 15 is a flowchart 1500 illustrating an example of an operation of an electronic device 600 according to various embodiments. According to various embodiments, the operations shown in FIG. 15 are not limited to the shown order but may rather be performed in other various orders. According to various embodiments, more or less operations than those of FIG. 15 may be performed. FIG. 15 is described below with reference to FIG. 16. "A<B", "A=B", and "A>B" in FIG. 15 may represent temporal ordinal relationships between time A and time B. For example, "A<B" may denote that time A is before time B, "A=B" may denote that time A is the same as time B, and "A>B" may denote that time A is after time B.

Figure 16:
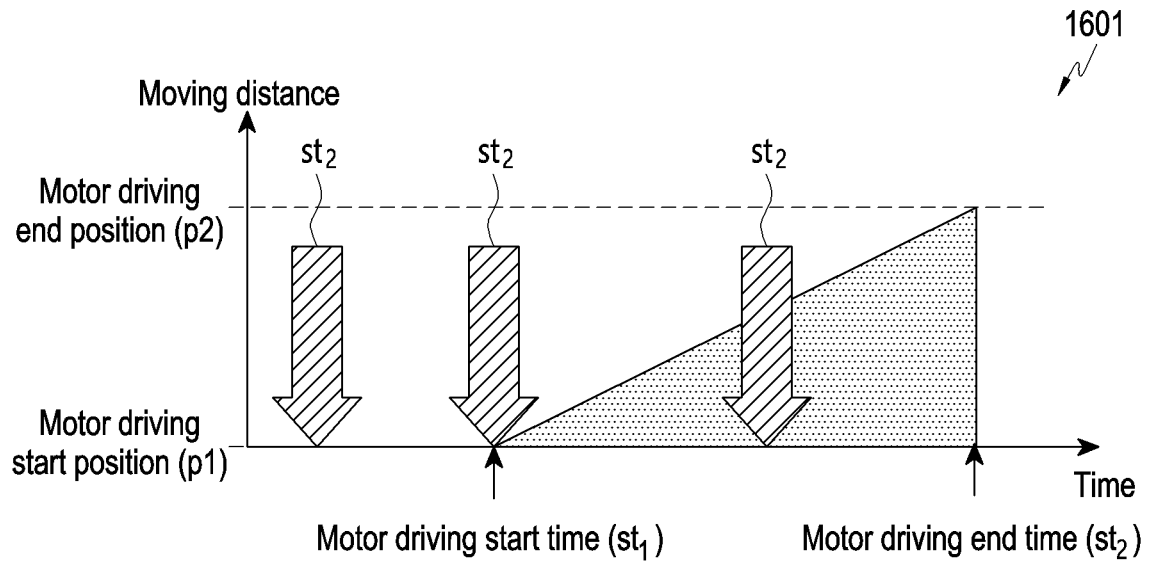
FIG. 16 is a view illustrating an example of an operation of identifying information about a temporal relationship in start time between display operations and/or information about a temporal relationship in end time between display operations of an electronic device according to various embodiments.
Figure 16:
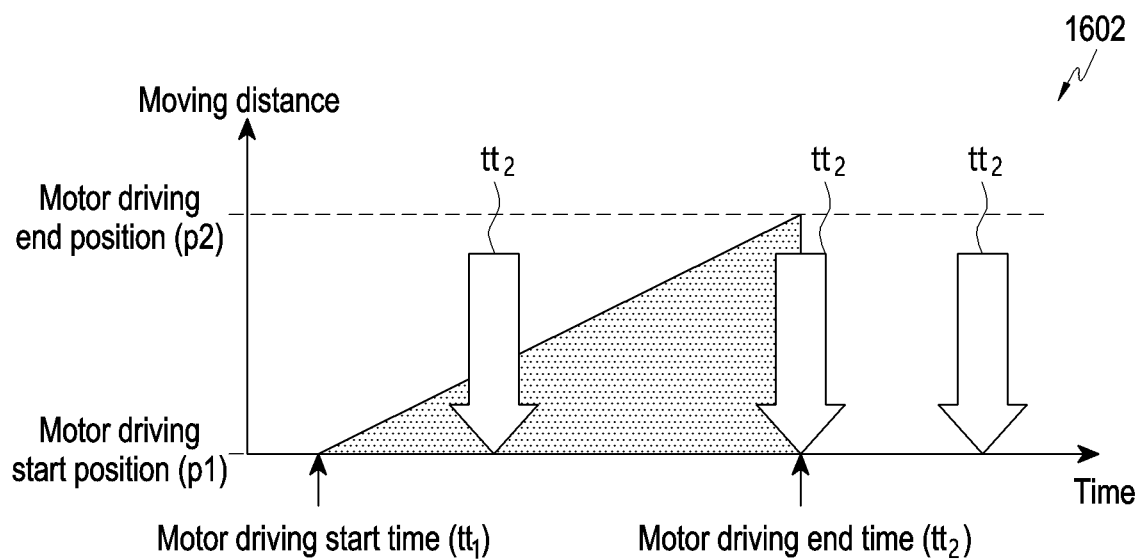
Figure 17A:
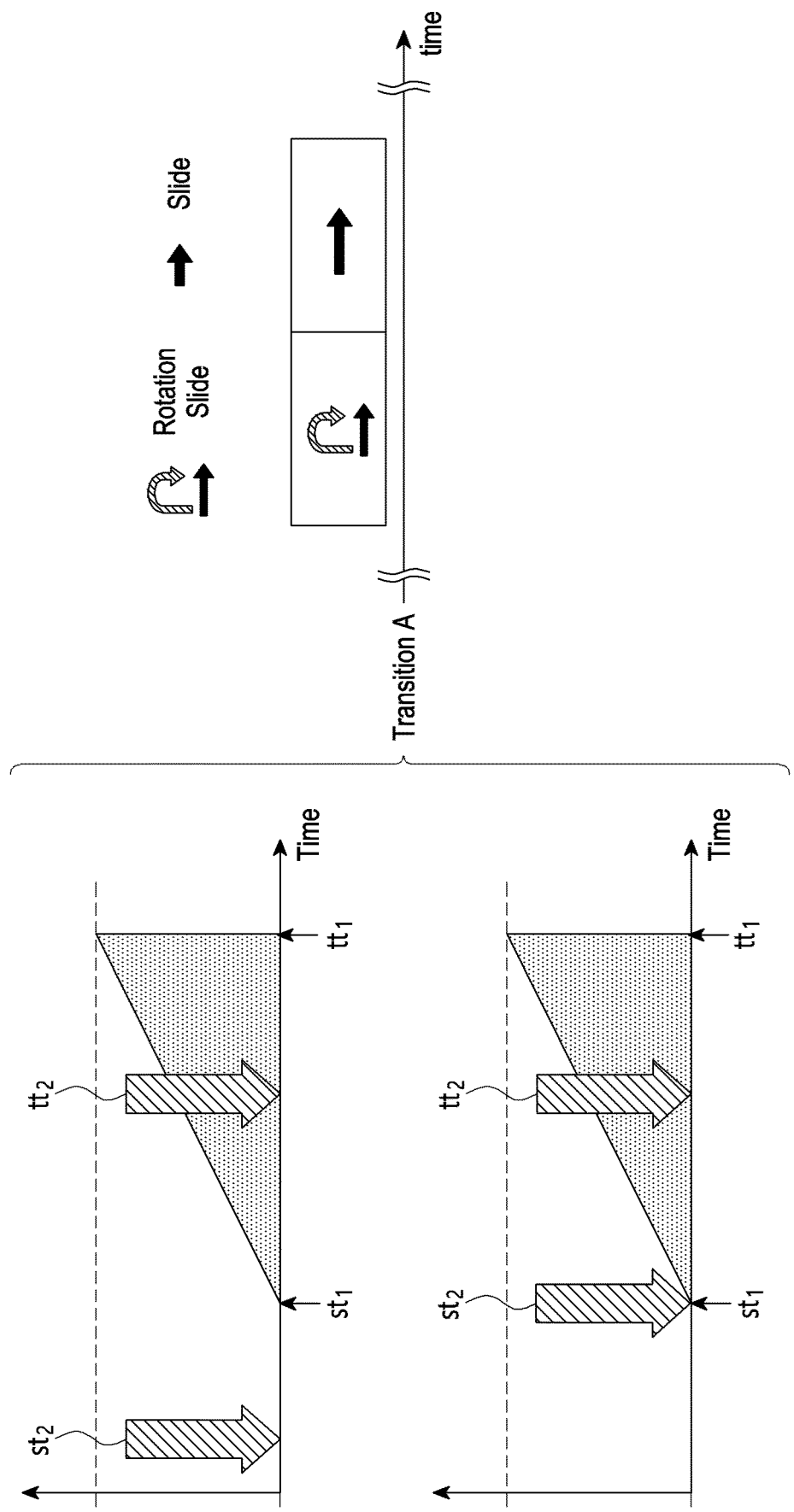
FIG. 17A is a view illustrating an example of an operation of selecting a first transition method (transition A) of an electronic device according to various embodiments.
Figure 17B:
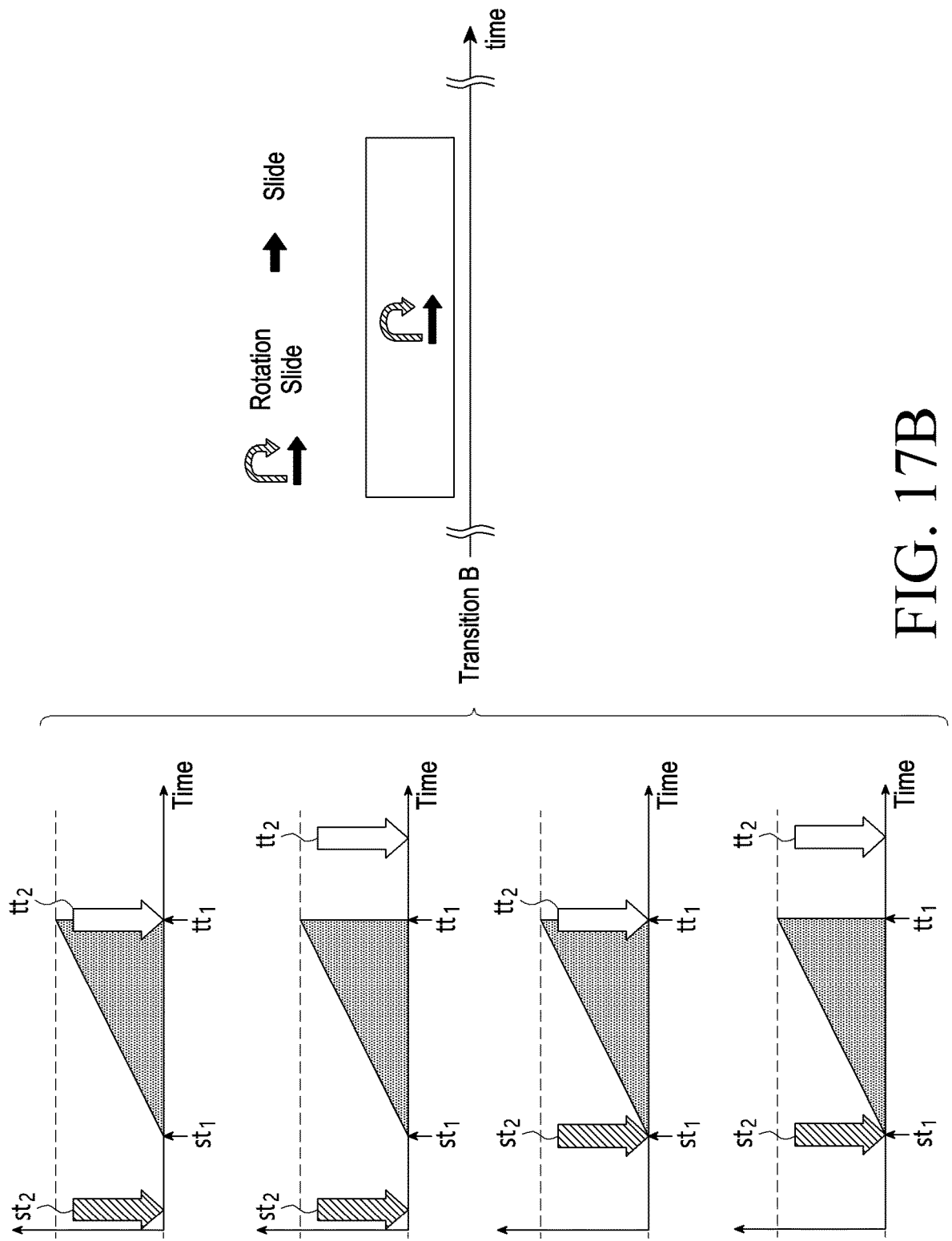
FIG. 17B is a view illustrating an example of an operation of selecting a second transition method (transition B) of an electronic device according to various embodiments.
Figure 17C:
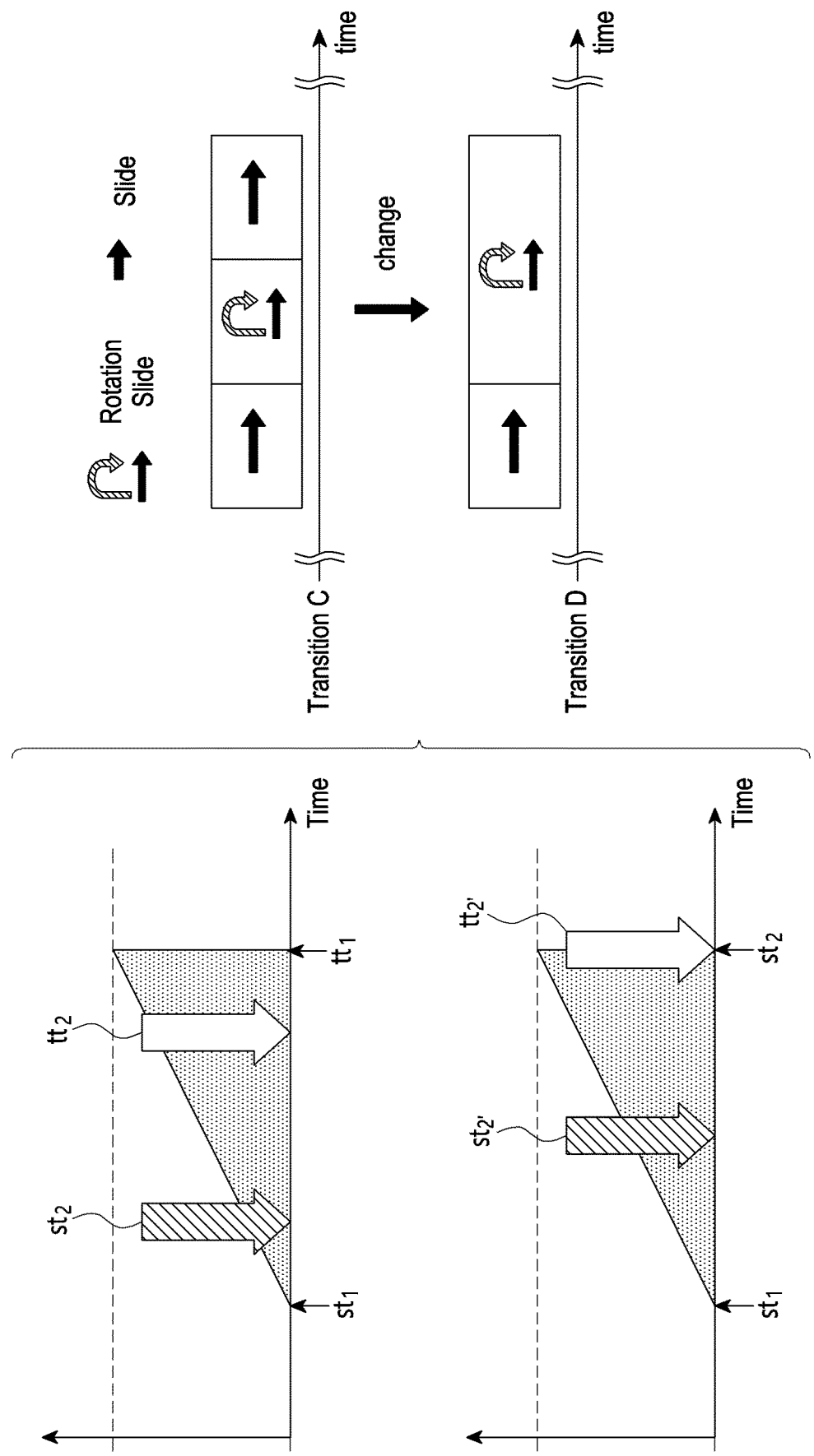
FIG. 17C is a view illustrating an example of an operation of selecting a third transition method (transition C) of an electronic device according to various embodiments.
Figure 17D:
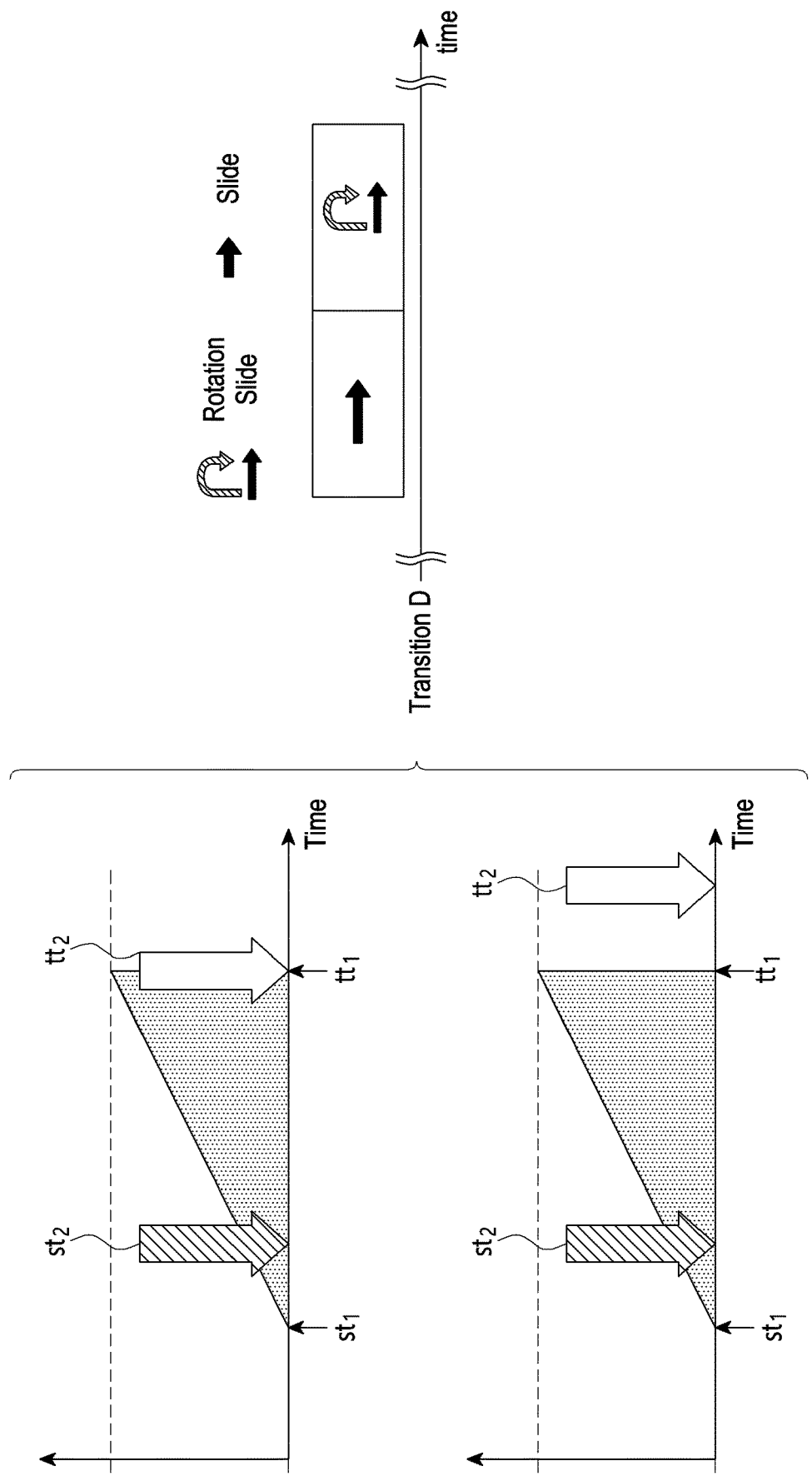
FIG. 17D is a view illustrating an example of an operation of selecting a fourth transition method (transition D) of an electronic device according to various embodiments.

FIG. 16 is a view illustrating an example of an operation of identifying information about a temporal relationship in start time between display operations and/or information about a temporal relationship in end time between display operations of an electronic device 600 according to various embodiments. FIG. 17A is a view illustrating an example of an operation of selecting a first transition method (transition A) of an electronic device 600 according to various embodiments. FIG. 17B is a view illustrating an example of an operation of selecting a second transition method (transition B) of an electronic device 600 according to various embodiments. FIG. 17C is a view illustrating an example of an operation of selecting a third transition method (transition C) of an electronic device 600 according to various embodiments. FIG. 17D is a view illustrating an example of an operation of selecting a fourth transition method (transition D) of an electronic device 600 according to various embodiments.

Referring to FIG. 15, according to various embodiments, in operation 1501, the electronic device 600 may display a first image corresponding to a first screen direction on the flexible display 630. For example, the electronic device 600 may display the first image based on the screen direction (e.g., vertical direction or horizontal direction) corresponding to the current rotation angle of the electronic device 600, identified using the sensor 620. The size of the first image may correspond to the size of the area (e.g., the first display area A1), exposed to the outside of the housing, of the flexible display 630.

According to various embodiments, in operation 1503, the electronic device 600 may identify first information associated with the first display operation (e.g., the rotation display operation) associated with the rotation of the electronic device 600 and, in operation 1505, identify second information associated with the second display operation (e.g., the slide display operation) associated with the slide of the electronic device 600. For example, the electronic device 600 may obtain information associated with the rotation display operation (e.g., the first display operation) based on the rotation display operation (e.g., the first display operation) being performed based on the occurrence of the rotation event and obtain information associated with the slide display operation (e.g., the second display operation) based on the slide display operation (e.g., the second display operation) being performed based on the occurrence of the slide event. For example, the information associated with the rotation display operation may include information about at least one of the start time or end time of the rotation display operation. As another example, the rotation display operation-associated information may include information about at least one of the start time or end time of the rotation display operation. The operation in which the electronic device 600 obtains information about at least one of the start time or end time of each display operation (e.g., the rotation display operation and the slide display operation) may be performed like the above-described operation of the processor (e.g., the information acquisition module 663), and a further detailed description thereof is thus omitted.

According to various embodiments, the electronic device 600 may perform the operation of comparing the respective start times of the display operations and comparing the respective end times of the display operations, based on the associated information for each display operation (e.g., the rotation display operation and/or the slide display operation) as in operations 1507 to 1509 based on both the rotation display operation and the slide display operation being performed according to the occurrence of both the rotation event and the slide event.

According to various embodiments, in operation 1507, the electronic device 600 may determine whether the start time of the first display operation (e.g., the rotation display operation) is equal to or before the start time of the second display operation (e.g., the slide display operation). When the start time of the first display operation (e.g., the rotation display operation) is equal to or before the start time of the second display operation (e.g., the slide display operation) (Yes in 1507), the electronic device 600 may determine whether the end time of the first display operation (e.g., the rotation display operation) is before the end time of the second display operation (e.g., the slide display operation) in operation 1509. Further, when the start time of the first display operation (e.g., the rotation display operation) is neither equal to nor before (or when it is after) the start time of the second display operation (e.g., the slide display operation) (No in 1507), the electronic device 600 may determine whether the end time of the first display operation (e.g., the rotation display operation) is equal to or before the end time of the second display operation (e.g., the slide display operation) in operation 1511. For example, as shown in 1601 of FIG. 16, the electronic device 600 may determine the temporal relationship between the first start time and the second start time based on comparing the first start time of the rotation display operation (e.g., the first display operation) and the second start time of the slide display operation (e.g., the second display operation). Further, as shown in 1602 of FIG. 16, the electronic device 600 may determine the temporal relationship between the first end time and the second end time based on comparing the first end time of the rotation display operation (e.g., the first display operation) and the second end time of the slide display operation (e.g., the second display operation). Meanwhile, without limited to those described, the electronic device 600 may perform the operation of comparing the end times earlier than the operation of comparing the start times or may simultaneously perform the operation of comparing the start times and the operation of comparing the end times.

According to various embodiments, the electronic device 600 may determine a transition method as shown in Table 1 below and FIGS. 17A to 17D, based on the information about the temporal relationship in start time and the temporal relationship in end time, identified based on the results of performing operations 1507 to 1511.

TABLE 1

| Number | Ordinal relationship in start time | Ordinal relationship in end time | Transition method |
| --- | --- | --- | --- |
| 1 (1701a of FIG. 17A) | st1 < st2 | tt1 < tt2 | transition A |

TABLE 1-continued

| Number | Ordinal relationship in start time | Ordinal relationship in end time | Transition method |
|---|---|---|---|
| 2 (1702a of FIG. 17A) | st1 = st2 | tt1 < tt2 | |
| 3 (1701b of FIG. 17B) | st1 < st2 | tt1 = tt2 | transition B |
| 4 (1702b of FIG. 17B) | st1 < st2 | tt1 < tt2 | |
| 5 (1703b of FIG. 17B) | st1 = st2 | tt1 = tt2 | |
| 6 (1704b of FIG. 17B) | st1 = st2 | tt1 < tt2 | |
| 7 (1701c of FIG. 17C) | st1 > st2 | tt1 < tt2 | transition C |
| ... | ... | ... | |
| 9 (1701d of FIG. 17D) | st1 > st2 | tt1 = tt2 | transition D |
| 10 (1702d of FIG. 17D) | st1 > st2 | t1 < tt2 | |

Referring to FIG. 17A and Table 1 above, the electronic device 600 may select the first transition method (transition A) when the first start time of the first display operation (e.g., the rotation display operation) is equal to or before the second display operation (e.g., the slide display operation), and the first end time of the first display operation (e.g., the rotation display operation) is before the second end time of the second display operation (e.g., the slide display operation) (Yes in 1509). For example, the first transition method (transition A) may be a graphic processing method that sequentially triggers the electronic device 600 to perform the slide display operation after performing the rotation slide display operation in which the rotation display operation and the slide display operation are simultaneously performed. Referring to FIG. 17B and Table 1 above, the electronic device 600 may select the second transition method (transition B) when the first start time of the first display operation (e.g., the rotation display operation) is equal to or before the second display operation (e.g., the slide display operation), and the first end time of the first display operation (e.g., the rotation display operation) is not before (or is equal to or after) the second end time of the second display operation (e.g., the slide display operation) (No in 1509). For example, the second transition method (transition B) may be a graphic processing method that triggers the electronic device 600 to perform the rotation slide display operation in which the rotation display operation and the slide display operation are simultaneously performed.

Referring to FIG. 17C and Table 1 above, the electronic device 600 may select the third transition method (transition C) when the first start time of the first display operation (e.g., the rotation display operation) is not equal to nor before (or is after) the second display operation (e.g., the slide display operation), and the first end time of the first display operation (e.g., the rotation display operation) is equal to or before the second end time of the second display operation (e.g., the slide display operation) (Yes in 1511). For example, the third transition method (transition C) may be a graphic processing method that sequentially performs the slide display operation and triggers the electronic device 600 to perform the rotation slide display operation in which the rotation display operation and the slide display operation are simultaneously performed and perform the slide display operation again. In this case, in a case where the third transition method (transition C) is selected, as the end time tt2 of the rotation display operation is changed to be equal to the end time of the slide display operation (change to tt2'), the rotation slide display operation may be performed after the slide display operation. The change of the end time tt2 of the rotation display operation to be equal to the end time of the slide display operation (change to tt2') may be performed as the start time st2 is changed to a delayed start time st2'.

Referring to FIG. 17D and Table 1 above, the electronic device 600 may select the fourth transition method (transition D) when the first start time of the first display operation (e.g., the rotation display operation) is not equal to nor before (or is after) the second display operation (e.g., the slide display operation), and the first end time of the first display operation (e.g., the rotation display operation) is not equal to nor before (or is after) the second end time of the second display operation (e.g., the slide display operation) (Yes in 1511). For example, the fourth transition method (transition D) may be a graphic processing method that sequentially performs the slide display operation and triggers the electronic device 600 to perform the slide display operation and perform the rotation slide display operation in which the rotation display operation and the slide display operation are simultaneously performed.

An example of an operation of the electronic device 600 based on each transition method according to various embodiments is described below in connection with FIGS. 18 to 25.

An example of an operation of an electronic device 600 is described below according to various embodiments.

According to various embodiments, the electronic device 600 may perform the operation based on the first transition method (transition A) when the first start time of the first display operation (e.g., the rotation display operation) is equal to or before the second display operation (e.g., the slide display operation), and the first end time of the first display operation (e.g., the rotation display operation) is before the second end time of the second display operation (e.g., the slide display operation).

Figure 18:
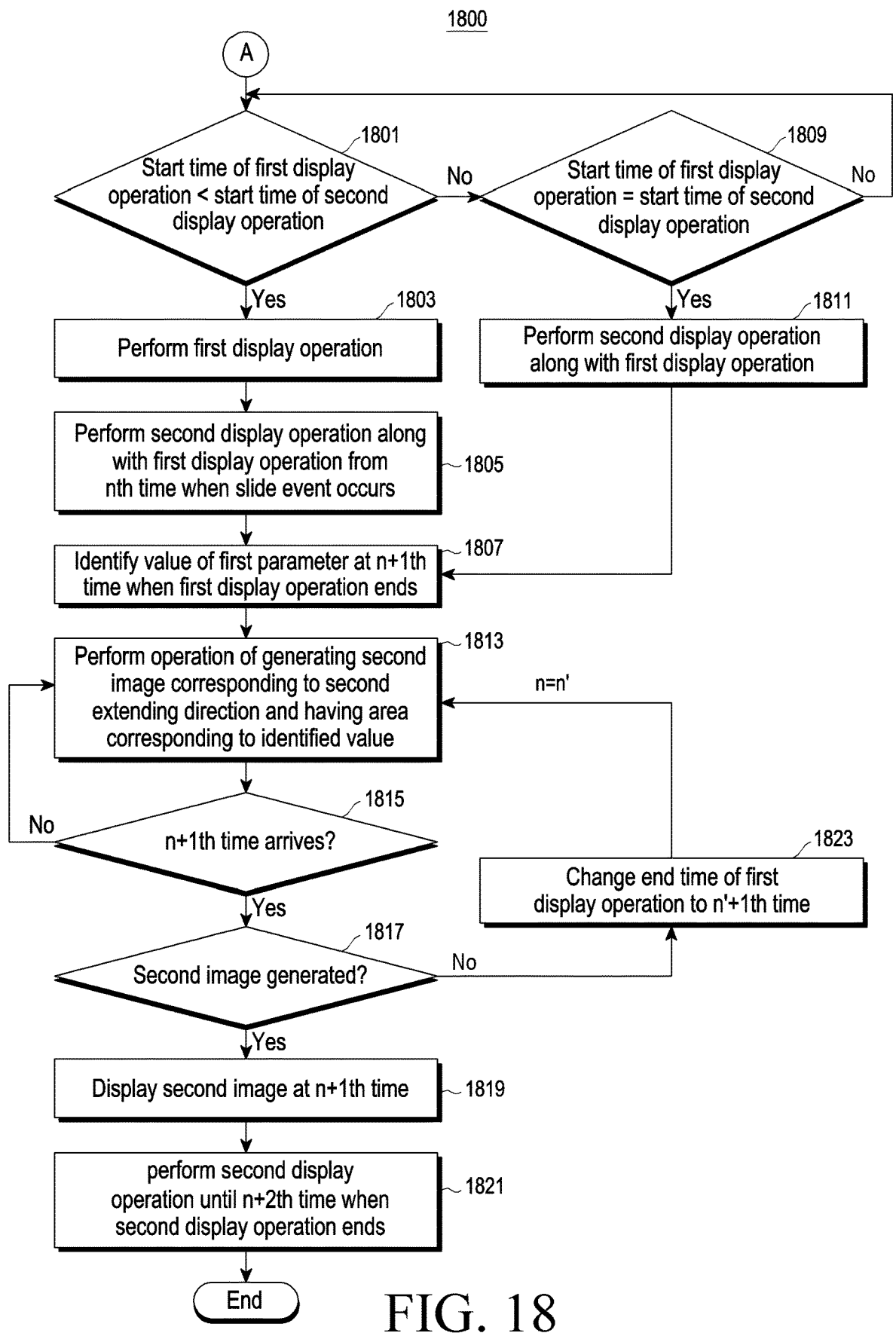
FIG. 18 is a flowchart illustrating an example of an operation of an electronic device according to various embodiments.

FIG. 18 is a flowchart 1800 illustrating an example of an operation of an electronic device 600 according to various embodiments. According to various embodiments, the operations shown in FIG. 18 are not limited to the shown order but may rather be performed in other various orders. According to various embodiments, more or less operations than those of FIG. 18 may be performed. FIG. 18 is described below with reference to FIG. 19. "A<B", "A=B", and "A>B" in FIG. 18 may represent temporal ordinal relationships between time A and time B. For example, "A<B" may denote that time A is before time B, "A=B" may denote that time A is the same as time B, and "A>B" may denote that time A is after time B.

Figure 19:
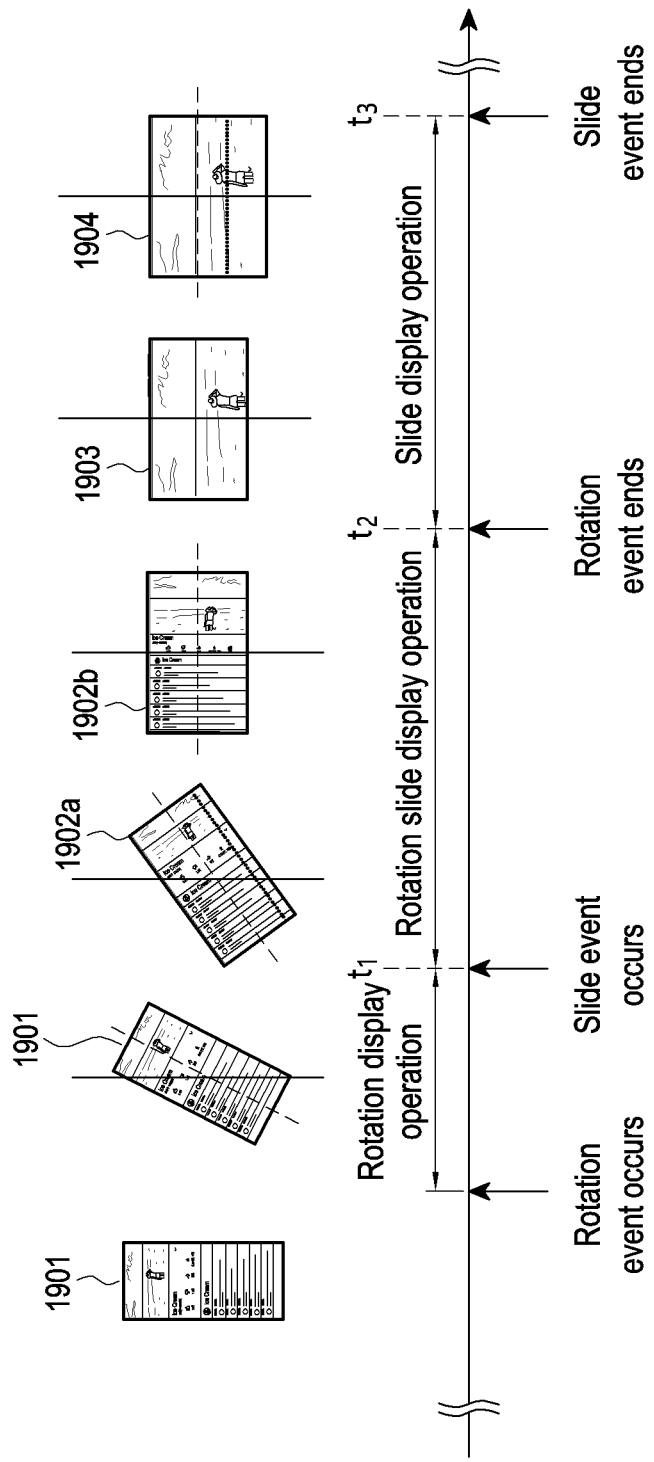
FIG. 19 is a view illustrating an example of selecting a first transition method (transition A) of an electronic device according to various embodiments.

FIG. 19 is a view illustrating an example of selecting a first transition method (transition A) of an electronic device 600 according to various embodiments.

Referring to FIGS. 18 and 19, according to various embodiments, in operation 1801, the electronic device 600 may determine whether the first start time of the first display operation (e.g., the rotation display operation) is before the second start time of the second display operation (e.g., the slide display operation) and, when the first start time of the first display operation (e.g., the rotation display operation) is before the second start time of the second display operation (e.g., the slide display operation) (Yes in 1801), perform the first display operation (e.g., the rotation display operation) in operation 1803 and, in operation 1805, perform the second display operation along with the first display operation from the nth time when the slide event occurs. For example, referring to FIG. 18, the electronic device 600 may display a first image 1901 based on the first screen direction (e.g., vertical direction) and identify an occurrence of a rotation event while displaying the first image 1901. The electronic device 600 may perform the rotation display operation (e.g., the first display operation) based on the occurrence of the rotation event. As at least part of the rotation display operation, the electronic device 600 may obtain the image 1901 (e.g., the first image) displayed on the flexible display 630 at the time of the occurrence of the rotation event, sequentially (or gradually) change the degree of rotation of the obtained image 1901, and display the image (e.g., the first image) whose degree of rotation is sequentially changed. The electronic device 600 may identify an occurrence of a slide event at a first time t1 (nth time, where n=1) while performing the rotation display operation (e.g., the first display operation). The electronic device 600 may perform the rotation slide display operation from the first time t1 (nth time, where n=1) based on the first transition method (transition A) selected based on identifying that both the rotation event and the slide event occur. A duplicate description of the operation of selecting the first transition method by the electronic device 600 is omitted. For example, the electronic device 600 may display, on the flexible display 630, a plurality of images 1902a and 1902b whose degree of rotation and size are sequentially changed by sequentially changing the size of the first image while sequentially changing the degree of rotation of the first image from the first time t1 (nth time, where n=1).

According to various embodiments, the electronic device 600 may identify the value of the parameter associated with the size of the flexible display 630 at the n+1th time when the first display operation (e.g., the rotation display operation) is ended in operation 1807 and perform the operation of generating a second image corresponding to the second screen direction and having a size corresponding to the identified value in operation 1809. For example, based on selection of the first transition method (transition A), the electronic device 600 may perform the operation of obtaining (or drawing) an image 1903 (e.g., the second image) to be displayed at the second time t2 (n+1th time, where n=1) when the first display operation (e.g., the rotation display operation) is ended, before arriving at the second time t2 (n+1th time, where n=1) when the first display operation (e.g., the rotation display operation) is ended. The electronic device 600 may identify the execution time of the first display operation (e.g., the rotation display operation) based on information associated with the first display operation (e.g., the rotation display operation) and identify the second time t2 (n+1th time, where n=1) when the first display operation (e.g., the rotation display operation) is ended, by adding the execution time to the first time (nth time, where n=1). The electronic device 600 may identify information about the size of the flexible display 630 corresponding to the identified second time t2 (n+1th time, where n=1), based on the time required from the current time (e.g., the first time t1) to the second time t2 and the rotation speed of the motor at the current time (e.g., the first time t1). As a result, before arriving at the second time t2 (n+1th time, where n=1) when the first display operation (e.g., the rotation display operation) is ended, the electronic device 600 may perform the operation of obtaining the second image 1903 having the second size corresponding to the identified size and corresponding to the second screen direction (e.g., vertical direction). In an embodiment, the electronic device 600 may perform the operation of obtaining the second image 1903 corresponding to the second screen direction and resizing the size of the obtained second image 1903 to the size of the identified parameter value, thereby obtaining the second image 1903 having the second size and corresponding to the second screen direction. In another embodiment, the electronic device 600 may request the application to redraw an image corresponding to the second screen direction and the identified size, thereby obtaining the second image 1903 having the second size and corresponding to the second screen direction from the application.

According to various embodiments, when the first start time of the first display operation (e.g., the rotation display operation) is not before the second start time of the second display operation (e.g., the slide display operation) (No in 1801), the electronic device 600 may determine whether the first start time of the first display operation (e.g., the rotation display operation) is equal to the second start time of the second display operation (e.g., the slide display operation) in operation 1811 and, when the first start time of the first display operation (e.g., the rotation display operation) is equal to the second start time of the second display operation (e.g., the slide display operation) (Yes in 1811), perform the second display operation along with the first display operation in operation 1813. For example, a rotation event and a slide event may simultaneously occur. The electronic device 600 may perform the rotation slide display operation based on the first transition method (transition A) selected based on identifying that both the rotation event and the slide event occur. As in operations 1807 and 1809 described above, based on selection of the first transition method (transition A), the electronic device 600 may perform the operation of obtaining (or drawing) the image 1903 (e.g., the second image) to be displayed at the time (n+1th time) when the first display operation (e.g., the rotation display operation) is ended, before arriving at the time (n+1th time) when the first display operation (e.g., the rotation display operation) is ended.

According to various embodiments, the electronic device 600 may perform the operation of generating a designated number of second images 1903, as at least part of the operation of obtaining the second image 1903 having the second size and corresponding to the second extending direction. For example, the electronic device 600 may perform the operation of generating a plurality of second images. In this case, the plurality of second images may include an image corresponding to the parameter value at the second time and images corresponding to the parameter values for each length sensing period is from the second time. In other words, the plurality of second images are images of different sizes, and the size difference may correspond to the size between the sizes of the externally exposed area (e.g., the first display area A1) of the flexible display 630 per length sensing period ts.

According to various embodiments, the electronic device 600 may determine whether the n+1th time arrives in operation 1815 and, when the n+1th time arrives (Yes in 1815), determine whether a second image is generated in operation 1817. For example, referring to FIG. 19, the electronic device 600 may determine whether a second image is generated at the second time t2 (n+1th time, where n=1) when the first display operation (e.g., the rotation display operation) is expected to be terminated. Or without limited to those described and/or shown, the electronic device 600 may perform the operation of determining whether the second image is generated, a preset time before the second time t2 (n+1th time, where n=1) when the first display operation (e.g., the rotation display operation) is expected to be terminated.

According to various embodiments, when the second image is generated (Yes in 1817), the electronic device 600 may display the second image at the n+1th time in operation 1819 and, in operation 1821, perform the second display operation (e.g., the slide display operation) from the n+1th time to the n+2th time when the second display operation is terminated. For example, referring to FIG. 19, the electronic device 600 may display the second image 1903 having the second size corresponding to the size of the externally exposed area (e.g., the first display area A1) of the flexible display 630 at the second time t2 and corresponding to the second screen direction (e.g., horizontal direction), generated at the second time t2 (n+1th time, where n=1) when the rotation display operation (e.g., the first display operation) is terminated. The electronic device 600 may display the second image 1903 and continuously perform the slide display operation (e.g., the second display operation) until the third time t3 (n+2th time, where n=1) when the slide display operation is terminated. The electronic device 600 may display an image 1904 having the size corresponding to the size of the area of the display 630 whose slide has been completed and corresponding to the second screen direction (e.g., horizontal direction) after the third time t3.

According to various embodiments, when no second image is generated (No in 1817), the electronic device 600 may change the end time of the first display operation to the n+1th time in operation 1823. For example, when a second image 1903 is not generated until the second time t2 (n+1th time, where n=1), the electronic device 600 may change the end time of the first display operation (e.g., the rotation display operation) to a time after the second time t2 (n+1th time, where n=1). Thereafter, the electronic device 600 may continue the operation of generating the second image as in operation 1809 described above. The electronic device 600 may determine whether a second image is generated at the n+1th time which is the changed end time in operations 1815 and 1817 described above and, when a second image is generated, continuously display the second image and perform the slide display operation (e.g., the second display operation) as in operations 1819 to 1821. When no second image is generated, the electronic device 600 may change the end time of the rotation display operation (e.g., the first display operation) in operation 1823.

According to various embodiments, when the operation of generating a designated number of second images is performed, the electronic device 600 may determine whether the number of second images generated is a designated number in operation 1817. When the designated number of second images are generated, the electronic device 600 may perform operations 1819 to 1821. Unless the designated number of second images are generated, the electronic device 600 may perform the operation of changing the end time of the first display operation (e.g., the rotation display operation) based on the difference between the number of the generated second images and the designated number, as at least part of operation 1823. For example, the electronic device 600 may change the end time to a later time in proportion to the difference between the number of the generated second images and the designated number. In other words, as the number of second images not generated increases, the electronic device 600 may change the end time of the rotation display operation to a time later than the existing end time of the rotation display operation.

According to various embodiments, it has been described that the electronic device 600 generates the second image having the second size even after changing the end time of the rotation display operation. However, without limited to the described example, the electronic device 600 may perform the operation of generating a third image having a third size corresponding to the parameter value corresponding to the changed end time, based on the change of the end time.

An example of an operation of an electronic device 600 is described below according to various embodiments.

According to various embodiments, the electronic device 600 may perform the operation based on the second transition method (transition B) when the first start time of the first display operation (e.g., the rotation display operation) is equal to or before the second display operation (e.g., the slide display operation), and the first end time of the first display operation (e.g., the rotation display operation) is not before (or is equal to or after) the second end time of the second display operation (e.g., the slide display operation).

Figure 20:
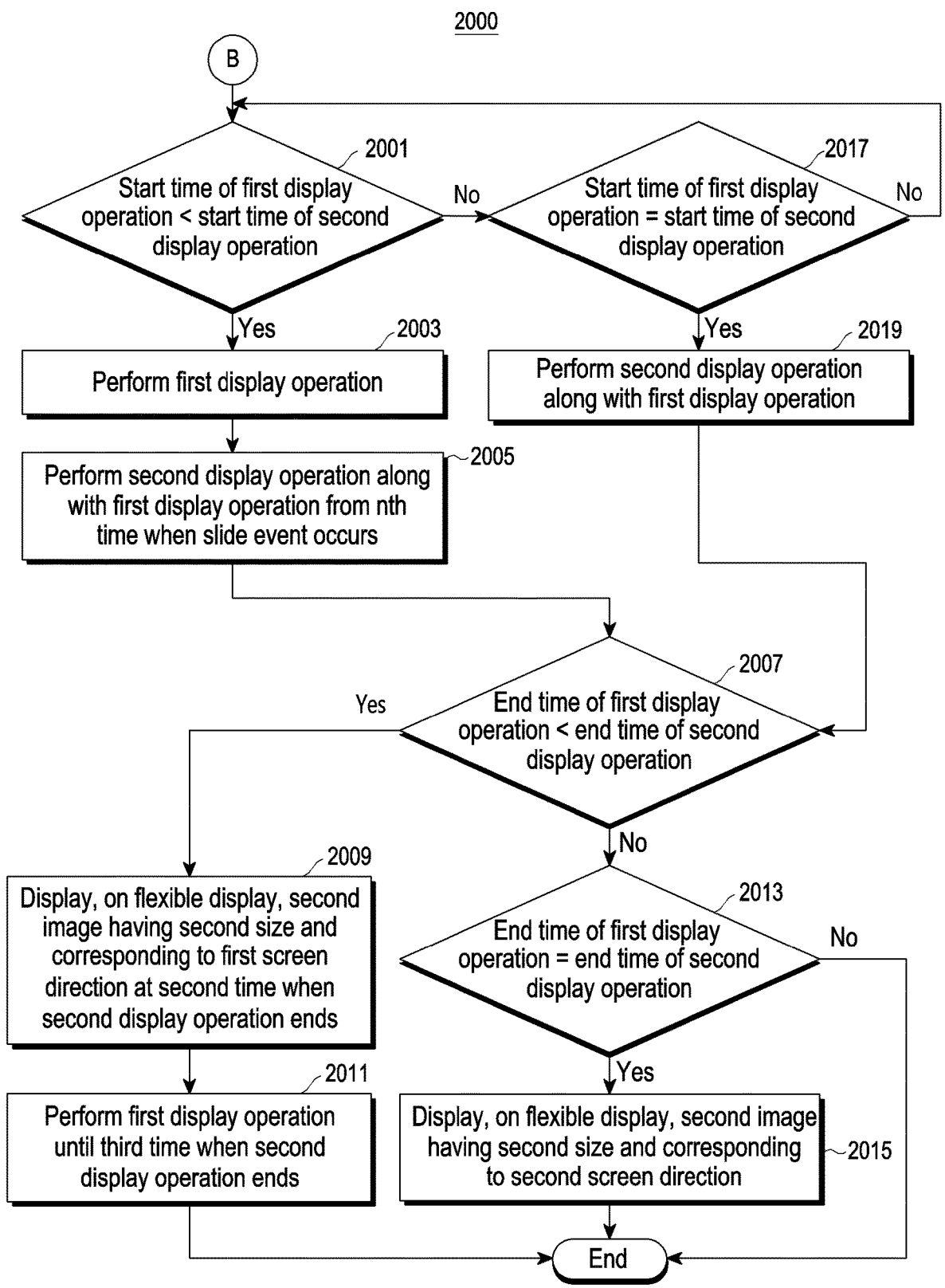
FIG. 20 is a flowchart illustrating an example of an operation of an electronic device according to various embodiments.

FIG. 20 is a flowchart 2000 illustrating an example of an operation of an electronic device 600 according to various embodiments. According to various embodiments, the operations shown in FIG. 20 are not limited to the shown order but may rather be performed in other various orders. According to various embodiments, more or less operations than those of FIG. 20 may be performed. FIG. 20 is described below with reference to FIG. 21. "A<B", "A=B", and "A>B" in FIG. 20 may represent temporal ordinal relationships between time A and time B. For example, "A<B" may denote that time A is before time B, "A=B" may denote that time A is the same as time B, and "A>B" may denote that time A is after time B.

Figure 21:
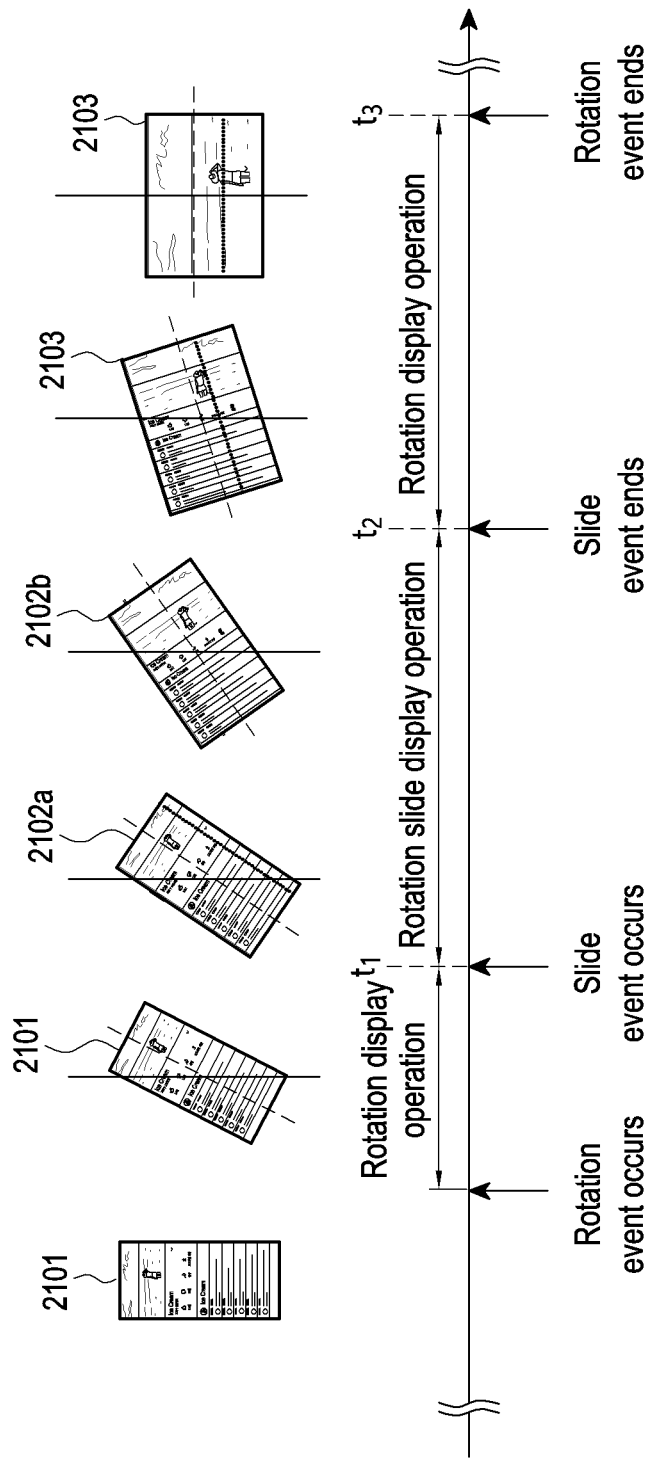
FIG. 21 is a view illustrating an example of selecting a second transition method (transition B) of an electronic device according to various embodiments.

FIG. 21 is a view illustrating an example of selecting a second transition method (transition B) of an electronic device 600 according to various embodiments.

Referring to FIGS. 20 and 21, according to various embodiments, in operation 2001, the electronic device 600 may determine whether the first start time of the first display operation (e.g., the rotation display operation) is before the second start time of the second display operation (e.g., the slide display operation) and, when the first start time of the first display operation (e.g., the rotation display operation) is before the second start time of the second display operation (e.g., the slide display operation) (Yes in 2001), perform the first display operation (e.g., the rotation display operation) in operation 2003 and, in operation 2005, perform the second display operation along with the first display operation from the first time t1 when the slide event occurs.

Referring to FIG. 20, the electronic device 600 may display a first image 2101 based on the first extending direction (e.g., vertical direction) and identify an occurrence of a rotation event while displaying the first image 2101. The electronic device 600 may perform the rotation display operation (e.g., the first display operation) based on the occurrence of the rotation event. As at least part of the rotation display operation, the electronic device 600 may obtain the image (e.g., the first image 2101) displayed on the flexible display 630 at the time of the occurrence of the rotation event, sequentially (or gradually) change the degree of rotation of the first image 2101, and display the first image 2101 (e.g., the first image) whose degree of rotation is sequentially changed. The electronic device 600 may identify an occurrence of a slide event at a first time t1 while performing the rotation display operation (e.g., the first display operation). The electronic device 600 may perform the rotation slide display operation from the first time t1 based on the second transition method (transition B) selected based on identifying that both the rotation event and the slide event occur. A duplicate description of the operation of selecting the second transition method (transition B) by the electronic device 600 is omitted. For example, the electronic device 600 may sequentially change the size of the first image 2101 while sequentially changing the degree of rotation of the first image 2101 from the first time t1 and display, on the flexible display 630, a plurality of images 2102*a* and 2102*b* whose degree of rotation and size are sequentially changed.

According to various embodiments, in operation 2007, the electronic device 600 may determine whether the first end time of the first display operation (e.g., the rotation display operation) is before the second end time of the second display operation (e.g., the slide display operation) and, when the first end time of the first display operation (e.g., the rotation display operation) is before the second end time of the second display operation (e.g., the slide display operation) (Yes in 2007), display the second image corresponding to the second screen direction at the second time t2 when the second display operation is terminated in operation 2009 and perform the first display operation (e.g., the rotation display operation) until the third time t3 when the second display operation is terminated, in operation 2011. For example, referring to FIG. 21, the slide display operation (e.g., the second display operation) may be terminated earlier than the rotation display operation (e.g., the first display operation). Based on the termination of the slide display operation (e.g., the second display operation), the electronic device 600 may stop performing the rotation slide display operation and continuously perform the rotation display operation until the third time t3 when the rotation display operation (e.g., the first display operation) is terminated. For example, the electronic device 600 may display a second image 2103 having the second size corresponding to the size of the externally exposed area (e.g., the first display area A1) of the flexible display 630, which has been completed for the slide (e.g., slide-in or slide-out), and corresponding to the first screen direction (e.g., vertical direction) at the second time t2. In this case, the degree of rotation of the second image 2103 may be a degree of rotation corresponding to the time when the rotation display operation has been performed. Continuously, the electronic device 600 may sequentially change the degree of rotation of the second image 2103 until the third time t3 and display the second image 2103 whose degree of rotation is sequentially changed. The electronic device 600 may display an image 2104 having the size corresponding to the size of the area of the display 630 whose slide has been completed and corresponding to the second screen direction (e.g., horizontal direction) after the third time t3.

According to various embodiments, when the first end time of the first display operation (e.g., the rotation display operation) is not before the second end time of the second display operation (e.g., the slide display operation) (No in 2007), the electronic device 600 may determine whether the first end time of the first display operation (e.g., the rotation display operation) is equal to the second end time of the second display operation (e.g., the slide display operation) in operation 2013 and, when the first end time of the first display operation (e.g., the rotation display operation) is equal to the second end time of the second display operation (e.g., the slide display operation) (Yes in 2013), display the second image having the second size and corresponding to the second screen direction in operation 2015. For example, when the slide display operation (e.g., the second display operation) and the rotation display operation (e.g., the first display operation) are simultaneously terminated, the electronic device 600 may display the second image 2104 having the second size corresponding to the size of the externally exposed area (e.g., the first display area A1) of the flexible display 630, which has been completed for the slide (e.g., slide-in or slide-out), and corresponding to the second screen direction (e.g., horizontal direction).

According to various embodiments, when the first start time of the first display operation (e.g., the rotation display operation) is not before the second start time of the second display operation (e.g., the slide display operation) (No in 2001), the electronic device 600 may determine whether the first start time of the first display operation (e.g., the rotation display operation) is equal to before the second start time of the second display operation (e.g., the slide display operation) in operation 2017 and, when the first start time of the first display operation (e.g., the rotation display operation) is equal to before the second start time of the second display operation (e.g., the slide display operation) (Yes in 2017), perform the second display operation along with the first display operation in operation 2019. For example, a rotation event and a slide event may simultaneously occur. The electronic device 600 may perform the rotation slide display operation based on the second transition method (transition B) selected based on identifying that both the rotation event and the slide event occur. Continuously, as in operations 2007 and 2015 described above, the electronic device 600 may terminate the rotation slide display operation and continuously perform the rotation display operation or perform the operation of displaying the second image having the second size and corresponding to the second screen direction according to the temporal relationship between the first end time of the first display operation (e.g., the rotation display operation) and the second end time of the second display operation (e.g., the slide display operation).

An example of an operation of an electronic device 600 is described below according to various embodiments.

According to various embodiments, the electronic device 600 may perform the operation based on the third transition method (transition C) when the first start time of the first display operation (e.g., the rotation display operation) is not equal to nor before (or is after) the second display operation (e.g., the slide display operation), and the first end time of the first display operation (e.g., the rotation display operation) is equal to or before the second end time of the second display operation (e.g., the slide display operation).

Figure 22:
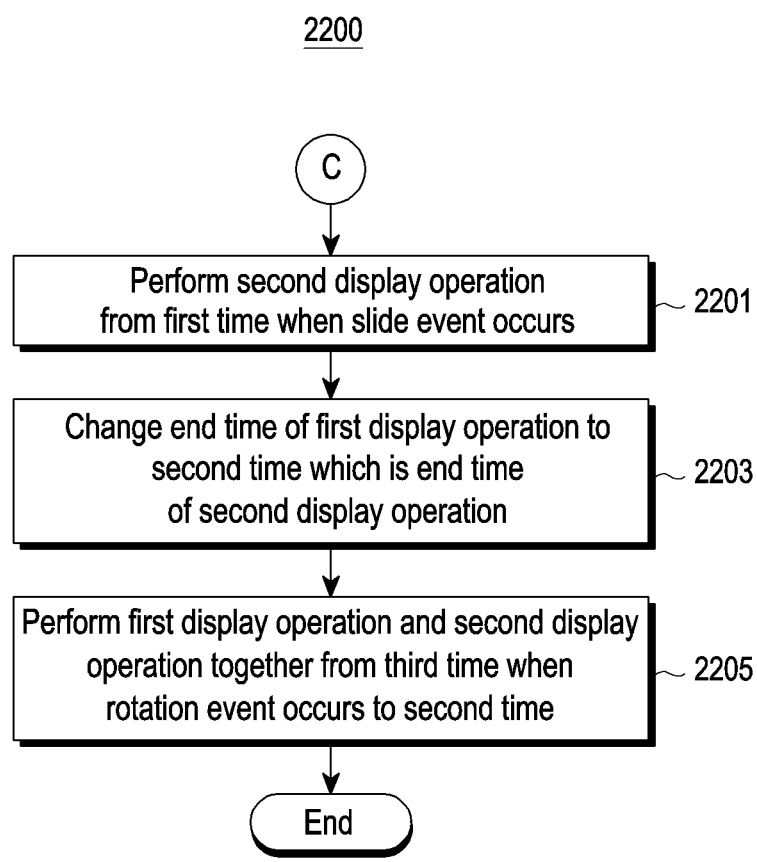
FIG. 22 is a flowchart illustrating an example of an operation of an electronic device according to various embodiments.

FIG. 22 is a flowchart 2200 illustrating an example of an operation of an electronic device 600 according to various embodiments. According to various embodiments, the operations shown in FIG. 22 are not limited to the shown order but may rather be performed in other various orders. According to various embodiments, more or less operations than those of FIG. 22 may be performed. FIG. 22 is described below with reference to FIG. 23. "A<B", "A=B", and "A>B" in FIG. 22 may represent temporal ordinal relationships between time A and time B. For example, "A<B" may denote that time A is before time B, "A=B" may denote that time A is the same as time B, and "A>B" may denote that time A is after time B.

Figure 23:
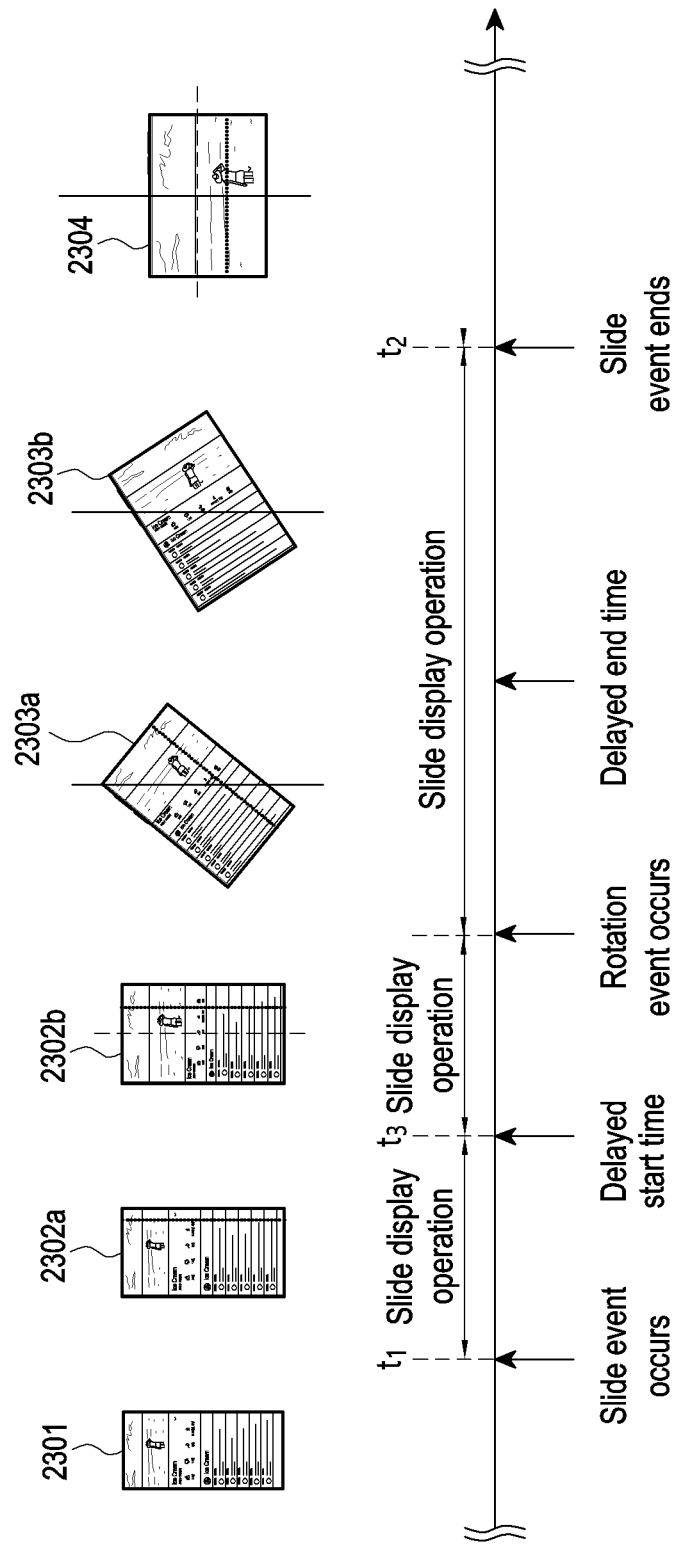
FIG. 23 is a view illustrating an example of selecting a third transition method (transition C) of an electronic device according to various embodiments.

FIG. 23 is a view illustrating an example of selecting a third transition method (transition C) of an electronic device 600 according to various embodiments.

Referring to FIGS. 22 and 23, according to various embodiments, in operation 2201, the electronic device 600 may perform the second display operation (e.g., the slide display operation) from the first time t1 when the slide event occurs. Referring to FIG. 23, the electronic device 600 may display a first image 2301 based on the first extending direction (e.g., vertical direction) and identify an occurrence of a slide event while displaying the first image 2301. The electronic device 600 may perform the slide display operation (e.g., the second display operation) based on the occurrence of the slide event. As at least part of the slide display operation, the electronic device 600 may sequentially (or gradually) change the size of the first image 2301 (e.g., the first image) displayed on the flexible display 630 and display images 2302a and 2303b whose size is sequentially changed.

According to various embodiments, in operation 2203, the electronic device 600 may change the end time of the first display operation to the second time t2 which is the end time of the second display operation and, in operation 2205, perform the second display operation along with the first display operation from the third time t3 when the rotation event occurs to the second time t2. For example, referring to FIG. 23, the electronic device 600 may identify the occurrence of the rotation event at the third time t3 while performing the slide display operation. The electronic device 600 may perform a processing operation to allow the end time of the rotation display operation (e.g., the first display operation) to be equal to the end time (e.g., the second time t2) of the slide display operation (e.g., the second display operation) based on the third transition method (transition C) selected based on identifying that both the rotation event and the slide event occur. For example, the electronic device 600 may change the start time of the rotation display operation (e.g., the first display operation) to a time (delayed start time) which is after the difference between the end time of the rotation display operation (e.g., the first display operation) and the end time of the slide display operation (e.g., the second display operation) while maintaining the execution time of the rotation display operation (e.g., the first display operation). As another example, the electronic device 600 may extend the execution time of the rotation display operation (e.g., the first display operation) by the difference between the end time of the rotation display operation (e.g., the first display operation) and the end time of the slide display operation (e.g., the second display operation) while maintaining the start time of the rotation display operation (e.g., the first display operation). Accordingly, referring to FIG. 23, the electronic device 600 may perform the rotation slide display operation until the second time t2, based on performing the rotation display operation until the second time t2 which is the delayed end time. For example, the electronic device 600 may sequentially change the size of the first image while sequentially changing the degree of rotation of the first image until the second time t2 and display, on the flexible display 630, a plurality of images 2303a and 2303b whose degree of rotation and size are sequentially changed. The electronic device 600 may display an image 2304 having the size corresponding to the size of the area of the display 630 whose slide has been completed and corresponding to the second screen direction (e.g., horizontal direction) after the second time t2.

An example of an operation of an electronic device 600 is described below according to various embodiments.

According to various embodiments, the electronic device 600 may perform the operation based on the fourth transition method (transition D) when the first start time of the first display operation (e.g., the rotation display operation) is not equal to nor before (or is after) the second display operation (e.g., the slide display operation), and the first end time of the first display operation (e.g., the rotation display operation) is not equal to nor before (or is after) the second end time of the second display operation (e.g., the slide display operation).

Figure 24:
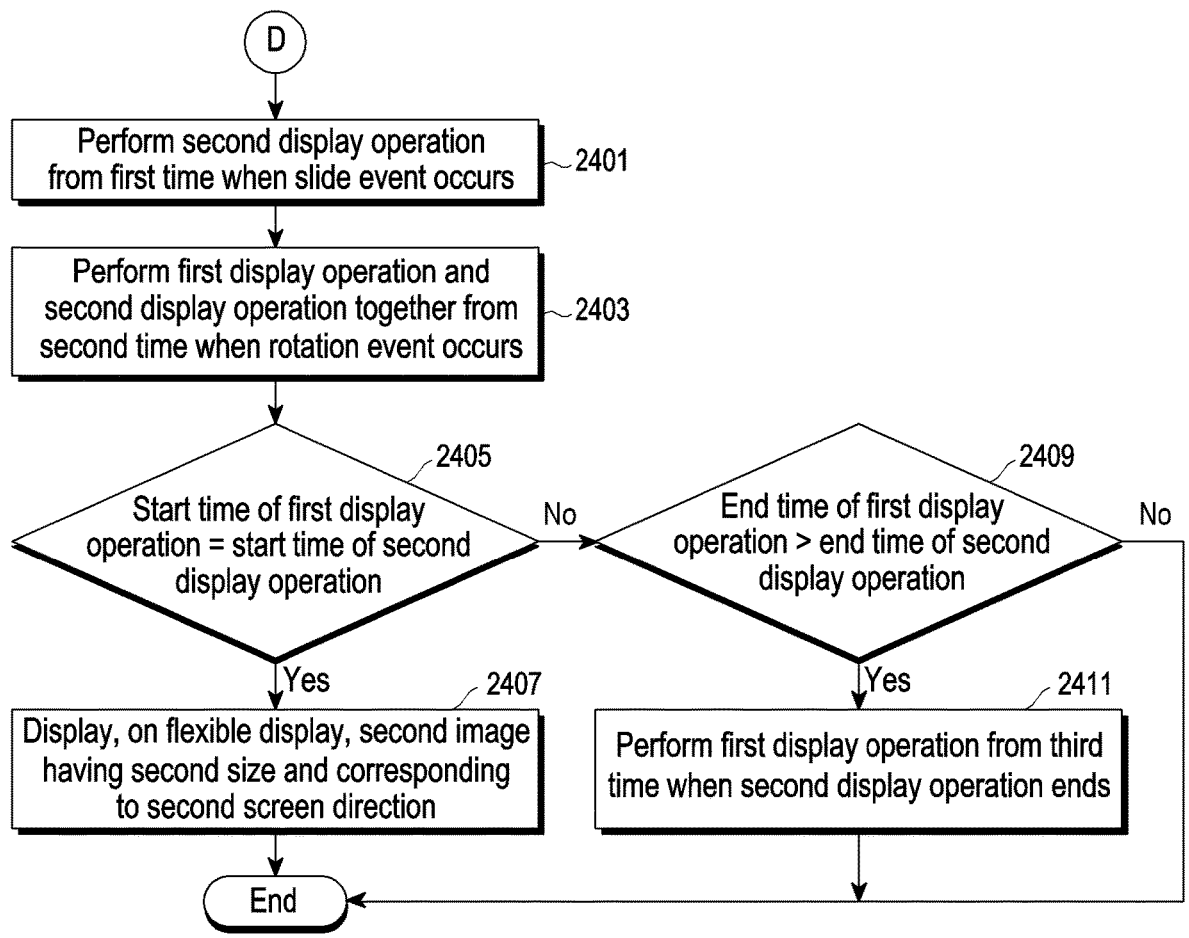
FIG. 24 is a flowchart illustrating an example of an operation of an electronic device according to various embodiments.

FIG. 24 is a flowchart 2400 illustrating an example of an operation of an electronic device 600 according to various embodiments. According to various embodiments, the operations shown in FIG. 24 are not limited to the shown order but may rather be performed in other various orders. According to various embodiments, more or less operations than those of FIG. 24 may be performed. FIG. 24 is described below with reference to FIG. 25. "A<B", "A=B", and "A>B" in FIG. 24 may represent temporal ordinal relationships between time A and time B. For example, "A<B" may denote that time A is before time B, "A=B" may denote that time A is the same as time B, and "A>B" may denote that time A is after time B.

Figure 25:
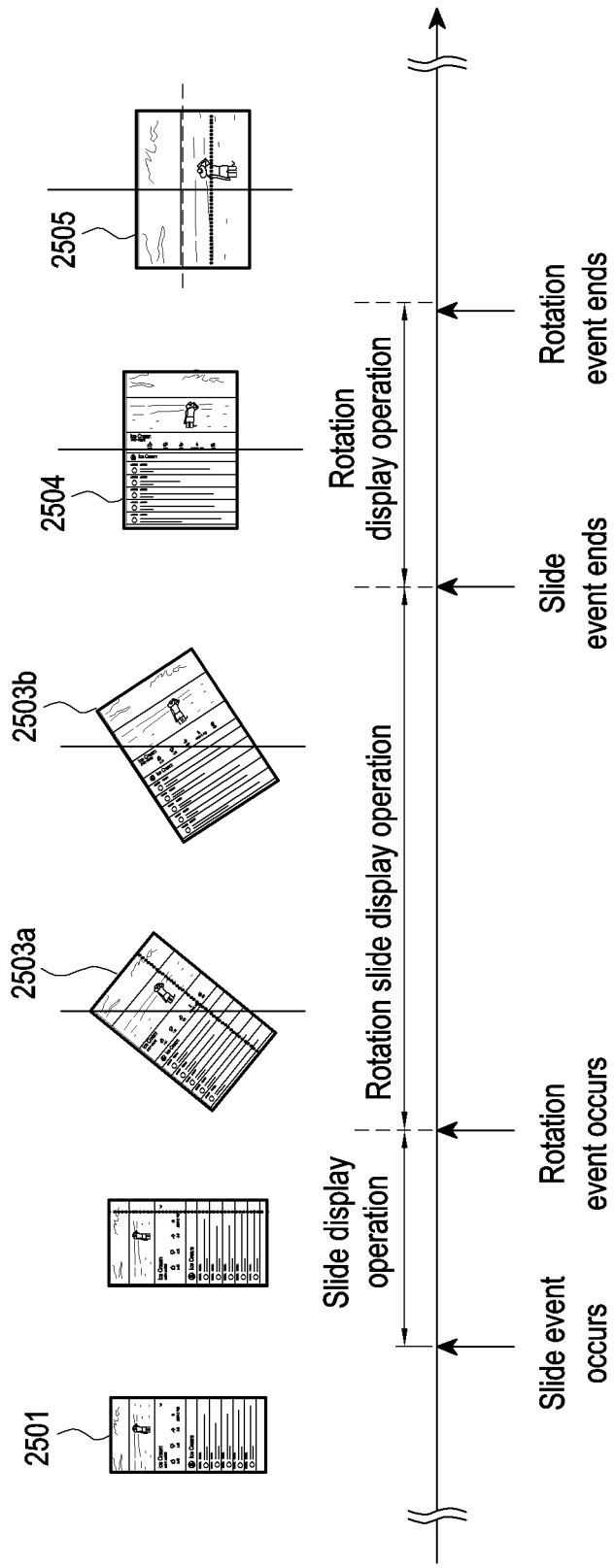
FIG. 25 is a view illustrating an example of selecting a fourth transition method (transition D) of an electronic device according to various embodiments.

FIG. 25 is a view illustrating an example of selecting a fourth transition method (transition D) of an electronic device 600 according to various embodiments.

Referring to FIGS. 24 and 25, according to various embodiments, in operation 2401, the electronic device 600 may perform the second display operation (e.g., the slide display operation) from the first time t1 when the slide event occurs. Referring to FIG. 25, the electronic device 600 may display a first image 2501 based on the first extending direction (e.g., vertical direction) and identify an occurrence of a slide event at the first time t1 while displaying the first image 2501. The electronic device 600 may perform the slide display operation (e.g., the second display operation) based on the occurrence of the slide event. As at least part of the slide display operation, the electronic device 600 may sequentially (or gradually) change the size of the first image 2501 (e.g., the first image) displayed on the flexible display 630 and display images 2502 whose size is sequentially changed.

According to various embodiments, in operation 2403, the electronic device 600 may perform the first display operation and the second display operation together, from the second time t2 when the rotation event occurs. For example, referring to FIG. 25, the electronic device 600 may identify the occurrence of the rotation event at the second time t2 while performing the slide display operation (e.g., the second display operation). The electronic device 600 may perform the rotation slide display operation from the second time t2 based on the fourth transition method (transition D) selected based on identifying that both the rotation event and the slide event occur. For example, the electronic device 600 may sequentially change the size of the first image while sequentially changing the degree of rotation of the first image from the second time t2, displaying, on the flexible display 630, a plurality of images 2503a and 2503b whose degree of rotation and size are sequentially changed.

According to various embodiments, in operation 2405, the electronic device 600 may determine whether the first end time of the first display operation (e.g., the rotation display operation) is equal to the second end time of the second display operation (e.g., the slide display operation) and, when the first end time of the first display operation (e.g., the rotation display operation) is equal to the second end time of the second display operation (e.g., the slide display operation) (Yes in 2405), display, on the flexible display 630, the second image having the second size and corresponding to the second screen direction in operation 2407. For example, based on both the rotation display operation (e.g., the first display operation) and the slide display operation (e.g., the second display operation) being terminated, the electronic device 600 may display the image having the size corresponding to the display 630 whose slide (e.g., slide-in or slide-out) has been completed based on the second screen direction (e.g., horizontal direction).

According to various embodiments, when the first end time of the first display operation (e.g., the rotation display operation) is not equal to the second end time of the second display operation (e.g., the slide display operation) (No in 2205), the electronic device 600 may determine whether the first end time of the first display operation (e.g., the rotation display operation) is after the second end time of the second display operation (e.g., the slide display operation) in operation 2409 and, when the first end time of the first display operation (e.g., the rotation display operation) is after the second end time of the second display operation (e.g., the slide display operation) (Yes in 2409), perform the first display operation from the third time t3 when the second display operation is terminated in operation 2411. When the first display operation is terminated, the electronic device 600 may display, on the flexible display 630, the second image having the second size and corresponding to the second screen direction as described above in connection with FIG. 2207. For example, referring to FIG. 23, when the slide display operation is first terminated while the rotation slide display operation is performed, the electronic device 600 may continuously perform only the rotation display operation for displaying an image 2504 whose degree of rotation is changed until the end time of the rotation display operation. After the rotation display operation is terminated as well, the electronic device 600 may display an image 2505 having the size corresponding to the size of the display 630 whose slide (e.g., slide-in or slide-out) has been completed based on the second screen direction (e.g., horizontal direction).

According to various embodiments, there may be provided an electronic device (e.g., the electronic device 600 of FIG. 6) comprising a housing (e.g., the first housing 401 and/or second housing 402 of FIGS. 4A to 4C), a flexible display (e.g., the display 630 of FIG. 6) wherein an area of the flexible display exposed to an outside of the housing (e.g., the first housing 401 and/or second housing 402 of FIGS. 4A to 4C) is changeable, a memory (e.g., the memory 650 of FIG. 6) storing executable instructions and information about a plurality of transition methods, and at least one processor (e.g., the processor 640 of FIG. 6) operatively connected to the memory (e.g., the memory 650 of FIG. 6), wherein the instructions are configured to, when executed, enable the at least one processor (e.g., the processor 640 of FIG. 6) to identify a first event triggering a first display operation for displaying an image based on a rotation of the electronic device (e.g., the electronic device 600 of FIG. 6), identify a second event triggering a second display operation for displaying an image based on a change in the area of the flexible display (e.g., the display 630 of FIG. 6), identify at least one of first information about a temporal relationship between a first start time of the first display operation and a second start time of the second display operation or second information about a temporal relationship between a first end time of the first display operation and a second end time of the second display operation, select a transition method from among the plurality of transition methods based on at least one of the first information or the second information, and sequentially change a display attribute of an image displayed on the flexible display (e.g., the display 630 of FIG. 6) while at least one of the first display operation or the second display operation is performed based on the selected transition method.

According to various embodiments, there may be provided the electronic device (e.g., the electronic device 600 of FIG. 6), wherein the display attribute includes at least one of a size of display of the image or a degree of rotation of the image.

According to various embodiments, there may be provided the electronic device (e.g., the electronic device 600 of FIG. 6), wherein the instructions are configured to enable the at least one processor (e.g., the processor 640 of FIG. 6) to sequentially change the degree of rotation of the image as at least part of the first display operation, sequentially change the size of display of the image as at least part of the second display operation, and sequentially change the size of display of the image and the degree of rotation of the image when the first display operation and the second display operation are simultaneously performed.

According to various embodiments, there may be provided the method, wherein the instructions are configured to enable the at least one processor (e.g., the processor 640 of FIG. 6) to: sequentially change the display attribute of the image displayed on the flexible display (e.g., the display 630 of FIG. 6) by performing at least one of the first display operation or the second display operation based on the selected transition method.

According to various embodiments, there may be provided the electronic device (e.g., the electronic device 600 of FIG. 6), wherein the instructions are configured to enable the at least one processor (e.g., the processor 640 of FIG. 6) to: identify at least one of the first information or the second information based on the first display operation and the second display operation being performed by an occurrence of the first event and an occurrence of the second event and select the transition method based on at least one of the first information or the second information from among the plurality of transition methods.

According to various embodiments, there may be provided the electronic device (e.g., the electronic device 600 of FIG. 6), further comprising a first sensor for identifying a first value associated with the rotation of the electronic device (e.g., the electronic device 600 of FIG. 6), wherein the instructions are configured to enable the at least one processor (e.g., the processor 640 of FIG. 6) to obtain information associated with the rotation of the electronic device (e.g., the electronic device 600 of FIG. 6) using the first sensor, the information associated with the rotation including information about at least one of a current rotation angle of the electronic device (e.g., the electronic device 600 of FIG. 6) or a rotation angle speed of the electronic device (e.g., the electronic device 600 of FIG. 6), and obtain third information associated with the first display operation based on the information associated with the rotation, the third information including information about at least one of the first start time of the first display operation, a first execution time of the first display operation, or a first end time of the first display operation.

According to various embodiments, there may be provided the electronic device (e.g., the electronic device 600 of FIG. 6), wherein the instructions are configured to enable the at least one processor (e.g., the processor 640 of FIG. 6) to: determine the first execution time of the first display operation based on at least part of the information associated with the rotation.

According to various embodiments, there may be provided the electronic device (e.g., the electronic device 600 of FIG. 6), further comprising a motor drivable to change the area of the flexible display (e.g., the display 630 of FIG. 6) and a second sensor for identifying a second value associated with a change in the area of the flexible display (e.g., the display 630 of FIG. 6) of the electronic device (e.g., the electronic device 600 of FIG. 6), wherein the instructions are configured to enable the at least one processor (e.g., the processor 640 of FIG. 6) to obtain information associated with the change in the area of the flexible display (e.g., the display 630 of FIG. 6) using the second sensor, the information associated with the change in the area of the flexible display (e.g., the display 630 of FIG. 6) including information about at least one of a time when the change in the area starts, a rotation speed of the motor, or a time when the motor is driven, and obtain fourth information associated with the second display operation based on the information associated with the change in the area of the flexible display (e.g., the display 630 of FIG. 6), the fourth information including information about at least one of the second start time of the second display operation, a second execution time of the second display operation, or a second end time of the second display operation.

According to various embodiments, there may be provided the electronic device (e.g., the electronic device 600 of FIG. 6), wherein the instructions are configured to enable the at least one processor (e.g., the processor 640 of FIG. 6) to identify a first transition method among the plurality of transition methods when the first start time is equal to or before the second start time and the first end time is after the second end time, and as at least part of an operation based on the first transition method sequentially change the size and the degree of rotation of the first image displayed on the flexible display (e.g., the display 630 of FIG. 6) by performing the first display operation and the second display operation during a first time, and sequentially change the size of the second image displayed on the flexible display (e.g., the display 630 of FIG. 6) by performing the second display operation after the first time.

According to various embodiments, there may be provided the electronic device (e.g., the electronic device 600 of FIG. 6), wherein the instructions are configured to enable the at least one processor (e.g., the processor 640 of FIG. 6) to identify a value associated with a size of the area of the flexible display (e.g., the display 630 of FIG. 6), associated with a second time when the first display operation is terminated, at the first time when the second event occurs, perform an operation of obtaining the second image to be displayed at the second time, based on the identified value, and when the second image is obtained, display the obtained second image at the second time and sequentially change the size of the second image by performing the second display operation.

According to various embodiments, there may be provided the electronic device (e.g., the electronic device 600 of FIG. 6), wherein the instructions are configured to enable the at least one processor (e.g., the processor 640 of FIG. 6) to change the first end time of the first display operation when the second image is not obtained.

According to various embodiments, there may be provided the electronic device (e.g., the electronic device 600 of FIG. 6), wherein the instructions are configured to enable the at least one processor (e.g., the processor 640 of FIG. 6) to identify a second transition method among the plurality of transition methods when the first start time is equal to or before the second start time and the first end time is equal to or before the second end time, and sequentially change the size and the degree of rotation of the image displayed on the flexible display (e.g., the display 630 of FIG. 6) by performing the first display operation and the second display operation as at least part of the operation based on the second transition method.

According to various embodiments, there may be provided the electronic device (e.g., the electronic device 600 of FIG. 6), wherein the instructions are configured to enable the at least one processor (e.g., the processor 640 of FIG. 6) to identify a third transition method among the plurality of transition methods when the first start time is after the second start time and the first end time is equal to or after the second end time, and as at least part of an operation based on the third transition method sequentially change the size of the first image displayed on the flexible display (e.g., the display 630 of FIG. 6) by performing the second display operation during the first time, change the first end time of the first display operation to the second end time of the second display operation, and sequentially change the degree of rotation of the second image displayed on the flexible display (e.g., the display 630 of FIG. 6) by performing the first display operation after the first time.

According to various embodiments, there may be provided the electronic device (e.g., the electronic device 600 of FIG. 6), wherein the instructions are configured to enable the at least one processor (e.g., the processor 640 of FIG. 6) to identify a fourth transition method among the plurality of transition methods when the first start time is after the second start time and the first end time is equal to or before the second end time, and as at least part of an operation based on the fourth transition method sequentially change the size of the first image displayed on the flexible display (e.g., the display 630 of FIG. 6) by performing the second display operation during the first time, sequentially change the degree of rotation of the second image displayed on the flexible display (e.g., the display 630 of FIG. 6) by performing the first display operation after the first time.

According to various embodiments, there may be provided a method for operating an electronic device (e.g., the electronic device 600 of FIG. 6), comprising identifying a first event triggering a first display operation for displaying an image based on a rotation of the electronic device (e.g., the electronic device 600 of FIG. 6), identifying a second event triggering a second display operation for displaying an image based on a change in the area of a flexible display (e.g., the display 630 of FIG. 6) of the electronic device (e.g., the electronic device 600 of FIG. 6), identifying at least one of first information about a temporal relationship between a first start time of the first display operation and a second start time of the second display operation or second information about a temporal relationship between a first end time of the first display operation and a second end time of the second display operation, selecting a transition method from among the plurality of transition methods based on at least one of the first information or the second information, and sequentially changing a display attribute of an image displayed on the flexible display (e.g., the display 630 of FIG. 6) while at least one of the first display operation or the second display operation is performed based on the selected transition method.

According to various embodiments, there may be provided the method, wherein the display attribute includes at least one of a size of display of the image or a degree of rotation of the image.

According to various embodiments, there may be provided the method, wherein the first display operation includes sequentially changing the degree of rotation of the image, wherein the second display operation includes sequentially changing the size of display of the image, and wherein the method further comprises sequentially changing the size of display of the image and the degree of rotation of the image when the first display operation and the second display operation are simultaneously performed.

According to various embodiments, there may be provided the method, further comprising sequentially changing the display attribute of the image displayed on the flexible display (e.g., the display 630 of FIG. 6) by performing at least one of the first display operation or the second display operation based on the selected transition method.

According to various embodiments, there may be provided the method, further comprising identifying at least one of the first information or the second information based on the first display operation and the second display operation being performed by an occurrence of the first event and an occurrence of the second event and selecting the transition method based on at least one of the first information or the second information from among the plurality of transition methods.

According to various embodiments, there may be provided the method comprising obtaining the information associated with the rotation of the electronic device (e.g., the electronic device 600 of FIG. 6) using a first sensor for identifying a first value associated with the rotation of the electronic device (e.g., the electronic device 600 of FIG. 6), the information associated with the rotation including information about at least one of a current rotation angle of the electronic device (e.g., the electronic device 600 of FIG. 6) or a rotation angle speed of the electronic device (e.g., the electronic device 600 of FIG. 6), and obtaining third information associated with the first display operation based on the information associated with the rotation, the third information including information about at least one of the first start time of the first display operation, a first execution time of the first display operation, or a first end time of the first display operation.

According to various embodiments, there may be provided the method further comprising determining the first execution time of the first display operation based on at least part of the information associated with the rotation.

According to various embodiments, there may be provided an electronic device (e.g., the electronic device 600 of FIG. 6) comprising a housing (e.g., the first housing 401 and/or second housing 402 of FIGS. 4A to 4C), a flexible display (e.g., the display 630 of FIG. 6) wherein an area of the flexible display exposed to an outside of the housing (e.g., the first housing 401 and/or second housing 402 of FIGS. 4A to 4C) is changeable, a sensor for identifying a rotation angle of the electronic device (e.g., the electronic device 600 of FIG. 6), and at least one processor (e.g., the processor 640 of FIG. 6); wherein the at least one processor (e.g., the processor 640 of FIG. 6) is configured to display, on the flexible display (e.g., the display 630 of FIG. 6), a first image having a first size based on a first screen direction during a first time when the rotation angle of the electronic device (e.g., the electronic device 600 of FIG. 6) is identified to be less than a specific angle using the sensor, display, on the flexible display (e.g., the display 630 of FIG. 6), a plurality of second images obtained based on the first image during a second time after an event for changing a size of the area exposed to the outside of the housing (e.g., the first housing 401 and/or second housing 402 of FIGS. 4A to 4C) occurs, and the rotation angle of the electronic device (e.g., the electronic device 600 of FIG. 6) is identified to be the specific angle or more, respective sizes of display of the plurality of second images differing from each other, and respective rotation angles of the plurality of second images differing from each other, and display, on the flexible display (e.g., the display 630 of FIG. 6), a third image having a third size different from the first size based on a second screen direction, after the second time.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first sensor;
   a second sensor;
   a housing;
   memory storing executable instructions;
   a flexible display, wherein an area of the flexible display exposed to an outside of the housing is changeable; and
   at least one processor to access the memory, and execute the instructions, wherein the instructions, when executed by the at least one processor, cause the electronic device to:
      identify whether a first sensing value obtained through the first sensor exceeds a preset first value related to rotation of the electronic device,
      when the first sensing value exceeds the preset first value, identify that the electronic device is rotated,
      identify whether a second sensing value obtained through the second sensor exceeds a preset second value related to change in the area,
      when the second sensing value exceeds the preset second value, identify that the area is changed,
      based on a first display operation according to rotation of the electronic device and a second display operation according to change of the area,
      change at least one of a size of an image or a degree of rotation of the image displayed on the flexible display, and
      identify at least one of:
         an ordinal relationship between a starting time of the first display operation and a starting time of the second display operation, or
         an ordinal relationship between an ending time of the first display operation and an ending time of the second display operation.

2. The electronic device of claim 1, wherein the instructions, when executed by the at least one processor, further cause the electronic device to:
   sequentially change the degree of rotation of the image when the first display operation is performed;
   sequentially change the size of the image when the second display operation is performed; and
   sequentially change the size of the image and the degree of rotation of the image when the first display operation and the second display operation are simultaneously performed.

3. The electronic device of claim 1, wherein the instructions, when executed by the at least one processor, further cause the electronic device to:
   obtain information associated with the rotation of the electronic device using the first sensor, wherein the information associated with the rotation including information about at least one of a current rotation angle of the electronic device or a rotation angle speed of the electronic device, and
   obtain first information associated with the first display operation based on the information associated with the rotation, wherein the first information including information about at least one of a first start time of the first display operation, a first execution time of the first display operation, or a first end time of the first display operation.

4. The electronic device of claim 3, wherein the instructions, when executed by the at least one processor, further cause the electronic device to:
determine the first execution time of the first display operation based on at least part of the information associated with the rotation.

5. The electronic device of claim 4, further comprising:
a motor drivable to change the area; and
wherein the instructions, when executed by the at least one processor, further cause the electronic device to:
obtain information associated with the change in the area of the flexible display using the second sensor, wherein the information associated with the change in the area including information about at least one of a time when the change in the area starts, a rotation speed of the motor, or a time when the motor is driven, and
obtain second information associated with the second display operation based on the information associated with the change in the area, wherein the second information including information about at least one of a second start time of the second display operation, a second execution time of the second display operation, or a second end time of the second display operation.

6. The electronic device of claim 1, wherein the instructions, when executed by the at least one processor, further cause the electronic device to:
when a first start time of the first display operation is equal to or before a second start time of the second display operation and a first end time of the first display operation is before a second end time of the second display operation,
sequentially change a size and a degree of rotation of a first image displayed on the flexible display by performing the first display operation and the second display operation during a first time, and
sequentially change a size of a second image displayed on the flexible display by performing the second display operation after the first time.

7. The electronic device of claim 6, wherein the instructions, when executed by the at least one processor, further cause the electronic device to:
identify a value associated with a size of the area of the flexible display, associated with the first end time, at the second start time,
perform an operation of obtaining the second image to be displayed at the first end time, based on the value associated with the size of the area, and
when the second image is obtained, display the second image at the first end time and sequentially change the size of the second image by performing the second display operation.

8. The electronic device of claim 7, wherein the instructions, when executed by the at least one processor, further cause the electronic device to:
change the first end time when the second image is not obtained.

9. The electronic device of claim 1, wherein the instructions, when executed by the at least one processor, further cause the electronic device to:
when a first start time of the first display operation is equal to or before a second start time of the second display operation and a first end time of the first display operation is equal to or after a second end time of the second display operation, sequentially change a size and a degree of rotation of the image by performing the first display operation and the second display operation.

10. The electronic device of claim 1, wherein the instructions, when executed by the at least one processor, further cause the electronic device to:
when a first start time of the first display operation is equal to or after a second start time of the second display operation and a first end time of the first display operation is equal to or before a second end time of the second display operation,
sequentially change a size of a first image displayed on the flexible display by performing the second display operation during first time,
change the first end time to the second end time, and
sequentially change a size and a degree of rotation of a second image displayed on the flexible display by performing the first display operation and the second display operation after the first time.

11. The electronic device of claim 1, wherein the instructions, when executed by the at least one processor, further cause the electronic device to:
when a first start time of the first display operation is equal to or after a second start time of the second display operation and a first end time of the first display operation is equal to or after a second end time of the second display operation,
sequentially change a size of a first image displayed on the flexible display by performing the second display operation during the first start time, and
sequentially change a size and a degree of rotation of a second image displayed on the flexible display by performing the first display operation and the second display operation after the first start time.

12. A method for operating an electronic device, the method comprising:
identifying whether a first sensing value obtained through a first sensor of the electronic device exceeds a preset first value related to rotation of the electronic device;
when the first sensing value exceeds the preset first value, identifying that the electronic device is rotated;
identifying whether a second sensing value obtained through a second sensor exceeds a preset second value related to change in an area of a flexible display of the electronic device;
when the second sensing value exceeds the preset second value, identifying that the area is changed;
based on a first display operation according to rotation of the electronic device and a second display operation according to change of the area;
changing at least one of a size of an image or a degree of rotation of the image displayed on the flexible display; and
identifying at least one of:
an ordinal relationship between a starting time of the first display operation and a starting time of the second display operation, or
an ordinal relationship between an ending time of the first display operation and an ending time of the second display operation.

13. The method of claim 12,
sequentially changing the degree of rotation of the image when the first display operation is performed;
sequentially changing the size of the image when the second display operation is performed; and sequentially changing the size of the image and the degree of rotation of the image when the first display operation and the second display operation are simultaneously performed.

14. The method of claim 13, further comprising:
obtaining information associated with the rotation of the electronic device using the first sensor, wherein the information associated with the rotation including information about at least one of a current rotation angle of the electronic device or a rotation angle speed of the electronic device; and
obtaining first information associated with the first display operation based on the information associated with the rotation, wherein the first information including information about at least one of a first start time of the first display operation, a first execution time of the first display operation, or a first end time of the first display operation.

15. The method of claim 14, further comprising:
determining the first execution time of the first display operation based on at least part of the information associated with the rotation.

16. The method of claim 12, further comprising:
when a first start time of the first display operation is equal to or before a second start time of the second display operation and a first end time of the first display operation is before a second end time of the second display operation;
sequentially changing a size and a degree of rotation of a first image displayed on the flexible display by performing the first display operation and the second display operation during a first time; and
sequentially changing a size of a second image displayed on the flexible display by performing the second display operation after the first time.

17. The method of claim 16, further comprising:
identifying a value associated with a size of the area of the flexible display, associated with the first end time, at the second start time;
performing an operation of obtaining the second image to be displayed at the first end time, based on the value associated with the size of the area; and
when the second image is obtained, displaying the second image at the first end time and sequentially changing the size of the second image by performing the second display operation.

18. The method of claim 12, further comprising:
when a first start time of the first display operation is equal to or before a second start time of the second display operation and a first end time of the first display operation is equal to or after a second end time of the second display operation, sequentially changing a size and a degree of rotation of the image by performing the first display operation and the second display operation.

19. The method of claim 12, further comprising:
when a first start time of the first display operation is equal to or after a second start time of the second display operation and a first end time of the first display operation is equal to or before a second end time of the second display operation,
sequentially changing a size of a first image displayed on the flexible display by performing the second display operation during first time;
changing the first end time to the second end time; and
sequentially changing a size and a degree of rotation of a second image displayed on the flexible display by performing the first display operation and the second display operation after the first time.

20. An electronic device comprising:
a housing;
a flexible display wherein an area of the flexible display exposed to an outside of the housing is changeable;
a sensor for identifying a rotation angle of the electronic device; and
at least one processor, wherein the at least one processor is configured to:
display, on the flexible display, a first image having a first area based on a first screen direction during a first time when the rotation angle of the electronic device is identified to be less than a specific angle using the sensor,
display, on the flexible display, a plurality of second images obtained based on the first image during a second time after an event for changing a size of the area exposed to the outside of the housing occurs, and the rotation angle of the electronic device is identified to be the specific angle or more, respective sizes of display of the plurality of second images differing from each other, and respective rotation angles of the plurality of second images differing from each other,
display, on the flexible display, a third image having a third size different from the first area based on a second screen direction, after the second time, and
identify at least one of:
an ordinal relationship between a starting time of a rotation event of the electronic device and a starting time of a display size changing event of the flexible display, or
an ordinal relationship between an ending time of a rotation event of the electronic device and an ending time of a display size changing event of the flexible display.

* * * * *